(12) United States Patent
Carlson et al.

(10) Patent No.: US 7,983,272 B2
(45) Date of Patent: Jul. 19, 2011

(54) APPARATUS AND METHODS FOR INCORPORATING BANDWIDTH FORECASTING AND DYNAMIC BANDWIDTH ALLOCATION INTO A BROADBAND COMMUNICATION SYSTEM

(76) Inventors: William S. Carlson, Buford, GA (US); Matthew James Moyer, Duluth, GA (US); Martin William McKinnon, III, Mableton, GA (US); Freeman Rufus, Jr., Atlanta, GA (US); John Bradford Hart, Dover, NH (US)

( * ) Notice: Subject to any disclaimer, the term of this patent is extended or adjusted under 35 U.S.C. 154(b) by 242 days.

(21) Appl. No.: 11/856,761

(22) Filed: Sep. 18, 2007

(65) Prior Publication Data
US 2008/0037578 A1 Feb. 14, 2008

Related U.S. Application Data

(60) Division of application No. 10/410,878, filed on Apr. 9, 2003, now Pat. No. 7,499,453, and a continuation-in-part of application No. 09/800,674, filed on Mar. 7, 2001, now Pat. No. 6,845,106.

(60) Provisional application No. 60/371,213, filed on Apr. 9, 2002, provisional application No. 60/205,963, filed on May 19, 2000.

(51) Int. Cl.
*H04L 12/28* (2006.01)
*H04J 3/16* (2006.01)
*H04N 7/173* (2011.01)

(52) U.S. Cl. ............ 370/395.4; 370/468; 725/111; 725/114

(58) Field of Classification Search ............. 370/468, 370/395.2, 395.1, 329, 341, 395.4, 431, 432, 370/485, 486, 487; 725/86, 87, 91, 97, 105, 725/111; 455/450, 452.1, 452.2, 453
See application file for complete search history.

(56) References Cited

U.S. PATENT DOCUMENTS

| 5,343,465 A | 8/1994 | Khalil ................... 370/232 |
| 5,491,531 A | 2/1996 | Adams et al. ............ 375/354 |

(Continued)

FOREIGN PATENT DOCUMENTS
EP 0 613 316 8/1994
(Continued)

OTHER PUBLICATIONS

U.S. Appl. No. 10/276,654, filed Mar. 7, 2001, entitled "Allocating Access Across Shared Communications Medium," Inventor: McKinnon.
(Continued)

*Primary Examiner* — Hanh Nguyen
(74) *Attorney, Agent, or Firm* — Merchant & Gould

(57) ABSTRACT

A method for providing network access to a shared access communications medium for a plurality of users includes the steps of conducting predictive admission control by arbitrating user requests for access to the shared medium based on predicted aggregate demands, conducting lookahead scheduling for use in making user channel assignments by forecasting schedule transmission opportunities one or more channels of the shared medium, and balancing load by making channel assignments such that a plurality users are each assigned a respective channel of the shared medium based upon a predicted need. Congestion parameters can predicted for each channel of the shared medium and mapped to a congestion measure using a mathematical function that takes into account packet loss rate, packet delay, packet delay jitter, and available capacity.

16 Claims, 36 Drawing Sheets

U.S. PATENT DOCUMENTS

| | | | |
|---|---|---|---|
| 5,491,694 A | 2/1996 | Oliver et al. | 370/455 |
| 5,537,446 A | 7/1996 | Lakshman et al. | 375/371 |
| 5,570,355 A | 10/1996 | Dail et al. | 370/352 |
| 5,581,555 A | 12/1996 | Dubberly et al. | 370/487 |
| 5,594,726 A | 1/1997 | Thompson et al. | 370/485 |
| 5,659,787 A | 8/1997 | Schieltz | 709/226 |
| 5,678,041 A | 10/1997 | Baker et al. | 707/9 |
| 5,717,861 A | 2/1998 | Rabii | 709/232 |
| 5,719,872 A | 2/1998 | Dubberly et al. | 370/487 |
| 5,732,078 A | 3/1998 | Arango | 370/355 |
| 5,757,801 A | 5/1998 | Arimilli | 370/444 |
| 5,790,546 A | 8/1998 | Dobbins et al. | 370/400 |
| 5,796,724 A | 8/1998 | Rajamani | 370/263 |
| 5,857,193 A | 1/1999 | Sutcliffe et al. | 707/10 |
| 5,867,764 A | 2/1999 | Williams | 725/125 |
| 5,881,231 A | 3/1999 | Takagi et al. | 709/212 |
| 5,884,037 A | 3/1999 | Aras et al. | 709/226 |
| 5,935,218 A | 8/1999 | Beyda et al. | 709/251 |
| 5,946,322 A | 8/1999 | Moura et al. | 370/468 |
| 5,953,344 A | 9/1999 | Dail et al. | 370/443 |
| 5,956,342 A | 9/1999 | Manning et al. | 370/414 |
| 5,963,557 A | 10/1999 | Eng | 370/432 |
| 5,963,963 A | 10/1999 | Schmuck et al. | 707/205 |
| 5,995,805 A | 11/1999 | Ogasawara et al. | 707/9 |
| 6,028,860 A | 2/2000 | Laubach et al. | 370/395.64 |
| 6,046,980 A | 4/2000 | Packer | 370/230 |
| 6,075,972 A * | 6/2000 | Laubach et al. | 455/3.05 |
| 6,084,855 A | 7/2000 | Soirinsuo et al. | 370/235 |
| 6,104,700 A | 8/2000 | Haddock et al. | 370/235 |
| 6,115,390 A | 9/2000 | Chuah | 370/443 |
| 6,125,105 A | 9/2000 | Edwards et al. | 370/230 |
| 6,151,582 A | 11/2000 | Huang et al. | 705/8 |
| 6,175,554 B1 | 1/2001 | Jang et al. | 370/229 |
| 6,208,640 B1 | 3/2001 | Spell et al. | 370/358 |
| 6,823,385 B2 | 3/2001 | McKinnon | |
| 6,845,106 B2 | 3/2001 | McKinnon | |
| 6,917,622 B2 | 3/2001 | McKinnon | |
| 6,917,628 B2 | 3/2001 | McKinnin | |
| 6,993,044 B2 | 3/2001 | McKinnon | |
| 7,009,992 B2 | 3/2001 | McKinnon | |
| 7,274,667 B2 | 3/2001 | McKinnon | |
| 7,299,284 B2 | 3/2001 | McKinnon | |
| 6,222,856 B1 | 4/2001 | Krishnan et al. | 370/468 |
| 6,223,042 B1 | 4/2001 | Raffel | 455/455 |
| 6,243,755 B1 | 6/2001 | Takagi et al. | 709/229 |
| 6,253,203 B1 | 6/2001 | O'Flaherty et al. | 707/9 |
| 6,272,110 B1 | 8/2001 | Tunnicliffe et al. | 370/232 |
| 6,275,824 B1 | 8/2001 | O'Flaherty et al. | 707/9 |
| 7,184,398 B2 | 8/2001 | McKinnon | |
| 6,324,184 B1 | 11/2001 | Hou et al. | 370/468 |
| 6,343,085 B1 | 1/2002 | Krishnan et al. | |
| 6,363,445 B1 | 3/2002 | Jeddeloh | 710/113 |
| 6,408,336 B1 | 6/2002 | Schneider et al. | 709/229 |
| 6,438,141 B1 * | 8/2002 | Hanko et al. | 370/477 |
| 6,442,158 B1 | 8/2002 | Beser | 370/352 |
| 6,473,794 B1 | 10/2002 | Guheen et al. | 709/223 |
| 6,477,144 B1 | 11/2002 | Morris et al. | 370/230.1 |
| 6,483,839 B1 | 11/2002 | Gemar et al. | 370/395.42 |
| 6,490,347 B2 | 12/2002 | DeCaluwe et al. | 379/211.01 |
| 6,493,446 B1 * | 12/2002 | Cherry | 379/265.05 |
| 6,510,162 B1 | 1/2003 | Fijolek et al. | 370/432 |
| 6,516,348 B1 | 2/2003 | MacFarlane et al. | 709/224 |
| 6,529,486 B1 | 3/2003 | Barnes et al. | 370/327 |
| 6,539,427 B1 | 3/2003 | Natarajan et al. | 709/224 |
| 6,542,463 B1 | 4/2003 | Heeke | 370/230 |
| 6,542,500 B1 | 4/2003 | Gerszberg et al. | 370/354 |
| 6,542,593 B1 | 4/2003 | Bownman-Amuah | 379/201.03 |
| 6,546,017 B1 | 4/2003 | Khaunte | |
| 6,553,568 B1 * | 4/2003 | Fijolek et al. | 725/111 |
| 6,560,243 B1 | 5/2003 | Mogul | 370/468 |
| 6,563,829 B1 | 5/2003 | Lyles et al. | |
| 6,567,418 B1 | 5/2003 | Farah | 370/437 |
| 6,577,597 B1 | 6/2003 | Natarajan et al. | 370/232 |
| 6,577,642 B1 | 6/2003 | Fijolek et al. | 370/465 |
| 6,580,723 B1 | 6/2003 | Chapman | 370/442 |
| 6,598,057 B1 | 7/2003 | Synnestvedt et al. | 707/200 |
| 6,611,726 B1 | 8/2003 | Crosswhite | 700/99 |
| 6,615,166 B1 | 9/2003 | Guheen et al. | 703/27 |
| 6,643,290 B1 | 11/2003 | Glade | 370/395.4 |
| 6,654,957 B1 * | 11/2003 | Moore et al. | 725/111 |
| 6,636,482 B2 | 12/2003 | Cloonan et al. | 370/230 |
| 6,658,010 B1 * | 12/2003 | Enns et al. | 370/401 |
| 6,665,271 B1 | 12/2003 | Thomas et al. | 370/252 |
| 6,667,956 B2 | 12/2003 | Beshai et al. | 370/238 |
| 6,671,724 B1 | 12/2003 | Pandya et al. | 709/226 |
| 6,671,818 B1 | 12/2003 | Mikurak | 714/4 |
| 6,680,922 B1 | 1/2004 | Jorgensen | 370/328 |
| 6,701,342 B1 | 3/2004 | Bartz et al. | 709/200 |
| 6,715,075 B1 | 3/2004 | Loukianov | 713/176 |
| 6,754,177 B1 | 6/2004 | Gersht et al. | 370/233 |
| 6,763,000 B1 | 7/2004 | Walsh | 370/252 |
| 6,754,228 B1 | 12/2004 | Akgun | 370/468 |
| 6,848,004 B1 | 1/2005 | Chang et al. | 709/232 |
| 6,859,926 B1 | 2/2005 | Brenner et al. | |
| 6,865,170 B1 | 3/2005 | Zendle | |
| 6,882,623 B1 | 4/2005 | Goren et al. | |
| 6,912,232 B1 | 6/2005 | Duffield et al. | 370/468 |
| 6,917,614 B1 * | 7/2005 | Laubach et al. | 370/392 |
| 7,065,779 B1 | 6/2006 | Crocker | |
| 7,068,597 B1 | 6/2006 | Fijolek et al. | 370/230 |
| 7,113,484 B1 | 9/2006 | Chapman | |
| 7,145,887 B1 | 12/2006 | Akgun et al. | 370/321 |
| 7,333,495 B2 | 2/2008 | Sala et al. | |
| 7,499,453 B2 * | 3/2009 | Carlson et al. | 370/395.2 |
| 7,848,234 B2 | 12/2010 | McKinnon, III | |
| 7,856,497 B2 | 12/2010 | McKinnon, III et al. | |
| 7,920,594 B2 | 4/2011 | Carlson et al. | |
| 7,925,750 B2 | 4/2011 | McKinnon, III et al. | |
| 7,957,417 | 6/2011 | Mckinnon, Iii et al. | |
| 2002/0093912 A1 | 7/2002 | Gummalla et al. | |
| 2002/0118645 A1 | 8/2002 | Narayana et al. | 370/231 |
| 2002/0154655 A1 | 10/2002 | Gummalla et al. | 370/468 |
| 2002/0173316 A1 | 11/2002 | Jang et al. | 455/453 |
| 2004/0184472 A1 | 9/2004 | Carroll | 370/442 |
| 2005/0254419 A1 | 11/2005 | Barker et al. | 370/229 |
| 2006/0114926 A1 | 6/2006 | McKinnon et al. | 370/443 |
| 2006/0120282 A1 | 6/2006 | Carlson et al. | 370/229 |
| 2007/0058545 A1 | 3/2007 | Nookala et al. | 370/230 |
| 2007/0133409 A1 | 6/2007 | McKinnon, III et al. | 370/230 |
| 2008/0037578 A1 * | 2/2008 | Carlson et al. | 370/463 |
| 2008/0112429 A1 | 5/2008 | McKinnon et al. | 370/442 |
| 2008/0144660 A1 | 6/2008 | Godlewski | 370/468 |
| 2009/0028176 A1 | 1/2009 | Godlewski et al. | 370/458 |
| 2009/0070454 A1 | 3/2009 | McKinnon, III et al. | 709/224 |
| 2009/0207731 A1 | 8/2009 | Carlson et al. | 370/232 |
| 2009/0213871 A1 * | 8/2009 | Carlson et al. | 370/462 |

FOREIGN PATENT DOCUMENTS

| | | |
|---|---|---|
| EP | 0 742 658 | 11/1996 |
| WO | WO 99/27686 | 6/1999 |
| WO | WO 00/56021 A | 9/2000 |

OTHER PUBLICATIONS

U.S. Appl. No. 10/410,878, filed Apr. 9, 2003, entitled "Apparatus and Methods for Incorporating Bandwidth Forecasting and Dynamic Bandwidth Allocation into a Broadband Communications System," Inventor: Carlson.

U.S. Appl. No. 11/676,318, filed Feb. 19, 2007, entitled "Allocating Access Across Shared Communications Medium to User Classes," Inventors: McKinnon.

Sally Floyd et al., "Link-Sharing and Resource Management Models for Packet Networks," IEEE/ACM Transactions on Networking, vol. 3, No. 4, Aug. 1995, pp. 365-386.

X. Wang et al., "A predictive bandwidth management scheme and network architecture for real-time VBR traffic," Microprocessors and Microsystems, vol. 22, No. 10, May 1999, pp. 597-604.

Anurag Kumar et al., "Nonintrusive TCP Connection Admission Control for Bandwidth Management of an Internet Access Link," IEEE Communications Magazine, vol. 38, No. 5, May 2000, pp. 160-167.

Bhumip Khasnabish et al., "Bandwidth Management/Policing in ATM Networks for Serving Multi-Category Traffic using a Simple Learning Algorithm and a Bucket Bank," Global Telecommunications Conference, 1993, pp. 1149-1153.

U.S. Office Action dated Jul. 6, 2004 cited in U.S. Appl. No. 09/800,861.
U.S. Office Action dated Sep. 16, 2004 cited in U.S. Appl. No. 09/800,735.
U.S. Office Action dated Dec. 2, 2004 cited in U.S. Appl. No. 09/801,155.
U.S. Office Action dated Dec. 15, 2004 cited in U.S. Appl. No. 09/800,717.
U.S. Office Action dated Dec. 16, 2004 cited in U.S. Appl. No. 09/800,608.
Office Action dated Apr. 11, 2005 cited in U.S. Appl. No. 09/801,155.
U.S. Office Action dated May 4, 2005 cited in U.S. Appl. No. 09/800,608.
U.S. Office Action dated May 19, 2005 cited in U.S. Appl. No. 09/800,735.
U.S. Office Action dated May 27, 2005 cited in U.S. Appl. No. 09/935,514.
U.S. Office Action dated Jun. 13, 2005 cited in U.S. Appl. No. 09/800,717.
U.S. Final Office Action dated Oct. 31, 2005 cited in U.S. Appl. No. 09/800,608.
U.S. Office Action dated Nov. 16, 2005 cited in U.S. Appl. No. 09/935,514.
U.S. Office Action dated Dec. 14, 2005 cited in U.S. Appl. No. 09/800,717.
U.S. Office Action dated Jan. 5, 2006 cited in U.S. Appl. No. 09/935,514.
U.S. Office Action dated Apr. 20, 2006 cited in U.S. Appl. No. 09/800,608.
U.S. Office Action dated May 30, 2006 cited in U.S. Appl. No. 09/800,717.
U.S. Office Action dated Jun. 30, 2006 cited in U.S. Appl. No. 09/935,514.
U.S. Final Office Action dated Oct. 4, 2006 cited in U.S. Appl. No. 09/800,608.
U.S. Final Office Action dated Nov. 16, 2006 cited in U.S. Appl. No. 09/800,717.
U.S. Office Action dated Jan. 29, 2007 cited in U.S. Appl. No. 09/800,608.
U.S. Office Action dated Jul. 24, 2007 cited in U.S. Appl. No. 10/410,878.
U.S. Office Action dated Apr. 16, 2008 cited in U.S. Appl. No. 10/410,878.
U.S. Office Action dated Dec. 22, 2008 cited in U.S. Appl. No. 11/275,208.
U.S. Office Action dated Apr. 15, 2009 cited in U.S. Appl. No. 11/676,318.
U.S. Office Action dated Apr. 17, 2009 cited in U.S. Appl. No. 11/612,524.
U.S. Office Action dated Apr. 29, 2009 cited in U.S. Appl. No. 10/276,654.
U.S. Final Office Action dated May 13, 2009 cited in U.S. Appl. No. 11/275,208.
U.S. Office Action dated Jun. 16, 2009 cited in U.S. Appl. No. 11/875,369.
U.S. Office Action dated Jul. 30, 2009 cited in U.S. Appl. No. 11/829,209.
International Search Report dated May 27, 2008 cited in PCT/US2007/086945.
International Search Report dated Aug. 28, 2008 cited in PCT/US2008/070847.
European Official Communication dated Jun. 4, 2009 cited in Application No. 01914723.0.
IBM Technical Disclosure Bulletin #NB9203470.
Beauregard, Brian Conrad, "Overview of the Cable Modem," WPI Department of Electrical and Computer Engineering [online] Technologies Course Homepage, Mar. 23, 1996 [Retrieved on Dec. 18, 2000]. Retrieved from the Internet at <URL:http://www.ece.wpl.edu.courses/ee535/hwk96/hwk4cd/bcbeau/nodel.html>.
White, Gerry, "Additions to Cable Spec Enable QoS," [online] Article in Network World Fusion, Jun. 19, 2000 {Retrieved on Dec. 19, 2000]. Retrieved from the Internet at <URL:http://www.nwfusion.com/cgl-bin.mailto/x.cgi>.

RiverDelta Networks, RiverDelta Networks Executive to Discuss Advanced Quality of Service Techniques at Cable-Tec Expo 2000 [online] Press Release, May 31, 2000 [Retrieved Dec. 19, 2000]. Retrieved from the Internet at <URL:http://www.riverdelta.com/pr053100.html>.
RiverDelta Networks, RiverDelta Raises $10 Million to Bring Enhanced Broadband Services to Next-Generation Cable Providers [online] Press Release, Dec. 19, 1999 [Retrieved Dec. 19, 2000]. Retrieved from the Internet at <URL:http://www.riverdelta.com/pr121399.html>.
International Engineering Consortium, How Cable Modems Work [online] Web ProForum Tutorial Course, Aug. 2, 2000 [Retrieved on Dec. 18, 2000]. Retrieved from the Internet at <URL:http://www.iec/org/tutorials/cable.sub.-mod/topic01.html?Nest.x=-34XNext.y=20>.
International Engineering Consortium, Cable Data System Features [online] Web ProForum Tutorial Course, Aug. 3, 2000 [Retrieved on Dec. 18, 2000]. Retrieved from the Internet at <URL:http://www.iec/org/tutorials/cable/sub.--mod/topic02.html>.
International Engineering Consortium, Cable Data Network Architecture [online] Web ProForum Tutorial Course, Aug. 2, 2000 [Retrieved on Dec. 18, 2000]. Retrieved from the Internet at <URL:http://www.iec/org/tutorials/cable.sub.--mod/topic03.html>.
International Engineering Consortium, Cable Data Network Standards [online] Web ProForum Tutorial Course, Aug. 3, 2000 [Retrieved on Dec. 18, 2000]. Retrieved from the Internet at <URL:http://www.iec/org/tutorials/cable.sub.--mod/topic04.html?Next.x=-40&Next.y=18>.
Ostergaard, Rolf B., Cable Modems.Org: Your Cable Modem Reference Guide, [online] Tutorial 1998-2000 [Retrieved on Dec. 18, 2000]. Retrieved from Internet at <URL:http://www.cable-modems.org/tutorial>.
Time Warner Cable, Road Runner Subscription Agreement, Jan. 1999, pp. 1-4.
White, Gerry, Eliminating Open Access Technology Barriers [online] Telecommunications Online Newsletter Article, Jul. 2000 [Retrieved on Dec. 10, 2000]. Retrieved from the Internet at <URL:http://telecommagazine.com/issues/20007/tcs/elimin.html>.
Green, Tim, DSL Has a Secret [online] Network World Fusion Article, Mar. 2, 1999 [Retrieved on Dec. 22, 2000]. Retrieved from the Internet at <URL:http://cnn.com/TECH/computing/9903/02/dslsecretlidg/>.
Cable Television Laboratores, Inc., Cable Data Modem Performance Evaluation: A Primer for Non-Technical Readers, Nov. 15, 1996, pp. 1-8.
RiverDelta Networks, Inc., QoS: The Key to Maximizing Revenue: A Technical Guide for Cable Operators [online] PDF Document, Publication Date Unknown [Retrieved on Dec. 18, 2000]. Retrieved from Internet at <URL:http://www.riverdelta.com>, pp. 1-8.
Cable Television Laboratores, Inc., Cable Data Modem Performance Evaluation: A Primer for Non-Technical Readers, Apr. 1996, pp. 1-3.
Ddri Diversified Data Resources, Inc., ACE-SNMP Web Based SNMP Network Management System an Introductory Overview of SNMP, 1999, <URL:http://www.ddri.com>, pp. 1-32.
Data-Over-Cable Service Interface Specifications, Radio Frequency Interface Specification, SP-RFv1.-104-00047 Interim Specification; 2000 Cable Television Laboratories, Inc., 1999, pp. 229-231, 263, 121-141, 157-217, and 277-283.
U.S. Final Office Action dated Oct. 6, 2009 cited in U.S. Appl. No. 11/612,524.
U.S. Final Office Action dated Nov. 24, 2009 cited in U.S. Appl. No. 11/676,318.
U.S. Office Action dated Nov. 24, 2009 cited in U.S. Appl. No. 11/856,761.
U.S. Final Office Action dated Nov. 25, 2009 cited in U.S. Appl. No. 10/276,654.
U.S. Office Action dated Jan. 5, 2010 cited in U.S. Appl. No. 11/829,209.
Canadian Office Action dated Oct. 14, 2009 cited in Appln No. 2,409,904.
European Examination Report dated Nov. 18, 2009 cited in Appln No. 01 914 723.0-2416.

RiverDelta Networks, QoS: One HFC Network, Multiple Revenue Streams [online] White Papers, [Retrieved on Dec. 19, 2000]. Retrieved from the Internet at <URL:http://www.cabledatacomnews.com/whitepapers/paper08.html>.

Telecommunications Online, RiverDelta Networks (www.riverdelta.com)—A One-Box MSA Solution [online] Newsletter article, Jul. 2000 [Retrieved on Dec. 10, 2000]. Retrieved from the Internet at <URL:http://www.telecommagazine.com/products/200007/20000701.html>.

White, Gerry, QoS: Enabling Multiple Services on Cable Networks, [online] Telecommunications Online Newsletter Article, Oct. 2000, [Retrieved on Dec. 19, 2000]. Retrieved from the Internet at <URL:http://www.telecoms.mag.com/issues.200010/tcs/qos.sub.--enabling.-html>.

U.S. Office Action dated Apr. 29, 2010 cited in U.S. Appl. No. 12/388,659.

U.S. Office Action dated May 10, 2010 cited in U.S. Appl. No. 12/388,663.

International Preliminary Report on Patentability mailed Feb. 11, 2010 in PCT/US2008/070847.

European Official Communication dated Jun. 9, 2010 cited in Application No. 07 865 457.1.

U.S. Office Action dated Jul. 16, 2010 cited in U.S. Appl. No. 11/829,209.

U.S. Office Action dated Aug. 3, 2010 cited in U.S. Appl. No. 11/275,208.

European Official Communication dated Feb. 21, 2011 in Application No. 08 796 469.8.

U.S. Office Action dated Feb. 14, 2011 cited in U.S. Appl. No. 11/829,209.

* cited by examiner

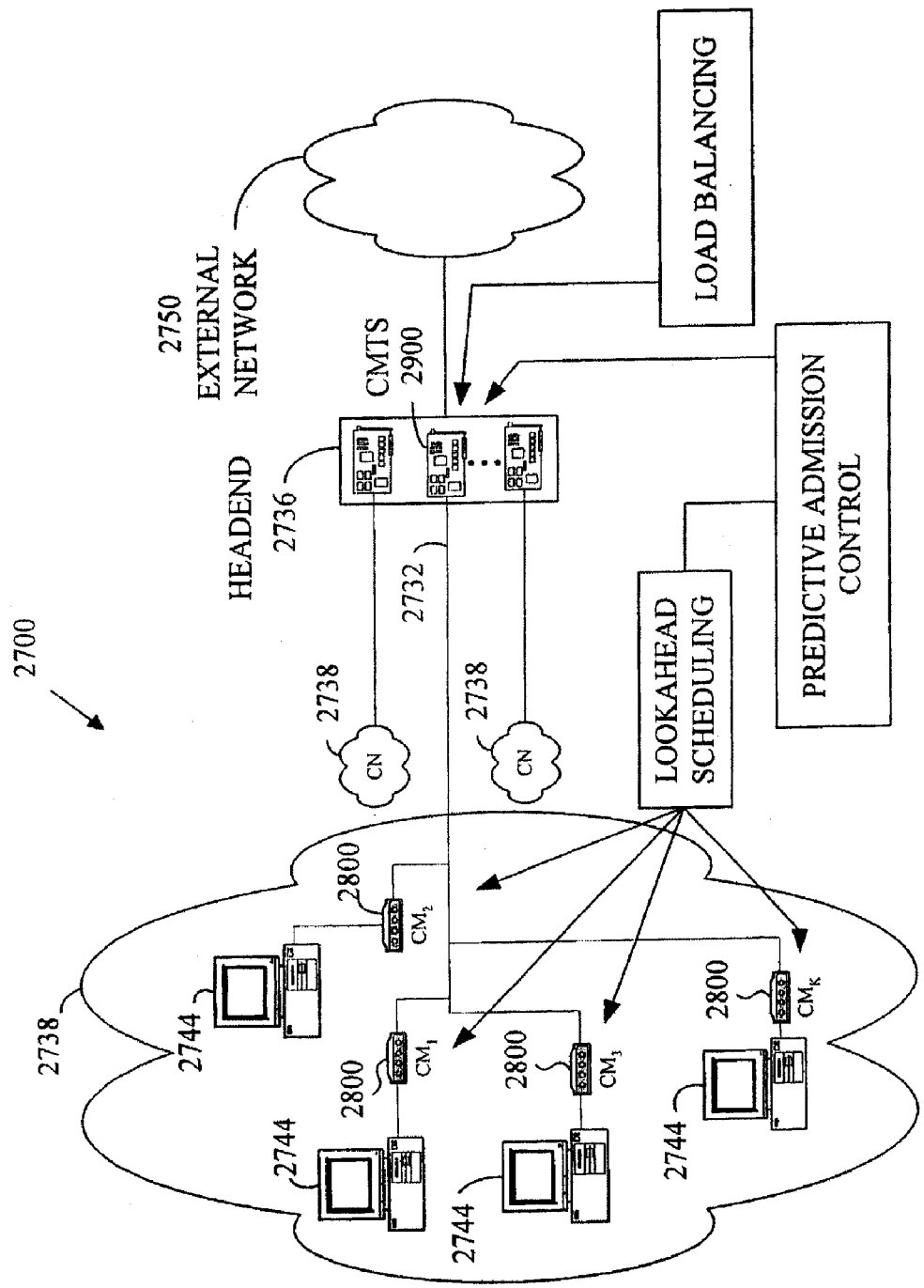
FIG. 27 SHARED ACCESS COMMUNICATIONS MEDIUM NETWORK

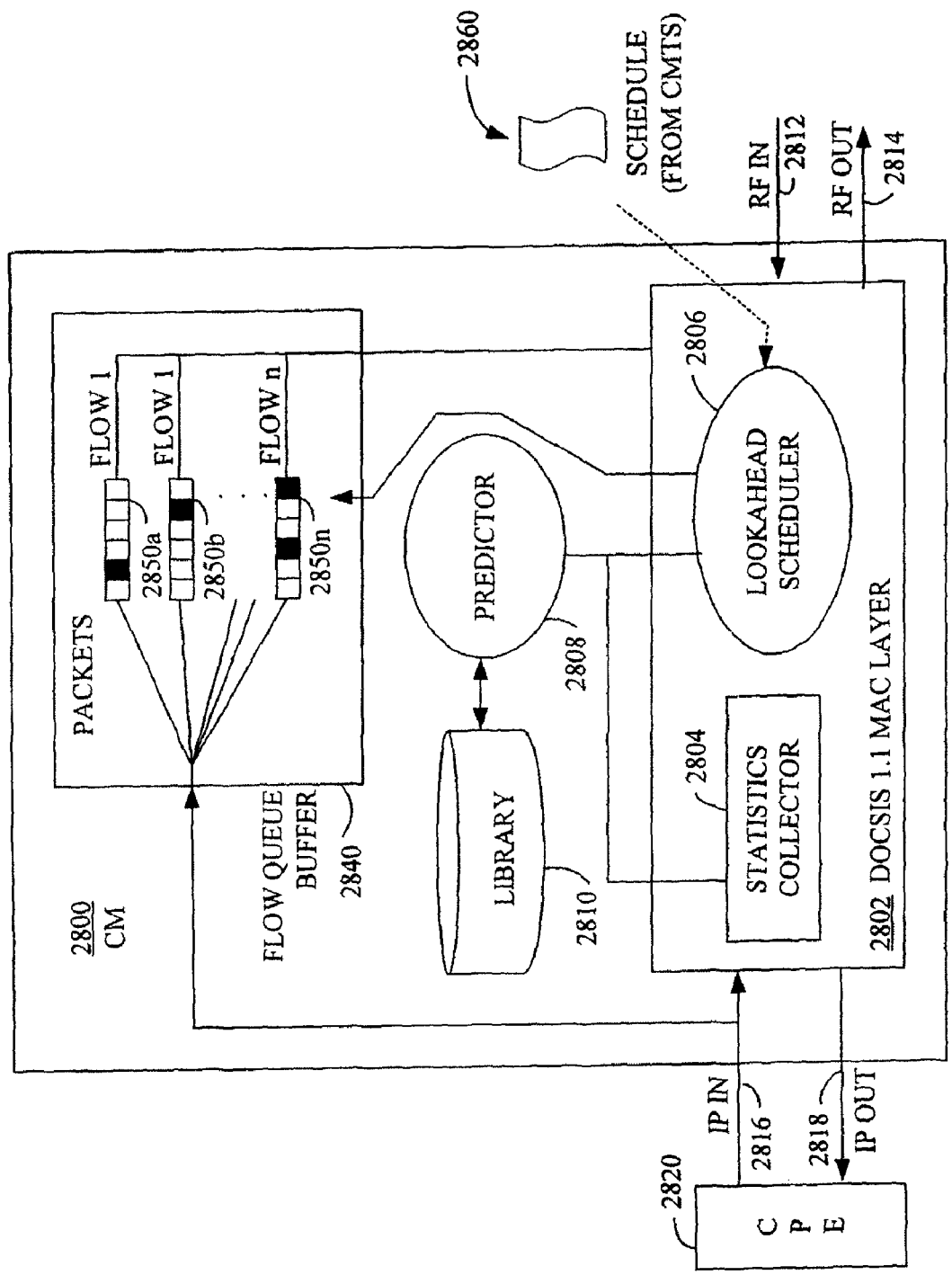
FIG. 28 CABLE MODEM (CM)

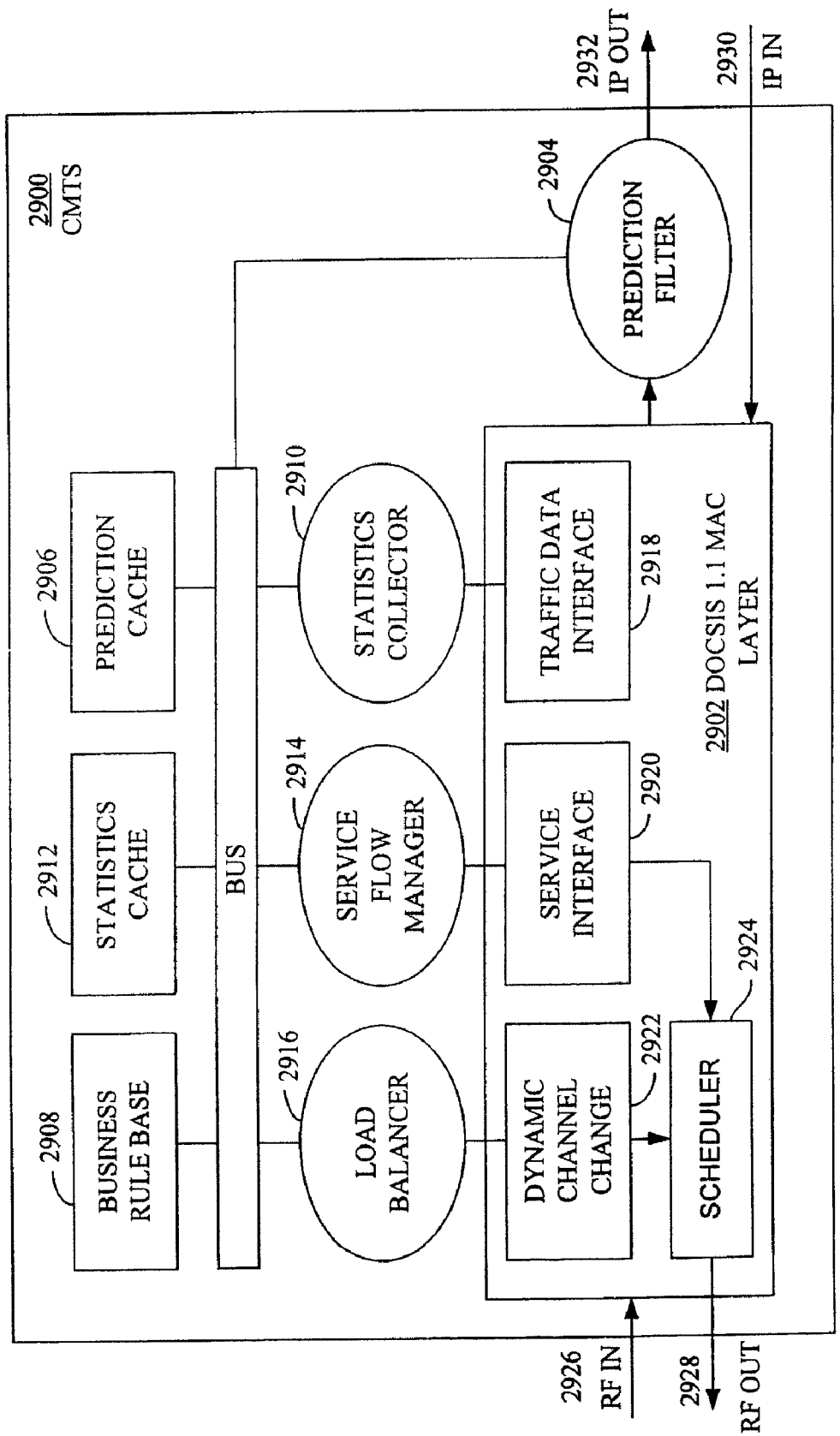
FIG. 29 CABLE MODEM TERMINATION SYSTEM (CMTS)

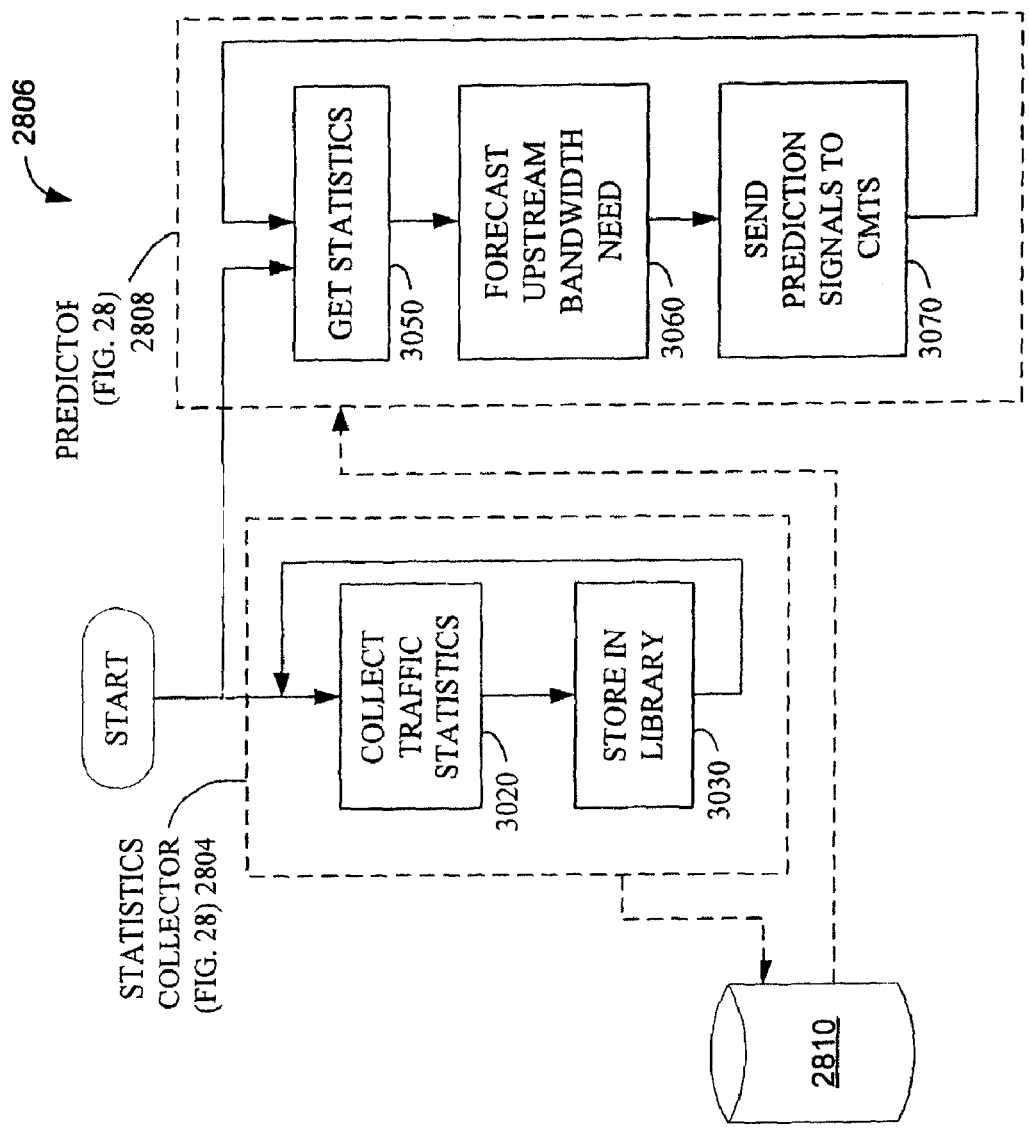
FIG. 30 LOOKAHEAD SCHEDULING FOR CABLE MODEM (CM)

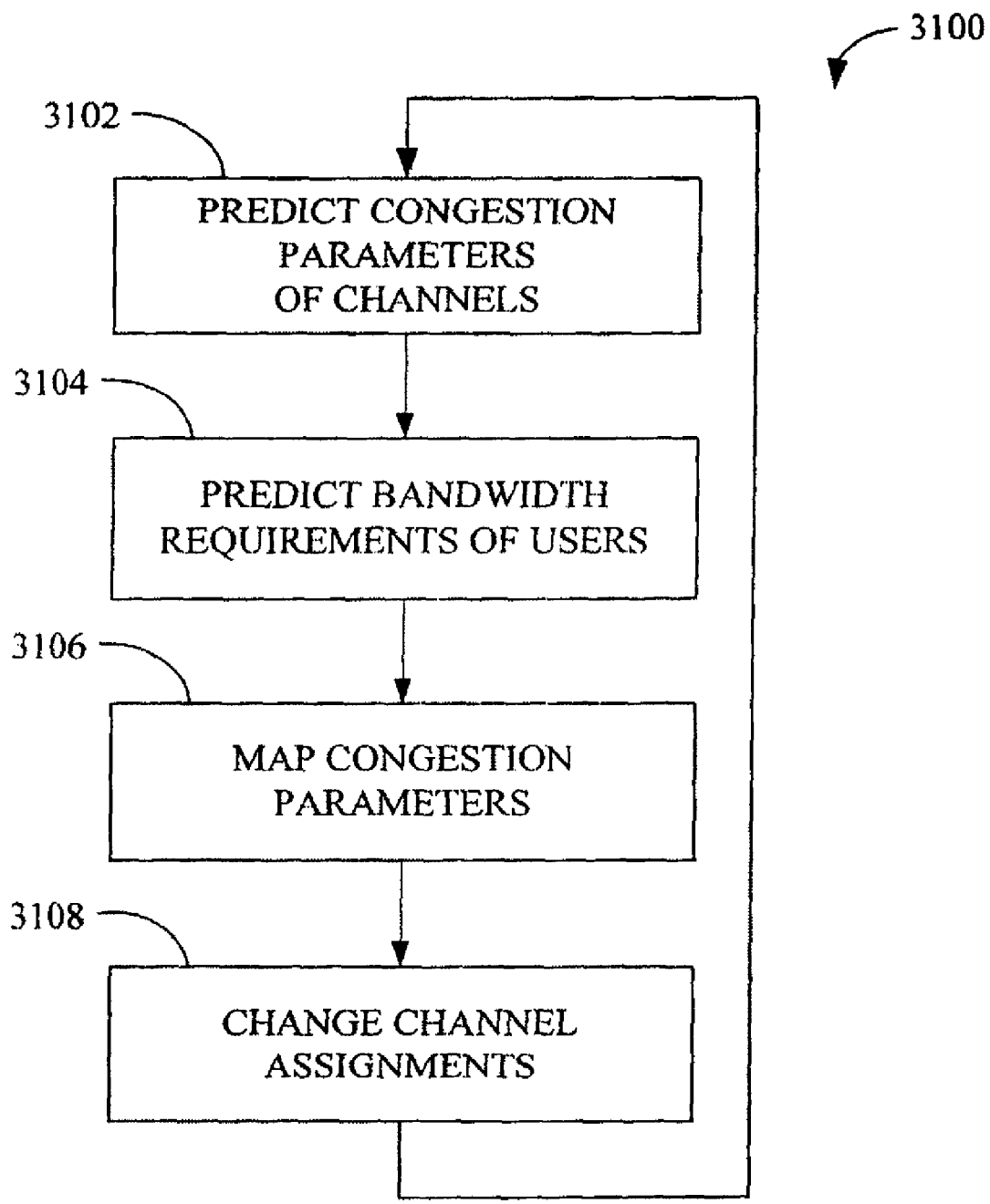
FIG. 31 LOAD BALANCING

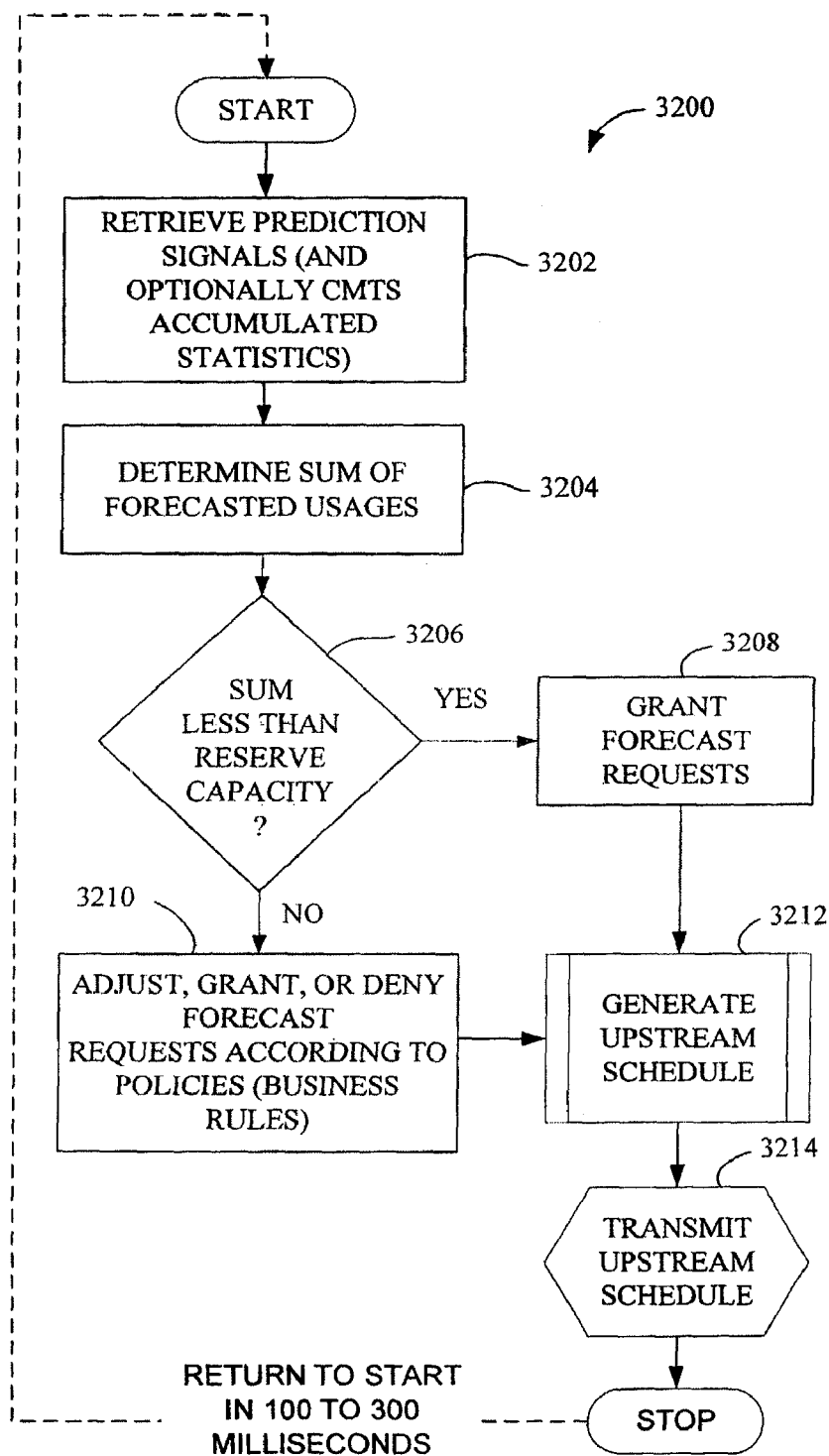
FIG. 32 PREDICTIVE ADMISSION CONTROL

APPARATUS AND METHODS FOR INCORPORATING BANDWIDTH FORECASTING AND DYNAMIC BANDWIDTH ALLOCATION INTO A BROADBAND COMMUNICATION SYSTEM

CROSS REFERENCES TO RELATED APPLICATIONS

This application is a divisional of U.S. patent application Ser. No. 10/410,878, entitled "Apparatus and Methods for Incorporating Bandwidth Forecasting and Dynamic Bandwidth Allocation into a Broadband Communications System," filed Apr. 9, 2003 now U.S. Pat. No. 7,499,453. Furthermore, this application claims priority under 35 U.S.C. 119(e) to the benefit of the filing date of the McKinnon et al. U.S. Provisional Patent Application Ser. No. 60/371,213, filed on Apr. 9, 2002, which is incorporated herein by reference and made a part hereof. This application is a Continuation in Part of and claims priority under 35 U.S.C. Section 120 to the benefit of the filing date of the McKinnon et al. U.S. Non-Provisional patent application Ser. No. 09/800,674 filed Mar. 7, 2001 now U.S. Pat. No. 6,845,106, entitled "Allocating Access Across a Shared Communications Medium," which is incorporated herein by reference and made a part hereof and which claims priority under 35 U.S.C. 119(e) to the benefit of the filing date of the McKinnon et al. U.S. Provisional Patent Application Ser. No. 60/205,963 filed on May 19, 2000, which is incorporated herein by reference and made a part hereof. This application incorporates herein by reference and makes parts hereof each of: the McKinnon et al. U.S. Non-Provisional patent application Ser. No. 09/800,717 filed Mar. 7, 2001, entitled "Monitoring and Allocating Access Across a Shared Communications Medium"; the McKinnon et al. U.S. Non-Provisional patent application Ser. No. 09/800,861 filed Mar. 7, 2001, entitled "Allocating Access Across a Shared Communications Medium in a Carrier Network"; the McKinnon et al. U.S. Non-Provisional patent application Ser. No. 090/801,155 filed Mar. 7, 2001, entitled "Computerized Method for Allocating Access Across a Shared Communications Medium"; and the McKinnon et al. International Patent Application Serial No. PCT/US01/07209 filed Mar. 7, 2001, entitled "Allocating Access Across Shared Communications Medium."

FIELD OF THE PRESENT INVENTION

The present invention generally relates to allocating access across a shared communications medium and, in particular, incorporating bandwidth forecasting and dynamic bandwidth allocation on a shared communications medium of a Carrier Network.

BACKGROUND OF THE PRESENT INVENTION

As used herein, a "Carrier Network" generally refers to a computer network through which users (such as homes and businesses) communicate with various service providers. The Carrier Network extends from the location of each user to an intermediate switched/routed network (hereinafter "Intermediate Network"). The service providers, in turn, are connected to the Intermediate Network, either directly or indirectly via the Internet, for communications with the users. The Carrier Network is maintained by a "Carrier," which also may serve as a service provider for certain services. For example, a Carrier or a related entity may serve as an Internet service provider (ISP).

Two prevalent types of Carrier Networks include a "Shared Access Carrier Network," in which data of multiple users are conveyed together over a shared communications medium between the users and the Intermediate Network, and a "Dedicated Connection Carrier Network," in which data of each user are conveyed alone between the user and the Intermediate Network and are not combined with data of other users. One of the most prevalent Shared Access Carrier Networks today is found in the Data-Over-Cable (DOC) Network, which includes the traditional network constructed from coaxial cable and the hybrid fiber coaxial (HFC) network constructed with both fiber optical cabling and coaxial cable. Other Shared Access Carrier Networks include wireless and digital subscriber line (xDSL) networks (the xDSL lines typically being aggregated onto an oversubscribed backhaul trunk into the Intermediate Network, with the trunk defining the shared communications medium).

When a user registers a cable modem to use a DOCSIS compliant network, a series of handshaking steps are executed during which the modem identifies itself, the network designates (among other parameters) the level of service and frequency (channel) that the cable modem may use. After registration is complete, the cable modem (CM) will periodically or occasionally request the creation of service flows and, if allowed, the allocation of bandwidth to transmit data to a cable modem termination system (CMTS) in the upstream direction. The requests of CMs are granted by the CMTS which operates on any conventional methodology to determine how to allocate bandwidth on approximately a "per milli-second" basis.

For example, with regard to DOC Networks, and with reference to FIG. 1 wherein a conventional DOC Network 40 is illustrated, data packets are transmitted in a downstream direction from a cable modem termination system (CMTS) 30, which is located in a headend 36 (or distribution hub) of a Carrier, over a coaxial cable 32 to respective cable modems (CMs) 34 of users. All of the CMs 34 are attached by the coaxial cable 32 to the CMTS 30 in an inverted tree configuration, and each CM 34 connected to the coaxial cable 32 listens to all broadcasts from the CMTS 30 transmitted through the coaxial cable 32 for data packets addressed to it, and ignores all other data packets addressed to other CMs 34.

The headend 36 in the DOC Network 40 includes a plurality of CMTSs, with each CMTS supporting multiple groups of CMs each connected together by a respective coaxial cable. Each such group of CMs connected to a CMTS defines a Shared Access Carrier Network, with the coaxial cable in each representing the shared communications medium. This arrangement of a group of CMs connected to a CMTS by a coaxial cable is referred to herein as a "Cable Network." Accordingly, the DOC Network 40 includes a plurality of Cable Networks 38 originating from CMTSs at the headend 36 of the Carrier, with a particular Cable Network 38 being illustrated in an expanded view in FIG. 1. The DOC Network 40 also includes multiple headends 36,64,66.

Downstream data transmission typically occurs in a signal frequency range of 91 to 857 megahertz (MHz). This frequency range is divided into discrete channels each separated by a nominal channel spacing of 6 MHz. A cable modem tunes to an assigned channel and is theoretically capable of receiving data in the downstream direction with a maximum data rate of 30-40 megabits per second (Mbps). Upstream data transmission from the CMs 34 to the CMTS 30 typically occurs in a signal frequency range of 5 to 42 MHz Data packets are transmitted in the upstream direction by the CMs at a frequency and modulation type (i.e., QPSK or QAM) specified by the CMTS. Upstream transmission employs a time division multiple access scheme and allows a maximum connection speed of 1.5 to 10 Mbps.

Many users typically share a channel and their interests compete for the bandwidth of the channel. The full bandwidth available to the multi-channel network for data transmission comprises the sum of bandwidths of the individual channels. A particular channel is congested when overcrowding occurs causing degraded performance to a user on that channel. A data packet typically waits in a CM 34 buffer for an allocated time slot for transmission to the CMTS 30 on the assigned channel. A CM assigned to a congested channel can reach a full-buffer state, wherein data awaiting upload transmission fills the buffer. While the buffer is full, any new data for transmission to the CMTS, for example, data provided by a computer 44 for upload, may be dropped. In other words, the new data may be lost without being stored in a buffer and without being transmitted to the CMTS.

In contrast to the Shared Access Carrier Network, a user in the Dedicated Connection Carrier Network establishes a dedicated connection directly with the Intermediate Network for the transfer of data directly there between, and no data of other users travel over the dedicated connection. Examples of a dedicated connection are shown for comparison in FIG. 1 and include a connection established by a telephony modem 74 and a connection established by an ISDN modem 76. Both downstream and upstream connection speeds in a Dedicated Connection Carrier Network range from a maximum of 53 kbps in a telephony modem connection to a maximum of 128 kbps in a basic rate interface ISDN connection.

Connection speeds and, more importantly, throughput rate—the amount of data actually transmitted successfully in a given time interval—are important in minimizing downtime that users spend waiting for HTML documents to download from the Web. A Shared Access Carrier Network is considered superior to a comparable Dedicated Connection Carrier Network because the maximum instantaneous connection speed offered by the Shared Access Carrier Network is greater. A Shared Access Carrier Network is considered "comparable" to a Dedicated Connection Carrier Network where the entire bandwidth over a shared communications medium of the Shared Access Carrier Network equals an aggregate bandwidth that is divided between and dedicated to users in a Dedicated Connection Carrier Network. Accordingly, Shared Access Carrier Networks are able to offer significantly faster downloads of web documents, emails, and file transfers that are not considered available in Dedicated Connection Carrier Networks.

Furthermore, new multimedia applications and Internet services, such as voice and video communications via the Internet, now are offered which require even greater throughput rates for acceptable levels of service than that of the traditional Internet services, i.e., throughput rates greater than that required for acceptable text-based Web browsing, file transferring, and email communication. It is believed that these new multimedia applications and Internet services cannot adequately be provided for over Dedicated Connection Carrier Networks and that, consequently, Shared Access Carrier Networks ultimately will prevail as the predominant type of Carrier Network for Internet access by users.

Of course, the actual throughput rates experienced by a particular user rarely, if ever, will equate to the maximum connection speeds of which the Shared Access Carrier Network is capable because of the shared nature of the communications medium. For example, in a Cable Network the total bandwidths available over the shared cable in the downstream and upstream directions, which determine the respective maximum connection speeds, must be shared among all of the users communicating at a given time. Thus, rarely will a single user have available for use a large portion of the entire bandwidth in a particular direction. Further, as a Carrier adds users to the Cable Network, the actual downstream and upstream bandwidths available to the user—and thus throughput rates of the user—generally will decrease. A Carrier therefore must be careful to draw a balance between the number of users connected to a Cable Network and the performance users experience communicating over the network.

Unfortunately, Shared Access Carrier Networks that have been established were designed to provide the traditional Internet services, and not the new multimedia applications and Internet services that require higher throughput rates for acceptable levels of service. Consequently, each balance previously struck by Carriers in establishing Shared Access Carrier Networks was based on considerations of the throughput rates required for the traditional Internet services, and user throughput rates currently experienced by users in such networks are believed to fall short of acceptable quality of service (QoS) standards believed required in a Carrier Network for the new multimedia applications and Internet services.

Additionally, with regard to new Shared Access Carrier Networks that are being established, considerations of the new multimedia applications and Internet services tend to reduce the number of users that a Carrier now can reasonably expect to connect to the shared communications medium before degrading the performance levels of the new multimedia applications and Internet services. The balance is being shifted towards less users per shared access medium in exchange for higher throughput rates and, thus, higher QoS standards.

In an attempt to avoid reducing the number of users, it has been proposed, at least in DOC Networks, to discriminate between the traditional Internet services and the new multimedia applications and Internet services with regard to priority of data packet transmissions. In particular, the generally accepted standard in the United States governing communication protocols over cable is DOCSIS version 1.0, which was ratified by the International Telecommunication Union in March of 1998. DOCSIS stands for "Data Over Cable Service Interface Specifications." When DOCSIS 1.0 was developed, it was generally believed that, in view of the "fast" connection speeds of Cable Networks, the provision of bandwidth on a best effort basis would be sufficient to meet all user requirements. DOCSIS 1.1 standards are detailed in Radio Frequency Interface Specification SP-RFIv1.1-109-020830, and DOCSIS 2.0 standards are detailed in Radio Frequency Interface Specification SP-RFIv2.0-103-021218, each of which is hereby each incorporated herein by reference and made a part hereof. These two specifications are available to the public from Cable Television Laboratories, Inc., 400 Centennial Parkway, Louisville, Colo. 80027-1266 USA.

Accordingly, each user subscribed to receive network access pursuant to a service level agreement (SLA) which provided for network access (or bandwidth in Cable Networks) only on a best effort basis. Now, in an effort to address the foreseen ever-increasing demand for higher throughput rates, DOCSIS version 1.1 has been proposed, in accordance with which each data packet transmitted over a DOC Network now must include a classification designation for prioritization purposes by network equipment. Subsequently, data packets representing voice or video, for example, now can be identified and given priority transmission over data packets representing email, file transfers, and text-based Web documents. A benefit of such flow classification is that, while overall bandwidth generally available to a user may otherwise remain unchanged, throughput rates of data for voice and video now may be provided at a higher rate than throughput rates of data for the traditional Internet services, thereby increasing the performance of voice and video applications and services while at least maintaining the traditional number of users connected to a Cable Network.

A disadvantage of the revisions to DOCSIS 1.1 is that the revisions do not enhance established Cable Networks constructed with only DOCSIS 1.0 compliant equipment, as such equipment does not support the added functionality of DOCSIS 1.1 so as to distinguish between data packets.

More broadly, another disadvantage of the classification of data packets into Internet Protocol (IP) flows based on the services represented by the data packets is that such classification discriminates against users who do not utilize multimedia applications and services receiving the prioritized transmissions. At least for some extensive users of the traditional Internet services, some degradation in performance may be noticed by lower classification of their data packets, particularly if the user engages in, for example, web hosting. While the transmissions of data packets for documents, files, and emails are not as time-sensitive as data packets for voice and video, increased data packet latency for documents, files, and emails, even if incrementally small, nevertheless will result in service degradation for large or numerous documents, files, and emails.

Ultimately, a basic limitation of a cable network is that the separate interests of multiple users simultaneously compete for access to limited bandwidth on a shared medium. As a result, DOC networks are vulnerable to network congestion that can be causative of degradations in performance being experienced by the users. Improvements in bandwidth management are needed to combat the issue of congestion within existing cable networks.

Accordingly, a need exists for a method and apparatus that will manage limited bandwidth on a shared medium by monitoring and dynamically allocating bandwidth according to predicted needs of both individual users and aggregates of users. The problems of network congestion may require solutions that outpace the computing time required in bandwidth-allocation software applications.

Furthermore, needs exist for a method and apparatus for improved scheduling of bandwidth allocation on a channel used by multiple users. A need also exists for an improved method for making channel assignments to achieve load balancing among channels.

SUMMARY OF THE PRESENT INVENTION

The present invention relates to methods, systems, and apparatus for providing network access to a shared access communications medium for a plurality of users.

The method broadly includes the steps of (a) conducting predictive admission control by arbitrating user requests for access to the shared medium based on predicted aggregate demands, (b) conducting lookahead scheduling for use in making user channel assignments by forecasting schedule transmission opportunities one or more channels of the shared medium, and (c) balancing load by making channel assignments such that a plurality users are each assigned a respective channel of the shared medium based upon a predicted need.

Optionally, the method can include that congestion parameters are predicted for each channel of the shared medium, that bandwidth requirements are predicted for each user, and that congestion parameters for each channel are mapped to a respective congestion measure using a mathematical function that takes into account packet loss rate, packet delay, packet delay jitter, and available capacity.

In accordance with some aspects of the present invention, a system for controlling network access to a shared communications medium between a plurality of users includes a load balancer operative for allocating users between channels of the shared medium based upon a predicted need. A predictive admission control component arbitrates user requests for access to the shared communications medium in response to predicted aggregate demands, and a lookahead scheduler forecasts schedule transmission opportunities on a given channel. In some aspects of the system, the load balancer changes the channel of communications of a selected user to a channel having a lighter load, and is further operative and predicts congestion parameters for each channel.

In some aspects, the invention includes a cable modem having a media access control (MAC) layer, communication components, a statistics collector for collecting statistical traffic information, a lookahead scheduler for forecasting schedule transmission opportunities, and a predictor responsive to the statistical information collected by the statistics collector, for generating prediction signals representative of future bandwidth requirements.

In other aspects, the invention includes a cable modem termination system (CMTS) for making channel assignments to users and to load-balance a plurality of channels on a shared access communications medium. The CMTS includes a prediction filter for receiving prediction signals from cable modems, a prediction cache storing prediction signal information, a media access control (MAC) layer, a load balancer for making channel assignments such that a plurality users are each assigned a respective channel of the shared medium based upon the prediction signals and one or more business rules for bandwidth allocation.

In some aspects the invention includes a data communications system for controlling network access of a plurality of users to a shared access communications medium. The system includes one or more cable modems and a CMTS. The CMTS includes a media access control (MAC) layer; a statistics collector and a statistics cache statistical traffic flow information, a prediction filter for receiving prediction signals from one or more cable modems, a service flow manager for dynamically adjusting quality of service (QoS) parameters, and a load balancer for dynamically making channel assignments such that one or more users are each assigned a respective channel of the shared medium, and a business rule base for storing policies relating to control of access to the shared medium and providing the policies to the service flow manager and load balancer.

As used herein, a "bandwidth allowance" represents a respective maximum level of network access that will be made available to a user class or to a user during a particular time interval, and does not necessarily represent the level of network access that will be utilized by the user class or user during such time interval.

As used herein, a "user class" is intended to refer to a grouping of users who compete for access across a shared communications medium and who have some characteristic in common. The characteristic may, for example, be that the users are customers who receive Internet service over the shared communications medium from the same service provider. The characteristic also may, for example, be that the users each subscribe to receive a particular level of network access across the shared communications medium, or that the users receive the same level of a particular service that is provided across the shared communications medium. Furthermore, a user class is a grouping of users to which, collectively, a determined amount of bandwidth is allocated as opposed to other user classes. In this regard, users that are not classified are considered to be part of a default user class having in common that fact that no other classification applies to them. Accordingly, all users of a shared communications network can be classified.

BRIEF DESCRIPTION OF THE DRAWINGS

Further features and benefits of the present invention will be apparent from a detailed description of preferred embodiments thereof taken in conjunction with the following drawings, wherein like elements are referred to with like reference numbers, and wherein:

FIG. 27 illustrates a shared access communications medium network of the present invention;

FIG. 28 shows a block diagram of a cable modem according to an embodiment of the present invention;

FIG. 29 shows a block diagram of a cable-modem termination system according to an embodiment of the present invention;

FIG. 30 illustrates a flowchart of a method for a cable modem to provide lookahead scheduling according to an aspect of the invention;

FIG. 31 illustrates a flowchart of a method for balancing load on a network by making channel assignments to users according to an aspect of the invention; and FIG. 32 illustrates a flowchart of a method for conducting predictive admission control according to an aspect of the invention.

DETAILED DESCRIPTION OF PREFERRED EMBODIMENTS

In the following detailed description, numerous specific details are set forth with regard to preferred embodiments of the present invention in order to provide a thorough understanding of the present invention; however, it will be apparent to ordinary artisans that the present invention may be practiced without all of these specific details. Well-known structures and devices also are shown in block diagram form, the specific details of which are not considered a necessary part of the present invention. Furthermore, as will become apparent to ordinary artisans, the present invention may be embodied in or performed by hardware, firmware, or software, or various combinations thereof.

Figure 1:
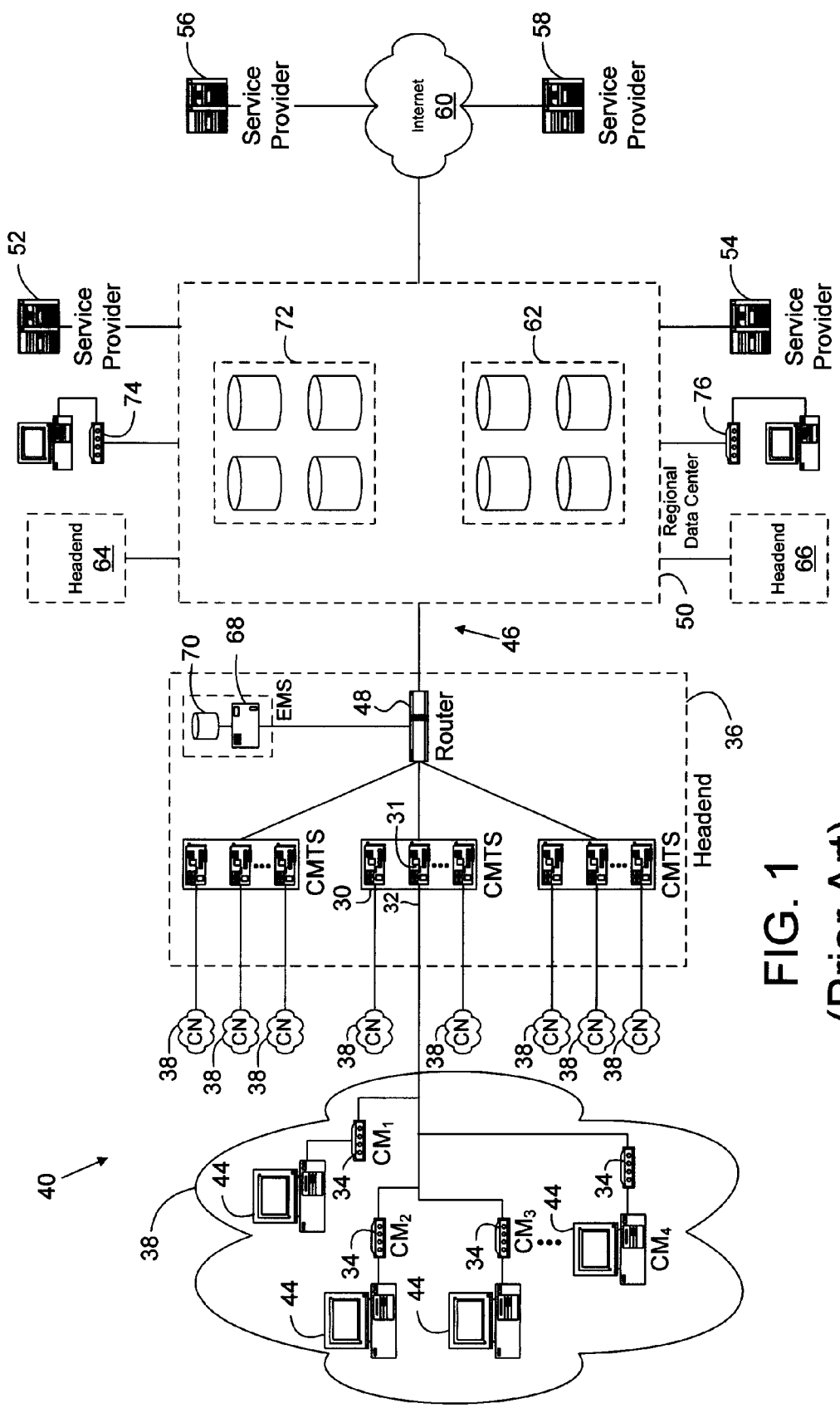
FIG. 1 illustrates a conventional DOC Network.

As described above, a conventional DOC Network 40 is shown in FIG. 1 and includes a plurality of Cable Networks 38, with a particular Cable Network 38 being illustrated in an expanded view and comprising a group of CMs 34, each connected to a computer 44 representing a user. Additionally, as used herein, "user" includes not only a person who interacts with a computer 44, but any additional persons who also interact with the same computer 44, as well as any group of persons all of whom interact with computers attached either to the same CM 34 or to the same computer 44 which, itself, is attached to a CM 34. While not shown, such additional arrangements are well known in the art.

The CMs 34 are connected by a coaxial cable 32 with a CMTS 2900 and, specifically, to a card 31 mounted within the CMTS. The CMTS may includes a plurality of cards, with each card supporting a group of CMs connected thereto in an inverted tree configuration to define a Cable Network 38. Furthermore, each CMTS conventionally supports up to 1,500 users, although recent CMTSs have been introduced that support up to 15,000 users.

Each Cable Network 38 defines a Shared Access Carrier Network, wherein data packets of or for respective users are conveyed together through a shared coaxial cable. For instance, data packets (or frames) intended for delivery to a particular one of computers 44 are transmitted by the CMTS 30 downstream over the coaxial cable 32 to all of the CMs 34 at a channel (frequency) assigned to the particular CM 34 of the intended recipient computer. Conversely, data packets intended for delivery to the CMTS 30 and beyond are transmitted by a CM 34 upstream to the CMTS 30 over the coaxial cable 32.

The Cable Network 38 shown in expanded view in FIG. 1 is a traditional all coaxial cable network. The other Cable Networks 38 collectively include both traditional all coaxial cable networks as well as HFC networks.

The CMTS 30 transmits and receives data packets between the Cable Networks 38 and an Intermediate Network 46, which begins with a router 48 in the headend 36, and includes switched and routed network equipment at a Regional Data Center 50 that provides connectivity to service providers 52,54,56,58, either directly or through the Internet 60. In this regard, during user communications the router 48 conveys data packets from the CMTS 30 to the Regional Data Center 50 of the DOC Network 40 and, conversely, routes data packets received from the Regional Data Center 50 to the appropriate CMTS for delivery to a particular user. Data packets that are conveyed to the Regional Data Center 50, in turn, are directed on to an appropriate service provider 52,54 directly connected to the Regional Data Center 50, or to an appropriate service provider 56,58 indirectly connected to the Regional Data Center 50 via the Internet 60. Alternatively, data packets from users are conveyed to a server of an application server group 62 of the Regional Data Center 50, which includes, for example, servers supporting Web hosting, news, chat, SMTP, POP3, Proxy, cache and content replication, and streaming media.

The Cable Networks 38 stemming from headend 36 are maintained by a Carrier which also may maintain the Regional Data Center 50 as well as serve as a service provider. Moreover, the Carrier may maintain the Cable Networks of additional headends 64,66, or of only one or more of the headends 64,66. In any event, the Cable Networks that are maintained by the Carrier are administered on a daily basis through an element management system (EMS) 68. The EMS 68 comprises an operations system designed specifically to configure and manage CMTSs and associated CMs, and includes a CM database 70. Operational tasks performed by the EMS 68 include provisioning, day-to-day administration, and testing of various components of each CMTS. The EMS 68 typically is located at a central network operations center of the Carrier, but may be collocated at the headend 36 of the Carrier as shown in FIG. 1.

The DOC Network 40 is managed through a control plane server group 72 typically located at the Regional Data Center 50. The control plane server group 72 includes the usual servers necessary to run the DOC Network 40, such as user authorization and accounting servers, log control servers (Syslog), IP address assignment and administration servers (DHCP, TFTP), domain name servers (DNS), and DOCSIS control servers.

For purposes of comparison, two dedicated connections also are shown in FIG. 1, wherein a telephony modem 74 and an ISDN modem 76 are connected directly to the Intermediate Network 46 at the Regional Data Center 50. As will be immediately apparent, data conveyed over each dedicated connection is between a single user and the Intermediate Network 46, and is not combined with data of other users over a shared communications medium as in each Cable Network 38.

As is common in conventional Cable Networks 38 such as those shown in the DOC Network 40 of FIG. 1, when a CM comes online the CM is assigned a configuration file which, inter alia, sets a constant limit on the bandwidth that can be utilized in the downstream direction by the CM during any particular interval of time, and sets a constant limit on the bandwidth that can be utilized in the upstream direction by the CM during any particular interval of time. The configuration file also includes other parameters, such as the IP address for the CM.

The configuration file for each CM conventionally is obtained by the CM when first brought online, or when the CM is reset. The upstream and downstream bandwidth limits are predetermined by the Carrier or other appropriate entity, the determination of which is based on the expected number of users to be serviced by the particular Cable Network 38 to which the CM belongs.

With particular regard to data transmissions in the downstream direction, when the bandwidth limit is reached in receiving data within a particular time interval, the CM transmits a signal to the router 48 to cease further data forwarding for the remainder of the time interval. Thereafter, whereas any data received by a CMTS is relayed on to the CM as the data is received, any additional data received by the router 48 during the remainder of this time interval is stored for later transmission in a buffer up to a threshold limit and, thereafter, any further data received within the time interval is dropped.

With regard to data transmissions in the upstream direction, when the CM registers with the CMTS following receipt by the CM of its configuration file, the CM informs the CMTS of the constant bandwidth limit to be applied to upstream transmissions from the CM. Then, actual requests for bandwidth (i.e., requests for timeslots) for transmission of data in the upstream direction are submitted regularly by each CM to the CMTS. In response to the submissions, the CMTS schedules timeslots in a particular time interval to the CMs for exclusive transmission of data within each timeslot by a respective CM. However, the CMTS does not grant an amount of bandwidth (by assigning too many timeslots) to a particular CM that would exceed the constant bandwidth limit for the particular CM.

The timeslots are assigned to requesting CMs based on an established assignment policy. For example, timeslots may be assigned by the CMTS on a first-in-first-out basis, or timeslots may be assigned equally to the CMs that request bandwidth within a particular window of time. The requesting CMs also may be prioritized by the CMTS for assignment of the timeslots.

Figure 2:
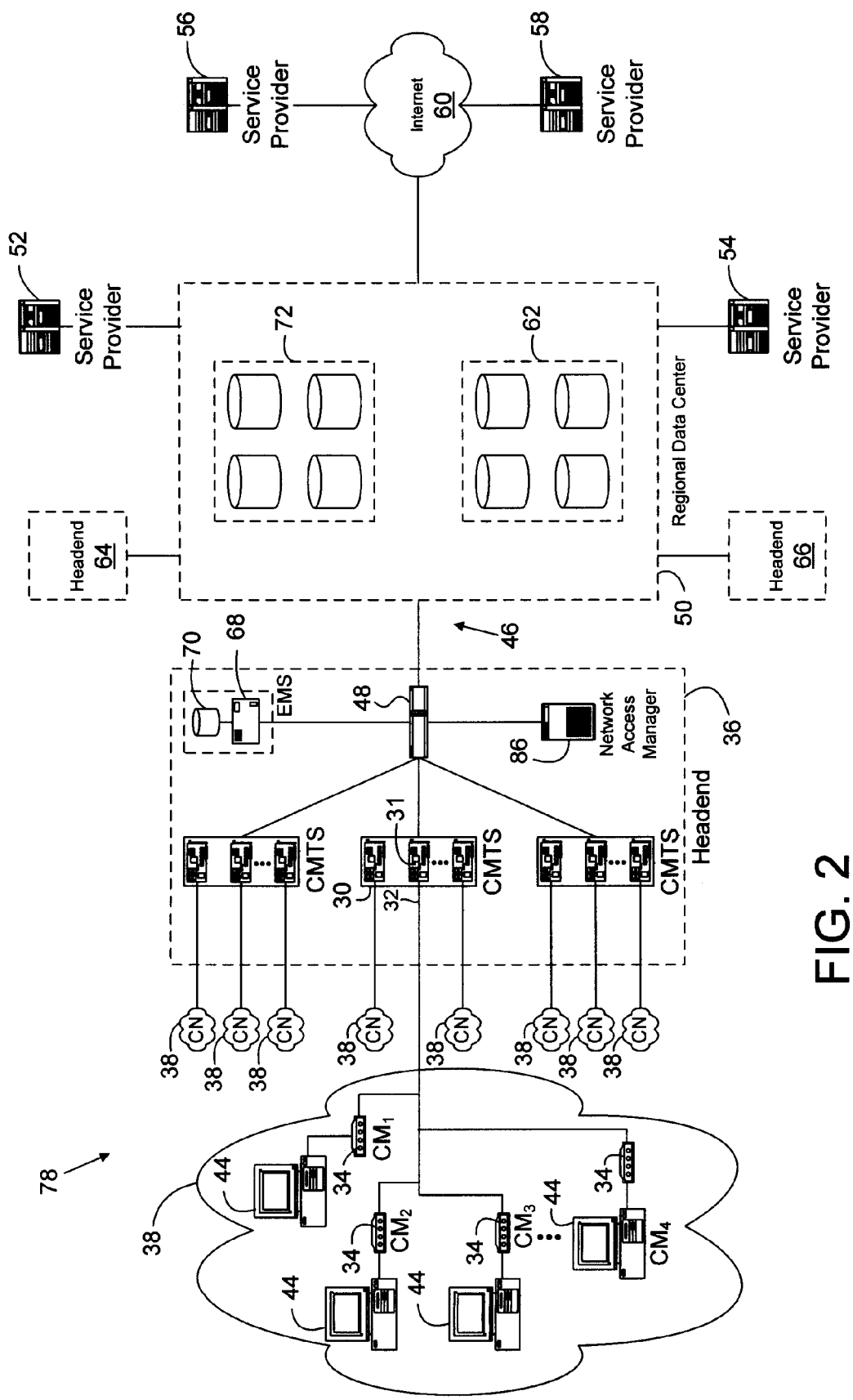
FIG. 2 illustrates a first DOC Network.
Figure 3:
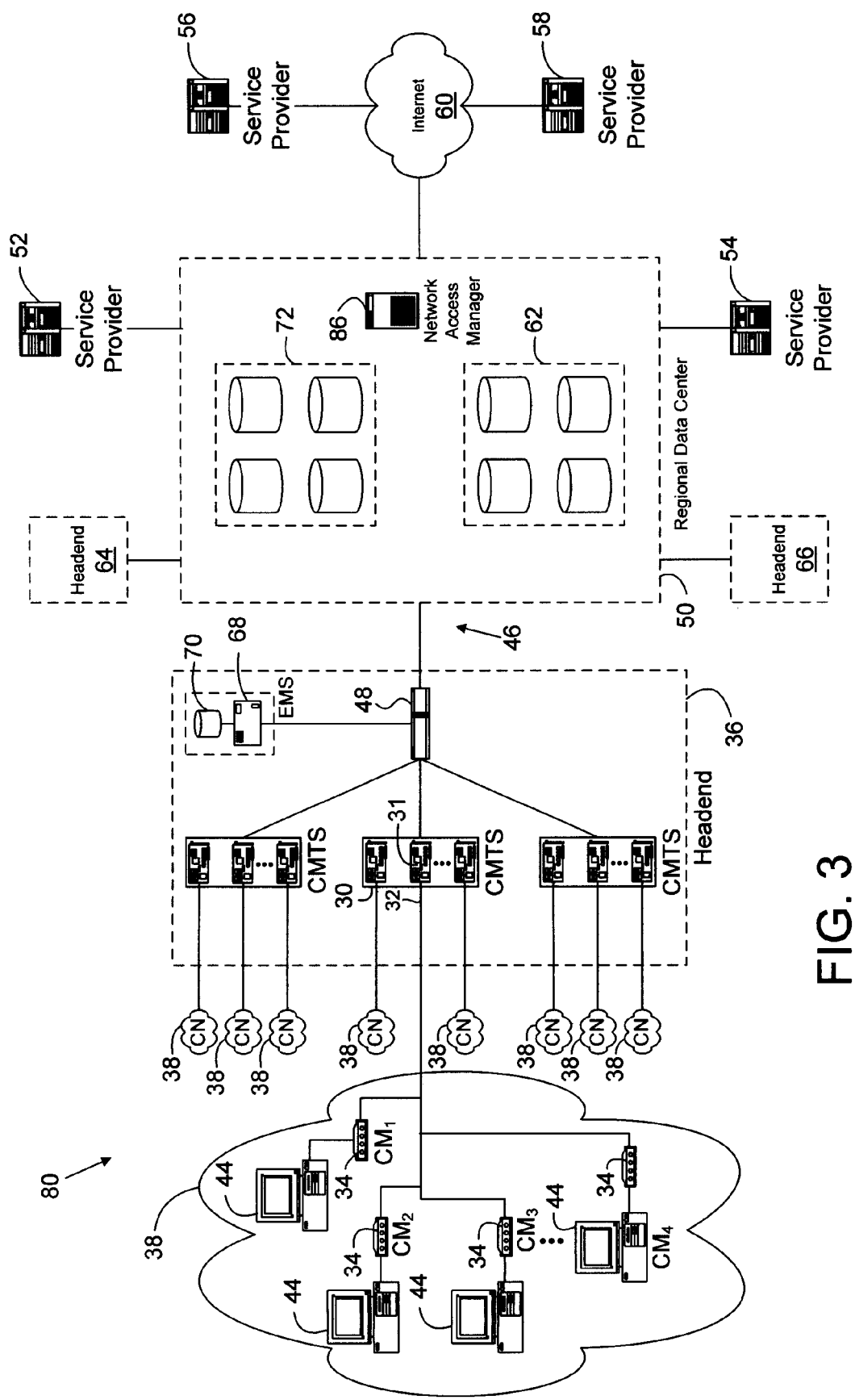
FIG. 3 illustrates a second DOC Network.
Figure 4:
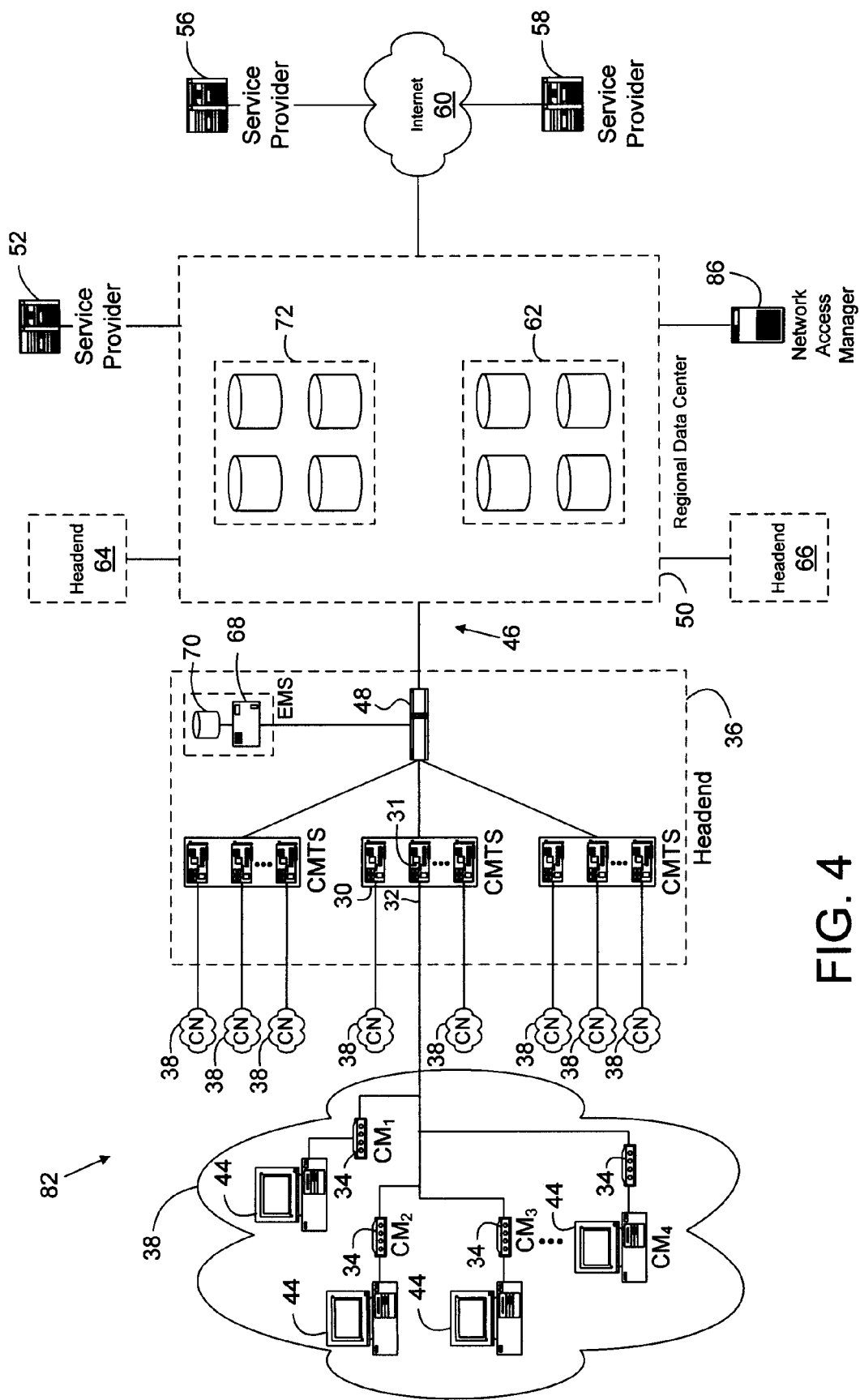
FIG. 4 illustrates a third DOC Network.
Figure 5:
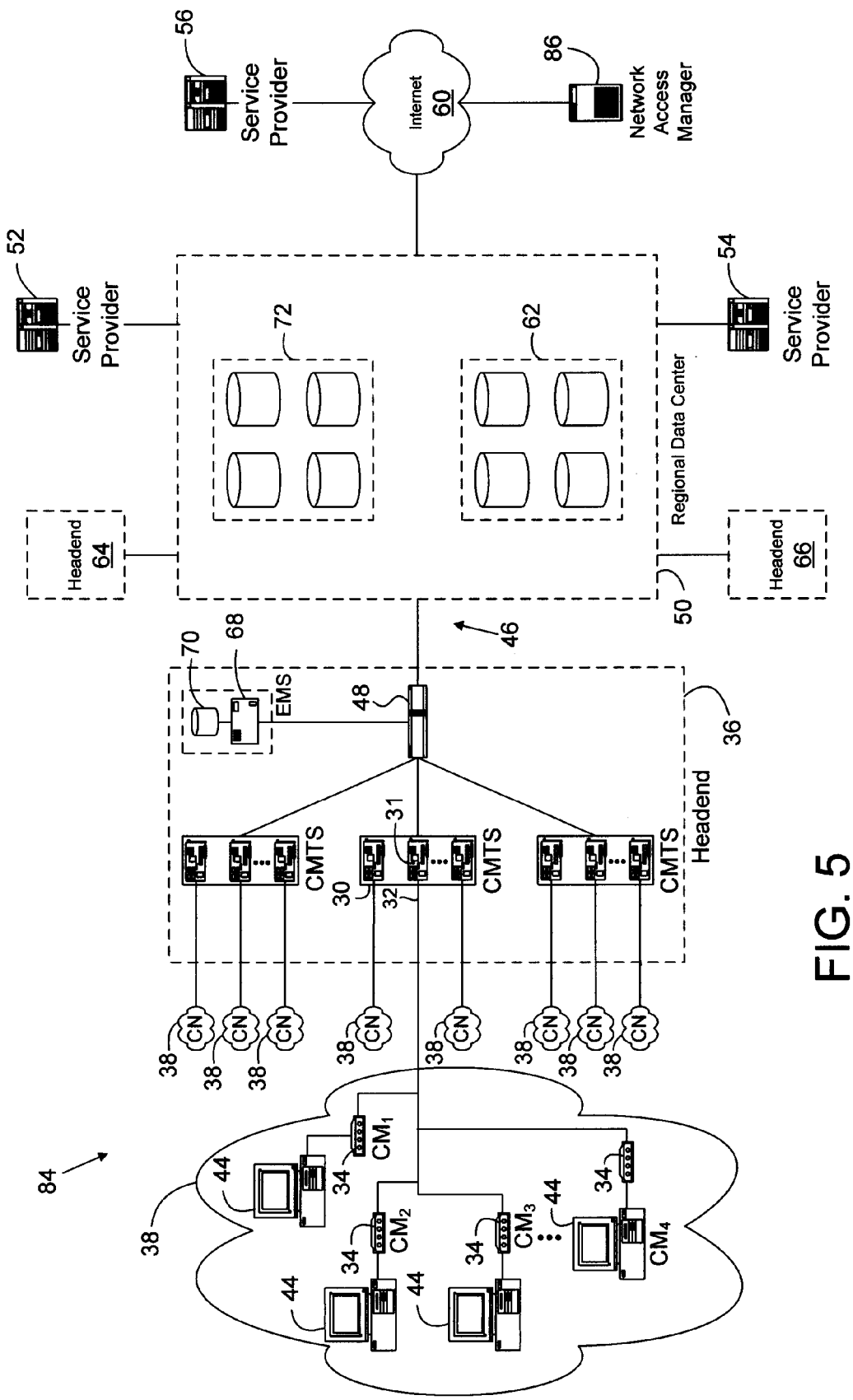
FIG. 5 illustrates a fourth DOC Network.

Preferred embodiments 78, 80, 82, 84 of a DOC Network in accordance with the present invention are shown, respectively, in FIGS. 2-5, wherein each includes a "network access manager" 86 in accordance with the present invention. In FIG. 2 the network access manager 86 is located in the headend 36 of the DOC Network 78, in FIG. 3 the network access manager 86 is located at the Regional Data Center 50 of the DOC Network 80, and in FIGS. 4-5 the network access manager 86 is remotely located, but is disposed for communication with the respective DOC Network 82,84, either directly as shown in the DOC Network 82 of FIG. 4, or indirectly via the Internet 60 as shown in the DOC Network 84 of FIG. 5.

The network access manager 86 preferably comprises a hardware component having software modules for performing methods in accordance with the present invention. For commercial purposes, especially in enhancing existing DOC Networks, preferably the network access manager 86 is self-contained and need only be connected in communication with the DOC Network to operate correctly. In a DOC Network that is being upgraded or established, preferably the software modules are distributed within the DOC Network itself and may or may not include any additional hardware components such as the network access manager 86. For example, the software modules may be incorporated into the EMS, CMTS, and control plane server group of a DOC Network, thereby avoiding the expense of additional computer hardware components.

Figure 6:
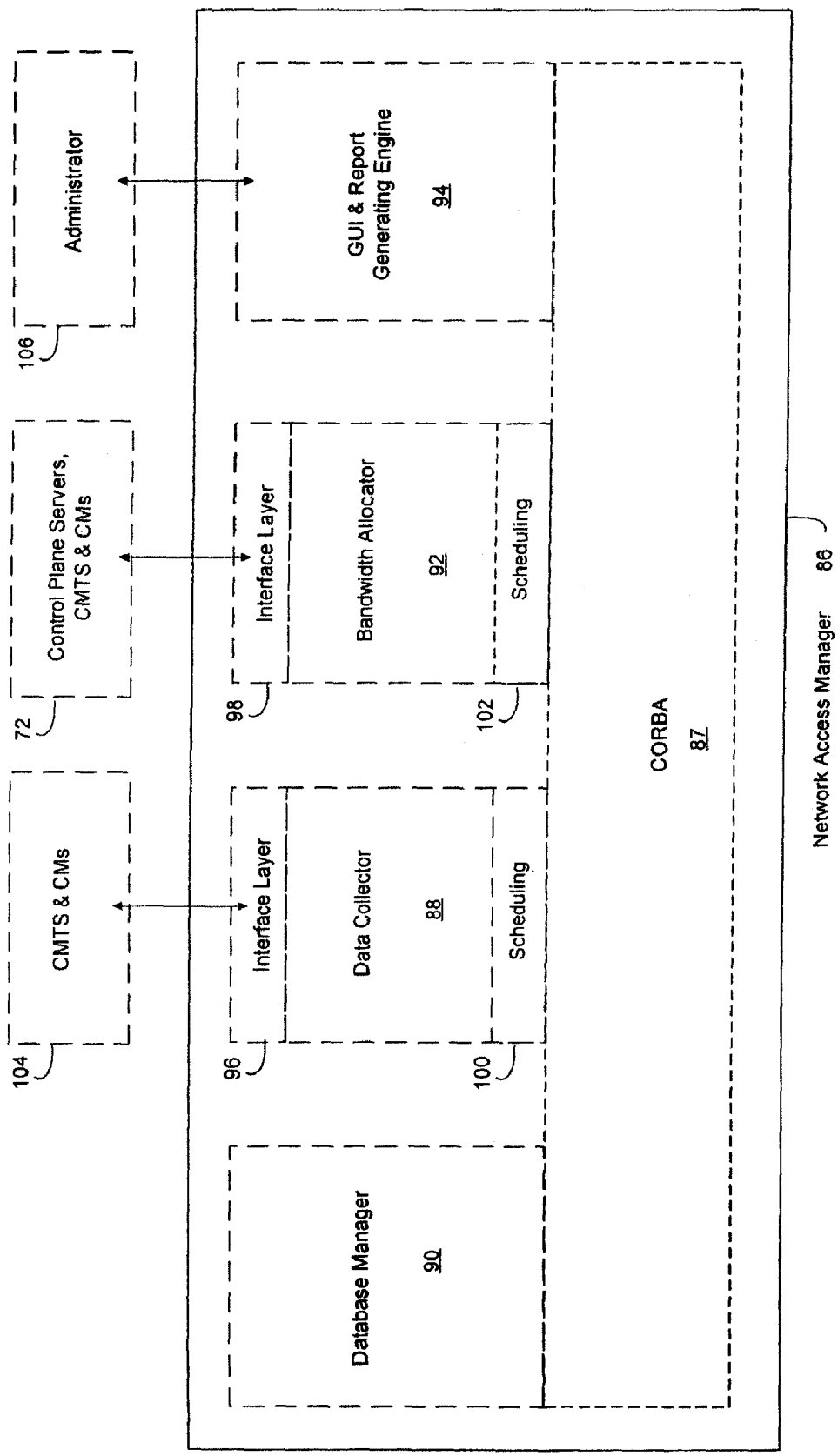
FIG. 6 illustrates a system architecture of software components of the DOC Networks of FIGS. 2-5.

In order to accommodate deployment and implementation of the present invention, the software modules preferably are designed as peers within a messaging infrastructure and, in particular, within a CORBA infrastructure 87, the system architecture of which is shown in FIG. 6. Due to the interoperability of the peers to the CORBA infrastructure 87, the separate modules readily call upon each other as described in detail below without regard to differences in location between the modules. Nevertheless, for ease of deployment, the network access manager 86 is best suited for deployment and implementation of the present invention in established DOC Networks, whether situated within the Intermediate Network as in FIGS. 2-3, or remotely situated as in FIGS. 4-5.

The software modules include a Data Collector 88, a Database Manager 90, Bandwidth Allocator 92, and GUI & Report Generating Engine 94. The Data Collector 88 and Bandwidth Allocator 92 each include an external system interface layer 96,98, respectively, that enables it to communicate with network equipment of a DOC Network. In the system architecture of preferred embodiments, the Data Collector 88 communicates with each CMTS and CMs of each Cable Network for which network access is managed by the network access manager 86, and the Bandwidth Allocator 92 communicates with the control plane server group 72 of the DOC Network as well as with the CMTS and CMs.

If a DOC Network is DOCSIS 1.0 compliant, then each external system interface layer 96,98 is a DOCSIS external system interface layer. If a DOC Network uses proprietary interface specifications, then each external system interface layer 96,98 is designed based on the proprietary interface specifications. In either case, however, the Data Collector 88 and Bandwidth Allocator 92 generally need not be modified; only the external systems interface layers 96,98 thereof need be changed based on the particularities of the DOC Network. Each of the Data Collector 88 and Bandwidth Allocator 92 also includes a scheduling element 100,102, respectively, that schedules the timing of actions and communications thereof with the network equipment of a DOC Network.

The GUI & Report Generating Engine 94 communicates with an Administrator 106 of the network access manager 86, preferably through a web server, whereby the Administrator 106 sets up and configures the network access manager 86 and accesses reports generated by the network access manager 86, such as graphs of bandwidth consumption and bandwidth requested per time interval for a user. The Administrator 106 may be the Carrier, a service provider, or some other entity, such as the entity managing the Regional Data Center 50 or a third-party responsible for maintenance of the network access manager 86.

The Database Manager 90 stores configuration and setup information received from the GUI & Report Generating Engine 94, as well as information processed by the Data Collector 88. The Database Manager 90 also provides information to the Bandwidth Allocator 92 and GUI & Report Generating Engine 94 as requested via the CORBA infrastructure 87.

Having now described in detail the structure of preferred DOC Networks 78,80,82,84, preferred methods of the present invention will be described with reference thereto.

In accordance with preferred methods of the present invention, network access usages of each user in the upstream and downstream directions are monitored through the Data Collector 88. Specifically, the Data Collector 88 issues queries to the CMTS and CM to which counter values of logical data units (LDUs) are returned for a user. Preferably, counter values are returned for the number of bytes and the number of data packets that are transmitted in both the upstream and downstream directions, the number of bytes and the number of data packets that are dropped in both the upstream and downstream directions, the number of bytes and the number of packets that are requested to be transmitted in the upstream direction, and the time for which the counter values are returned. Accordingly, as used herein the phrase "monitoring network access usage" is intended to refer to the collection of data representative of at least one of: (i) the number of LDUs that are transmitted in a particular direction across a shared communications medium; (ii) the number of LDUs that are dropped in transmitting in a particular direction across a shared communications medium; and (iii) the number of LDUs that are requested to be transmitted in a particular direction across a shared communications medium.

In a DOCSIS compliant DOC Network, the information is collected from the CMTS and CMs of a Cable Network via the simple network management protocol (SNMP). The counter values for bytes and data packets that are transmitted and that are dropped in the upstream direction from each CM, and the number of bytes and data packets that are requested to be transmitted in the upstream direction from each CM, are recorded by the CMTS in accordance with a management information base (MIB) of a DOCSIS compliant CMTS. Likewise, the counter values for bytes and data packets that are transmitted and that are dropped in the downstream direction from the CMTS to a CM are recorded by the CM in accordance with a MIB of a DOCSIS compliant CM. Both bytes and data packets are monitored since each data packet may vary in the number of bytes it contains.

The scheduling element 100 of the Data Collector 88 initiates the data collection from each CMTS and from the CMs connected thereto, preferably at different predetermined time intervals. For example, the data collection from a CMTS preferably occurs at five-minute intervals and data collection from the CMs connected thereto preferably occurs at thirty-minute intervals. The data collection from the CMs preferably is less often than the data collection from the CMTS in order to minimize consumption of bandwidth across the Cable Network that otherwise would be allocated to users.

When the counter values and time thereof are returned to the Data Collector 88, the Data Collector 88 calculates the change over time for each counter value to arrive at the average rates of bytes and data packets that are successfully transmitted, the average rates of bytes and data packets that are requested to be transmitted, and the average rates of bytes and data packets that are dropped. The respective rates and time intervals for the rates (as well as the counter values and time stamp data) are then communicated to the Database Manager 90, which stores the information in a user statistics table ("stats") for later use by the Bandwidth Allocator 92 and GUI & Report Generating Engine 94.

The Bandwidth Allocator 92 continually determines the network access—or bandwidth in a Cable Network—that may be utilized by each user class, and by each user within each class, over succeeding time intervals. Each allowance is determined by first allocating bandwidth to the user classes, and then allocating bandwidth to the users in each class, in accordance with one or more selected allocation policies. Furthermore, as set forth above, each allowance is an amount of bandwidth up to which a user class or user may consume, but is not necessarily the amount of bandwidth that a user class or user will consume; it is an upper limit on such amount.

Figure 24:
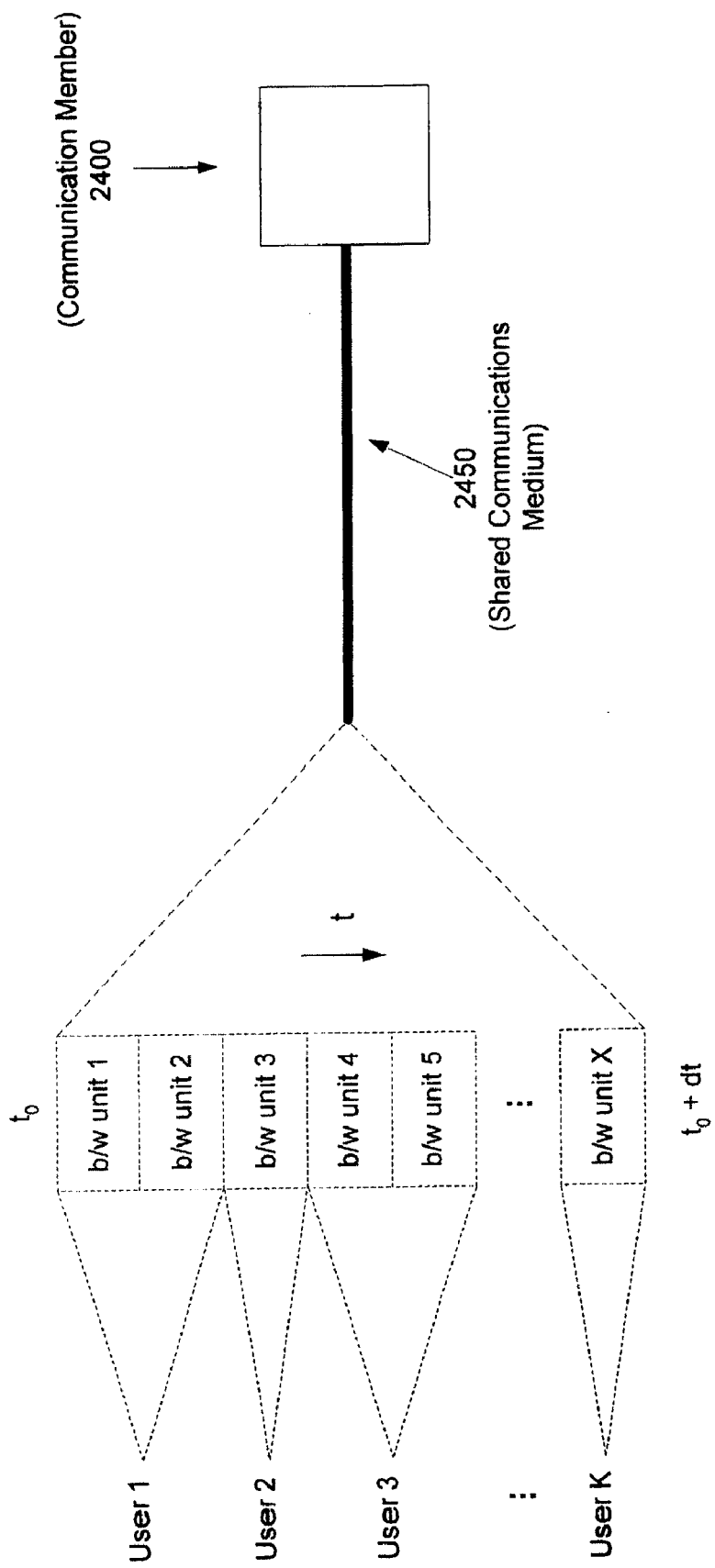
FIG. 24 illustrates the allocation of bandwidth to users within a class during a first time interval.
Figure 25:
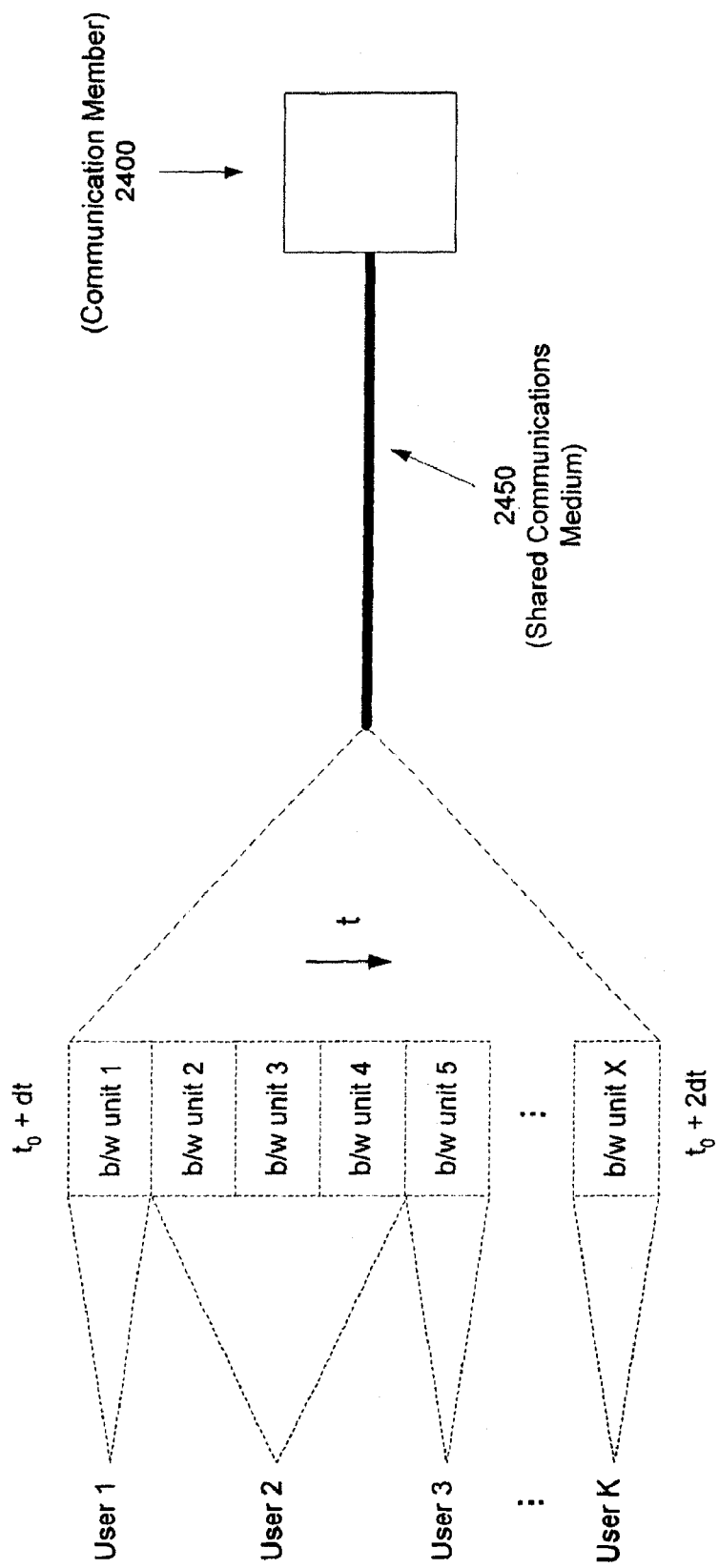
FIG. 25 illustrates the allocation of bandwidth to the users of FIG. 24 during a second time interval.

For example, with reference to FIG. 24, a selected allocation policy has resulted in the allocation of bandwidth to the users of the shared communications medium 2450 for a time interval extending from $t_0$ to ($t_0$+dt), User 2 and User K each is allocated a single bandwidth unit (b/w unit 3 and b/w unit X, respectively), while User 1 and User 3 each is allocated two bandwidth units (b/w unit 1 and b/w unit 2 to User 1, and b/w unit 4 and b/w unit 5 to User 3). As shown in FIG. 25, in the next time interval extending from ($t_0$+dt) to ($t_0$+2dt), User 1, User 3, and User K each is allocated a single bandwidth unit (b/w unit 1, b/w unit 5, and b/w unit X, respectively), while User 2 is allocated three bandwidth units (b/w unit 2, b/w unit 3, and b/w unit 4). In this example, all users are grouped within the same class, and the bandwidth units in this example broadly represent network access to the communication member 2400 that is shared between the users across the shared communications medium 2450.

In accordance with the present invention, respective user bandwidth allowances for each time interval are equated with these user allocations of bandwidth, whereby no user receives more bandwidth in a time interval than that user's respective bandwidth allowance for that time interval. Furthermore, it is important to distinguish what a user actually may be "allocated" in the context of the bandwidth that is actually utilized or consumed by such user, as opposed to bandwidth allocations to a user in accordance with the present invention. The bandwidth allocation in accordance with the present invention represents a limit on the amount of bandwidth that can be allocated to a user for a time interval—and hence is equated with a bandwidth allowance; it does not represent per se the amount of bandwidth that the user actually will utilize in the time interval.

In determining network access allocations (and thus allowances) in the preferred embodiments herein described, the Bandwidth Allocator 92 preferably performs three routines, including: the prediction of bandwidth of each user class, and each user within each class, in a predetermined future interval of time ("First Routine"); the prioritization of user classes, and users within each class, for allocation of bandwidth ("Second Routine"); and the actual allocation of bandwidth for each user class, and each user within each class, for determining the bandwidth allowances for the future time interval ("Third Routine").

The First Routine preferably is performed utilizing statistical analysis of past bandwidth consumption of each user or, alternatively, past bandwidth requested for each user, and the forecasted bandwidth includes the bandwidth expected to be consumed by each user or, alternatively, the bandwidth expected to be requested by each user. Any function, method, or algorithm that generates an estimate of a future sample based on previously encountered samples may be used and many are well known in the art of statistical analysis as is evident from SPYROS MAKRIDAKIS ET AL., FORECASTING METHODS AND APPLICATIONS (3d. Ed. John Wiley & Sons 1998), which is hereby incorporated by reference. With regard to user classes, preferably a collective forecasted bandwidth for each class is determined by summing the forecasted bandwidth of all users within the class.

Figure 7:
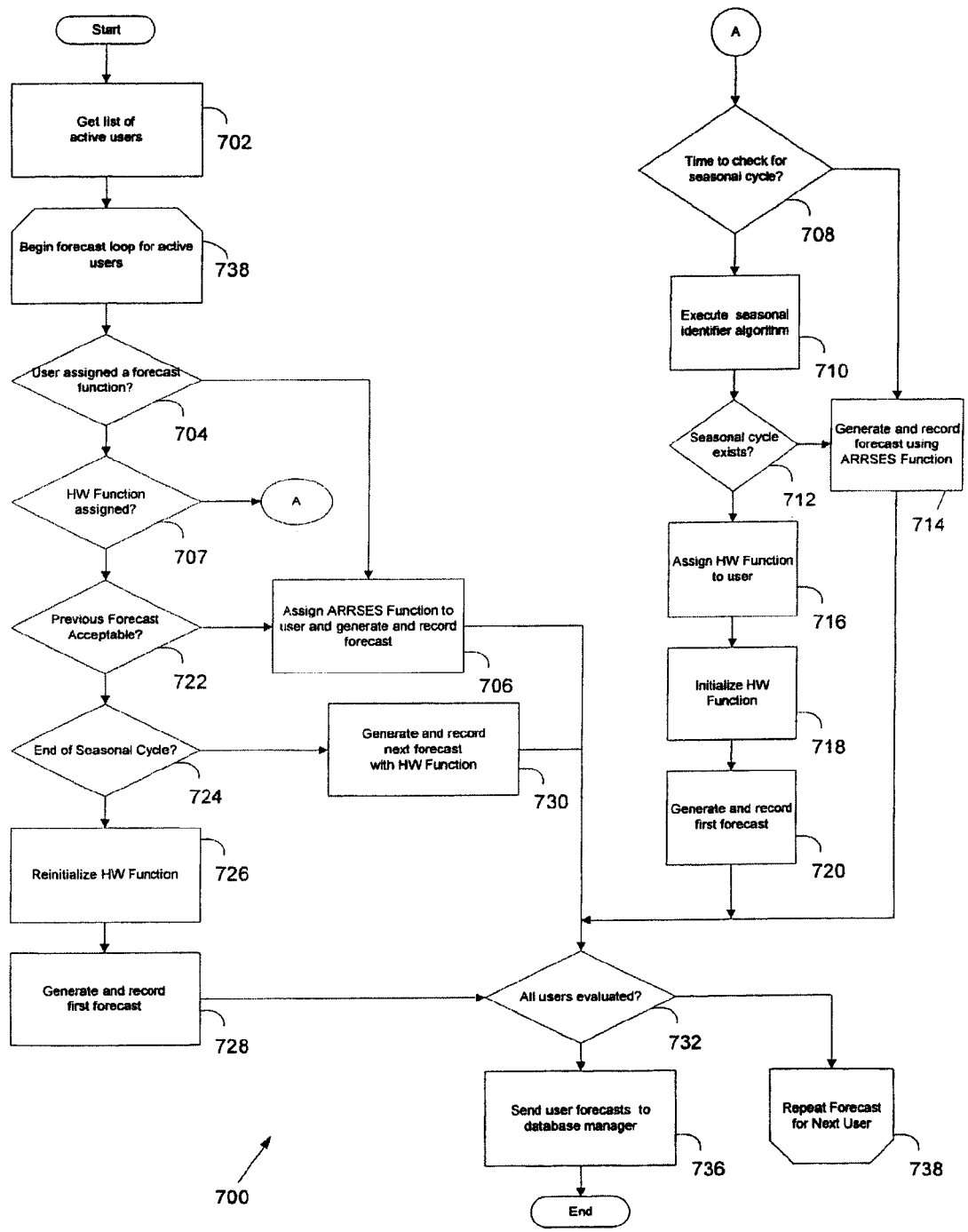
FIG. 7 illustrates a flowchart of the steps of a routine for forecasting bandwidth of each user for a future time interval.

The preferred algorithm for predicting each user's forecasted bandwidth includes the combined use of an adaptive-response-rate single exponential smoothing function (ARRSES Function) and a Holt-Winters' seasonal exponential smoothing function (HW Function). These two functions are utilized according to the forecast generation flowchart of FIG. 7. The input includes a list of active users and the applicable time intervals for bandwidth allocation.

The First Routine 700 begins by identification (Step 702) of the users of the Cable Network to which bandwidth is to be allocated in the Third Routine. Then, for each user, bandwidth for a succeeding time interval is predicted according to either the ARRSES Function or HW Function by first determining (Step 704) whether the user previously has been assigned a forecast function. If not, then in Step 706 the ARRSES Function is assigned to the user and the ARRSES Function is used to generate and record the forecasted bandwidth for the succeeding time interval.

On the other hand, if it is determined in Step 704 that a forecast function is assigned, but it is determined in Step 707 that the forecast function is not the HW Function, then a determination is made (Step 708) whether to check for a seasonal cycle of the user. This determination in Step 708 is made by checking the elapsed time since the last seasonal check was made, with a seasonal check being made after a predetermined period of time elapses. If the determination in Step 708 is affirmative, then a seasonal identifier algorithm is executed (Step 710), in which an autocorrelation function and a seasonal identifier function are performed. The autocorrelation function is well known in the art of statistical analysis, and is used to identify elements in a time series which are influential on a current observation of that same series. Based on the output of the autocorrelation function, the seasonal identifier function identifies possible seasonal cycles of the time series by identifying local maxima of the results of the autocorrelation function.

Based on the results of the seasonal identifier function, a determination is made (Step 712) whether an actual seasonal pattern exists. If a seasonal pattern is not found, or if it is not yet time to check for a seasonal cycle, then a forecast is generated and recorded (Step 714) using the ARRSES Function. If a seasonal pattern is found, then the HW Function is assigned (Step 716) to the user, the HW Function is initialized (Step 718), and the first forecast is generated and recorded (Step 720) using the HW Function.

If it is determined in Step 707 that the current function assigned to the user already is the HW Function, then the determination is made (Step 722) whether the last forecasted bandwidth was acceptable. This determination is made by comparing whether the forecasted bandwidth was within 10% of the actual bandwidth consumed or requested. If this determination in Step 722 is negative, then the ARRSES Function is assigned to the user and the new forecast is generated and recorded in accordance with the ARRSES Function (Step 706). If the last forecast is determined (Step 722) to have been acceptable, then a determination is made (Step 724) whether the seasonal cycle has ended. If the seasonal cycle has ended, then the HW Function is reinitialized (Step 726), and the first forecast of the next seasonal cycle is generated and recorded (Step 728) via the HW Function. If the seasonal cycle has not expired, then the next forecast is generated and recorded (Step 730) in accordance with the HW Function.

Following each of Step 706, Step 714, Step 728, and Step 730, the Bandwidth Allocator 92 determines (Step 732) whether the forecasting has been completed for all users and, if not, then repeats (Step 738) a forecast loop for a remaining user. If it is determined in Step 732 that all users have been evaluated, then the forecasts are communicated (Step 736) to the Database Manager 90 and the forecasting routine ends.

A forecast of bandwidth for a user in a future time interval is generated in accordance with the ARRSES Function via the following formulas:

$$F_{N+1} = F_N + \text{Alpha}_N(B_N - F_N)$$

$$\text{Alpha}_{N+1} = |SE_N/SAE_N|$$

$$SE_{N+1} = SE_N + \text{Beta}(B_{N+1} - F_{N+1} - SE_N)$$

$$SAE_N = \text{Beta}|(B_N - F_N)| + (1-\text{Beta})SAE_{N-1}$$

wherein,

F is the bandwidth that is expected to be consumed by a user for a time interval (or the bandwidth that is expected to be requested by a user);

B is the bandwidth that is actually consumed by a user for the time interval (or the bandwidth that is actually requested by a user);

N is the present time interval;

N−1 is the previous (immediate past) time interval;

N+1 is the next (immediate future) time interval; and

.beta. is a selected parameter affecting the responsiveness to change of the ARRSES Function when the bandwidth of a user changes between time intervals. Bandwidth is predicted both for the 6 MHz channel in the downstream direction as well as the 2 MHz channel in the upstream direction. Preferably each time interval is thirty minutes in length, but preferably may range from fifteen minutes to sixty minutes in length when bandwidth is forecast in the downstream direction. Preferably each time interval is five minutes in length, but preferably may range from one minute to fifteen minutes in length when bandwidth is forecast in the upstream direction.

Figure 8:
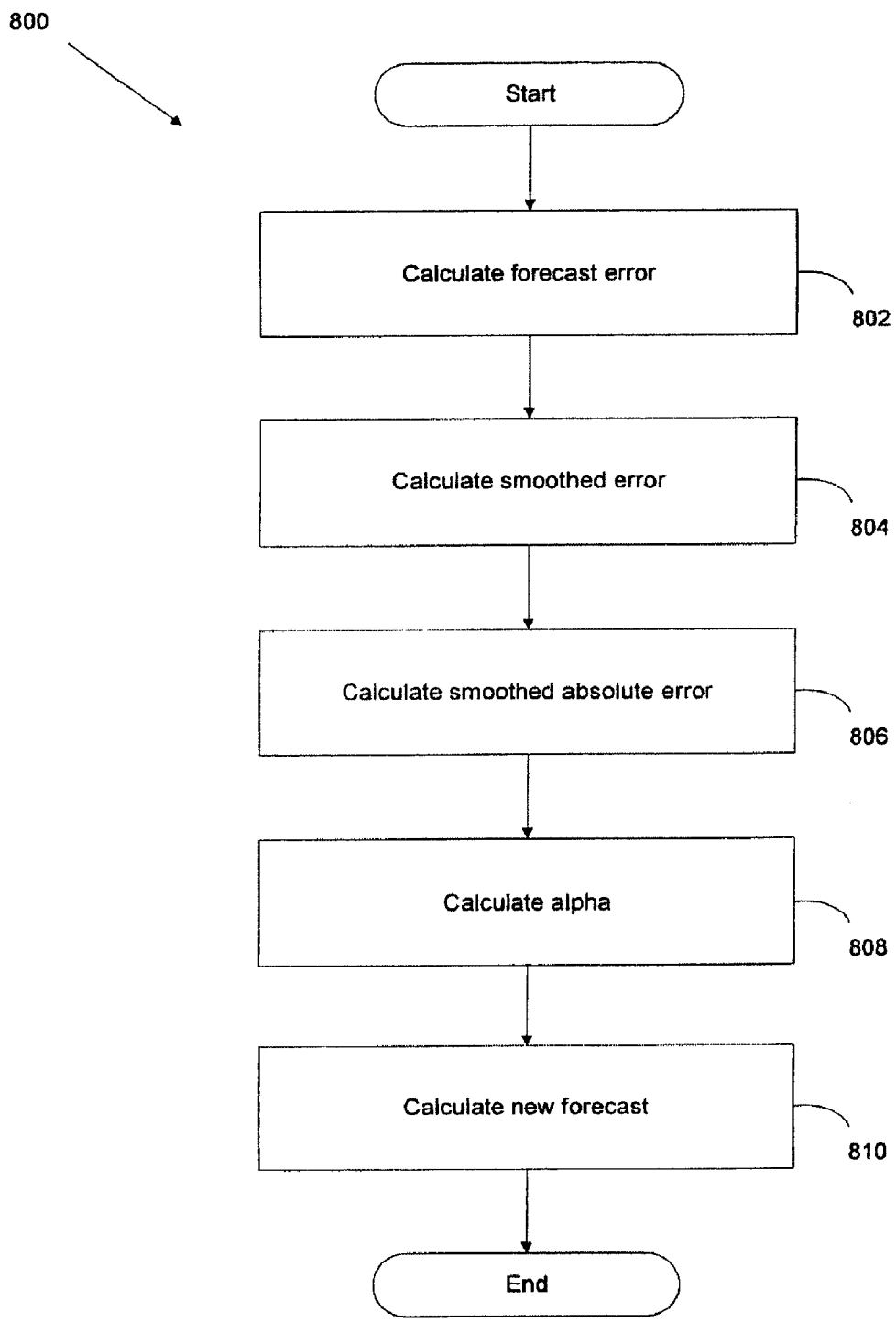
FIG. 8 illustrates a flowchart of the steps of generating a forecasted bandwidth for a user in accordance with the ARRSES Function of the routine of FIG. 7.

The steps in generating a forecast in accordance with the ARRSES Function are set forth in FIG. 8, and include the calculation (Step 802) of a forecast error, the calculation (Step 804) of a smoothed error, the calculation (Step 806) of a smoothed absolute error, the calculation (Step 808) of alpha, and the calculation (Step 810) of the new forecast.

A forecast of bandwidth of a user for a future time interval is generated in accordance the HW Function via the following formulas:

$$L_s = 1/s(Y_1 + Y_2 + \ldots + Y_s)$$

$$b_s = 1/s[(Y_{s+1} - Y_1)/s + (Y_{s+2} - Y_2)/s + \ldots + (Y_{2s} - Y_s)/s]$$

$$S_1 = Y_1/L_s, S_2 = Y_2/L_s \ldots S_S = Y_s/L_s$$

$$L_t = \text{Alpha}(Y_t/S_{t-s}) + (1-\text{Alpha})(L_{t-1} + b_{t-1})$$

$$b_t = \text{Beta}(L_t - L_{t-1}) + (1-\text{Beta})b_{t-1}$$

$$S_t = \text{Gamma}(Y_t/L_t) + (1-\text{Gamma})S_{t-s}$$

$$F_{t+m} = (L_t + b_t M)S_{t-s+m}$$

wherein, $L_i$ = an average level of bandwidth after time interval i, $b_i$ = the trend after time interval i, $s_i$ = the seasonal influence at time interval i, s = length of seasonal cycle (in number of time intervals), $Y_i$ = monitored bandwidth consumed or requested in time interval i, t = time of initialization, m = the number of time intervals into the future for which a forecast is made, and Alpha, Beta, and Gamma are parameters of the forecast method whose values are determined by doing a grid search over the domain of possible values of these parameters in an attempt to minimize the mean-squared-error of the forecast method, each of Alpha, Beta, and Gamma falling between 0 and 1.

Figure 9:
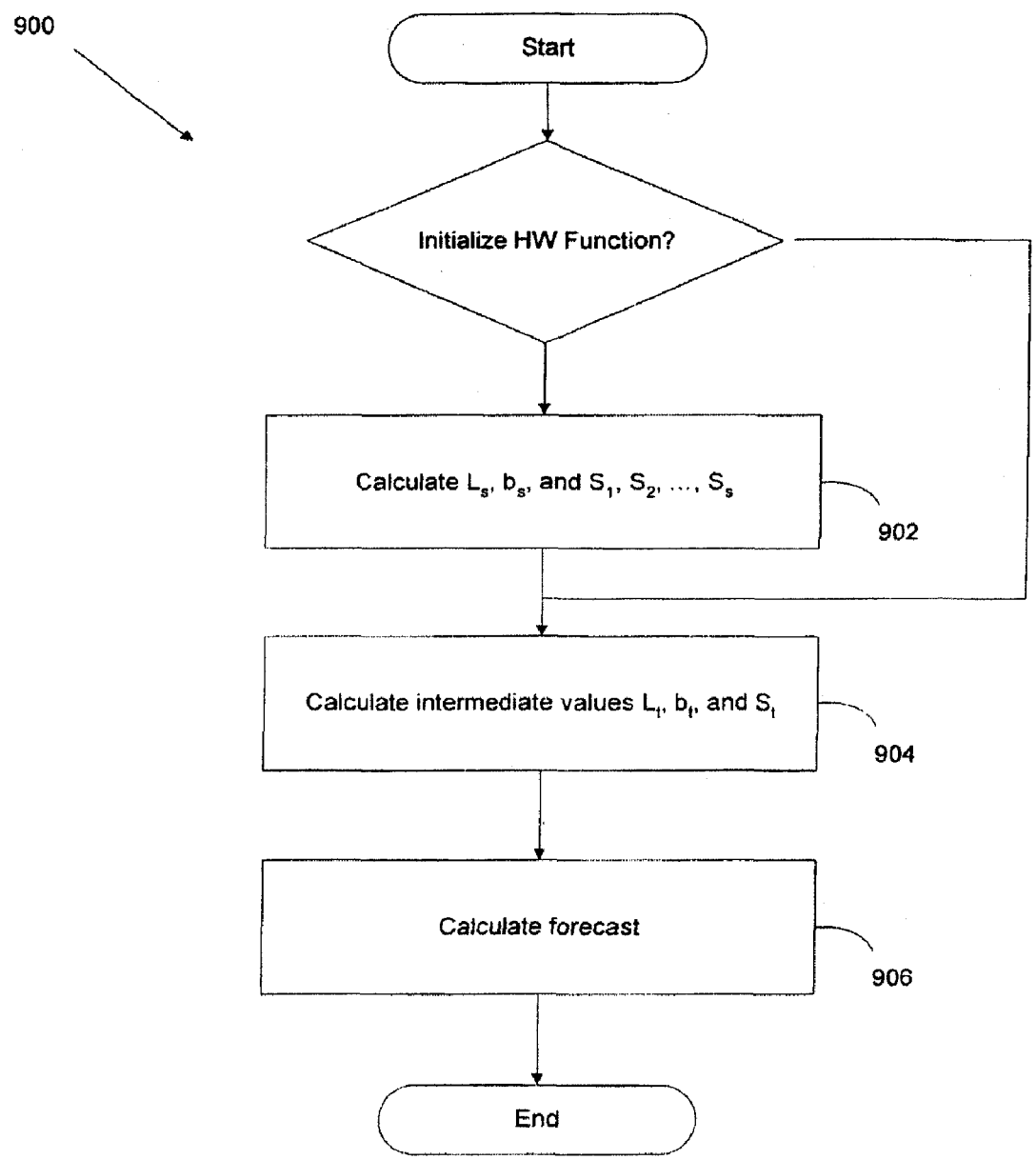
FIG. 9 illustrates a flowchart of the steps of generating a forecasted bandwidth for a user in accordance with the HW Function of the routine of FIG. 7.

The steps in generating a forecast in accordance with the FIW Function are set forth in FIG. 9, and include the initialization of the HW Function by determining $L_s$, $b_s$, and $S_s$, $S_s$, ..., $S_s$ in Step 902, if appropriate; the determination of the intermediate values of $L_t$, $b_t$, and $S_t$ in Step 904; and the determination of the forecast in Step 906, all in accordance with the above formulas.

The Second Routine performed by the Bandwidth Allocator 92 comprises the prioritizing of user classes, and of users within each class, to determine respective orders of allocations. Prioritization is performed in accordance with one or more of various possible prioritization policies for users and for user classes. With regard to users within each class, the prioritization policies may depend upon, for example, (i) each user's SLA, (ii) each user's forecasted bandwidth, (iii) fairness considerations, or (iv) any combination thereof.

User SLAs that at least partially affect prioritization policies include those that specify, for example: (i) a guaranteed minimum level of bandwidth; (ii) a time-of-day (TOD) minimum level of bandwidth; or (iii) a guaranteed minimum level of bandwidth up to a maximum burstable level of bandwidth with target probability. Equivalently, such provisions also may be found in a CSLA for a class of which the user is a member.

Under a SLA or CSLA providing for a guaranteed minimum level of bandwidth for a user, a user will have a guaranteed minimum level of bandwidth for use at all times. Accordingly, if the available bandwidth to such a user otherwise would fall below the minimum guaranteed level, then such a user is given priority over all other users whose guaranteed minimum levels of bandwidth (if applicable) have been satisfied.

Similarly, under a SLA or CSLA providing for a TOD minimum level of bandwidth for a user, a user will have a guaranteed minimum level of bandwidth for a particular TOD. If the available bandwidth to such a user otherwise would fall below the minimum guaranteed level during the particular TOD, then such user is given priority over all other users whose guaranteed minimum levels of bandwidth (if applicable) have been satisfied.

Finally, under a SLA or CSLA providing for a guaranteed minimum level of bandwidth up to a maximum burstable level of bandwidth with target probability for a user, a user will have a guaranteed minimum level of bandwidth at all times and, in addition thereto, probably will have additional bandwidth up to a maximum level at any given time in accordance with the target probability. Accordingly, if the bandwidth available to such user otherwise would fall below the minimum guaranteed level, then the user is given priority over all other users whose guaranteed minimum levels of bandwidth (if applicable) have been satisfied. The user also is given priority over such other users in allocating additional bandwidth as needed up to the maximum level in accordance with the target probability.

Other SLA or CSLA provisions not relating to guaranteed levels of bandwidth also may affect a prioritization policy for users. Thus, for example, a SLA or CSLA may specify a fee (in dollars per unit time per unit bandwidth) that is paid based upon bandwidth consumption by a user for a particular amount of time, and the fee may be different as between users. Under these circumstances, prioritization may be determined so as to maximize fee revenues that are paid.

Similarly, a SLA or CSLA may specify a credit (in dollars per unit time per unit bandwidth) that is applied by the Carrier to an account based upon a bandwidth shortfall to a user for a particular amount of time when a guaranteed level of bandwidth for the user is not met. Moreover, the credit may be different as between users. Under these circumstances, prioritization may be determined so as to minimize the collective credits that a Carrier must apply.

An example of prioritization based upon the forecasted bandwidth of each user includes giving priority to a first user over all other users, each of whom have a forecasted bandwidth that is greater than that of the first user.

Prioritization may also be performed based on unilateral fairness considerations, especially when SLAs or CSLAs do not guarantee minimum levels of bandwidth for individual users, or when users otherwise would share equally in priority. Thus, users may be prioritized based on, for example: (i) the throughput of each of the users for a given time interval, with priority going to the user with the lesser throughput; (ii) data packets dropped over a given time interval, with priority going to the user with the greater data loss; and (iii) throughput experienced during a particular time of day or day of the week, with priority going to the user with the lesser throughput for the particular time of day or day of the week.

Figure 10:
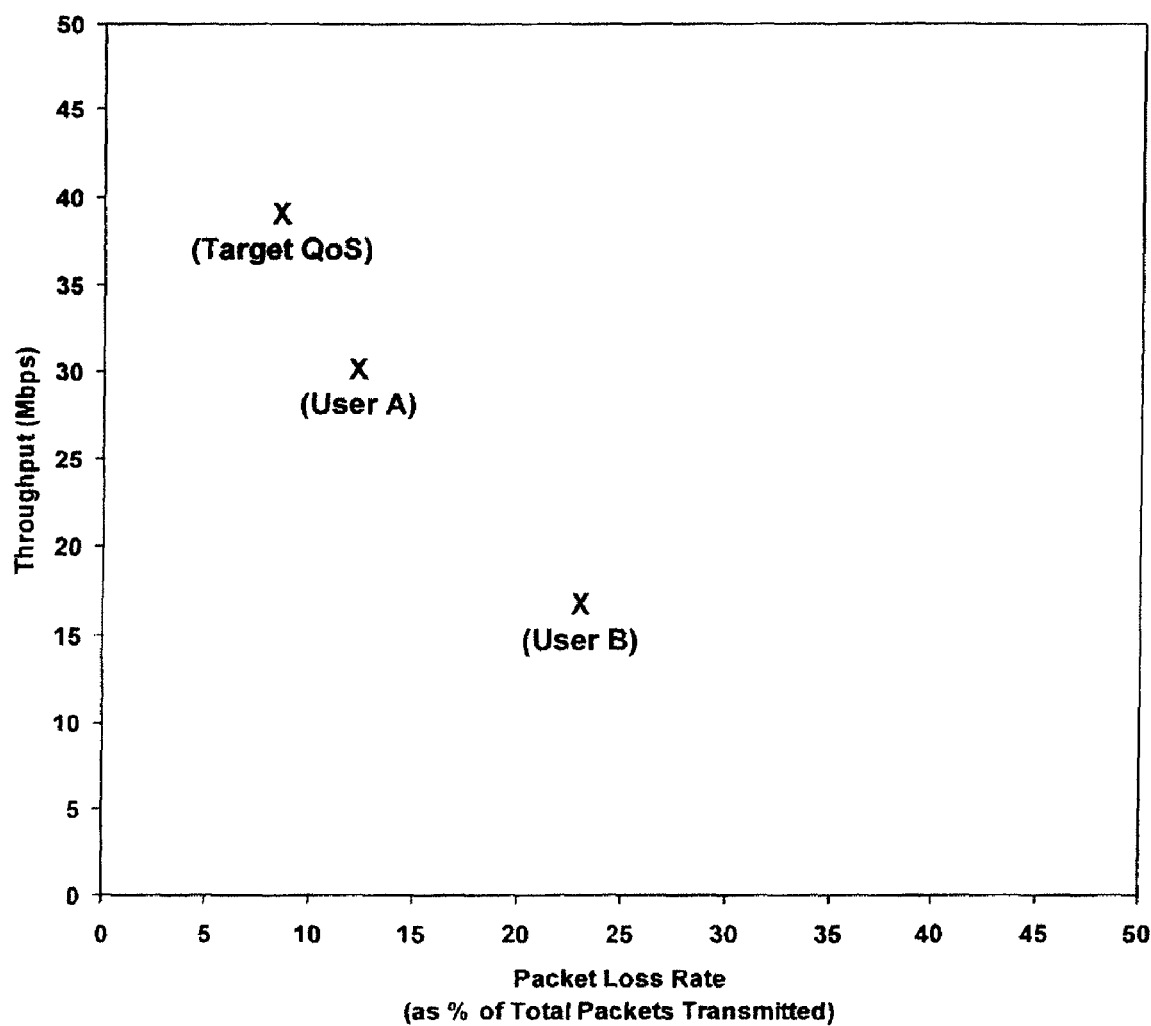
FIG. 10 illustrates a graph of user throughput rates versus user data loss rates for two users relative to a target minimum QoS standard.

An example of fairness considerations that may be utilized in determining priority is illustrated in FIG. 10, wherein user throughput for a time interval is graphed against user data packets dropped in the time interval for Users A and B. A target QoS standard for minimum throughput and maximum packet loss rates are established by the Carrier, whereby in the illustrated example each user is prioritized based on the user's absolute distance from the target QoS standard. Thus, under this policy, User A experiencing higher throughput rate and a lower packet loss rate, and thus having a shorter distance from the standard, is prioritized lower than User B having a lower throughput rate and higher data loss rate.

With regard to user classes, prioritization policies are similar to those of the users and include, for example, (i) each CSLA, (ii) each class' collective forecasted bandwidth, (iii) fairness considerations, or (iv) any combination thereof.

CSLAs that at least partially affect prioritization policies for user classes include those that specify, for example: (i) a guaranteed minimum level of collective bandwidth for the user class; (ii) a time-of-day (TOD) minimum level of collective bandwidth for the user class; or (iii) a guaranteed minimum level of collective bandwidth up to a maximum burstable level of collective bandwidth with target probability for the user class.

Other CSLA provisions not relating to guaranteed levels of collective bandwidth also may affect a prioritization policy. Thus, for example, each CSLA may specify a fee (in dollars per unit time per unit bandwidth) that is paid based upon collective bandwidth consumption by the users of a class for a particular amount of time, and the fee may be different as between different classes of users. Under these circumstances, prioritization may be determined so as to maximize fee revenues that are paid to a Carrier.

Similarly, each CSLA may specify a credit (in dollars per unit time per unit bandwidth) that is applied by the Carrier based upon a collective bandwidth shortfall to the users of the class for a particular amount of time when a guaranteed level of collective bandwidth is not met. Moreover, the credit may be different as between user classes. Under these circumstances, prioritization may be determined so as to minimize the total credits that a Carrier may have to apply.

An example of prioritization based upon the collective forecasted bandwidth of each user class includes giving priority to a first user class over all other user classes, each of which has a respective collective forecasted bandwidth that is greater than that of the first user class.

Prioritization may also be performed based on unilateral fairness considerations, especially when CSLAs do not guarantee minimum levels of collective bandwidth, or when classes otherwise would share equally in priority. Thus, user classes may be prioritized based on, for example: (i) the collective throughput of the users of a class for a given time interval, with priority going to the class with the lesser collective throughput; (ii) the collective data packets of a user class that are dropped over a given time interval, with priority going to the user class with the greater collective data loss; and (iii) the collective throughput of the users of a class experienced during a particular time of day or day of the week, with priority going to the user class with the lesser collective throughput for the particular time of day or day of the week.

The Third Routine performed by the Bandwidth Allocator 92 is the allocation of bandwidth to the user classes, and then to the users within each class, in accordance with one or more allocation policies as desired. Examples of allocation policies for users include: (i) the equal distribution of all available bandwidth to all users; (ii) the distribution of all available bandwidth to all users proportional to each user's respective forecasted bandwidth; (iii) the distribution of bandwidth to each user equal to the user's respective forecasted bandwidth, with any surplus bandwidth being distributed to the users either equally or proportionally based upon the user's respective forecasted bandwidth; and (iv) the initial distribution of bandwidth to each user based upon the minimum of the user's guaranteed bandwidth or the forecasted bandwidth and, thereafter, incremental allocations of remaining bandwidth to all of the users.

Likewise, examples of allocation policies for user classes include: (i) the distribution of all available bandwidth by the Bandwidth Allocator 92 to all user classes proportional to the number of active users in each class; (ii) the distribution of all available bandwidth to all user classes proportional to each class' respective collective forecasted bandwidth; (iii) the distribution of bandwidth to each user class equal to the class' respective collective forecasted bandwidth, with any surplus bandwidth being distributed to the user classes either equally or proportionally based upon the class' respective collective forecasted bandwidth; and (iv) the initial distribution of bandwidth to each user class based upon the minimum of the class' guaranteed collective bandwidth or the collective forecasted bandwidth and, thereafter, incremental allocations of remaining bandwidth to all of the users classes.

Examples of alternate preferred methods of prioritizing user classes, and then allocating bandwidth to the classes, will now be described in detail, each of which utilizes one or more of the aforementioned user class prioritization and allocation policies. Alternative preferred methods of prioritizing users within each class, and then allocating bandwidth to the users in each class, are set forth thereafter. In either case, the preferred methods of prioritizing and allocating are initiated pursuant to the scheduling module 102 of the Bandwidth Allocator 92, which operates independently of the scheduling module 100 of the Data Collector 88.

Figure 11:
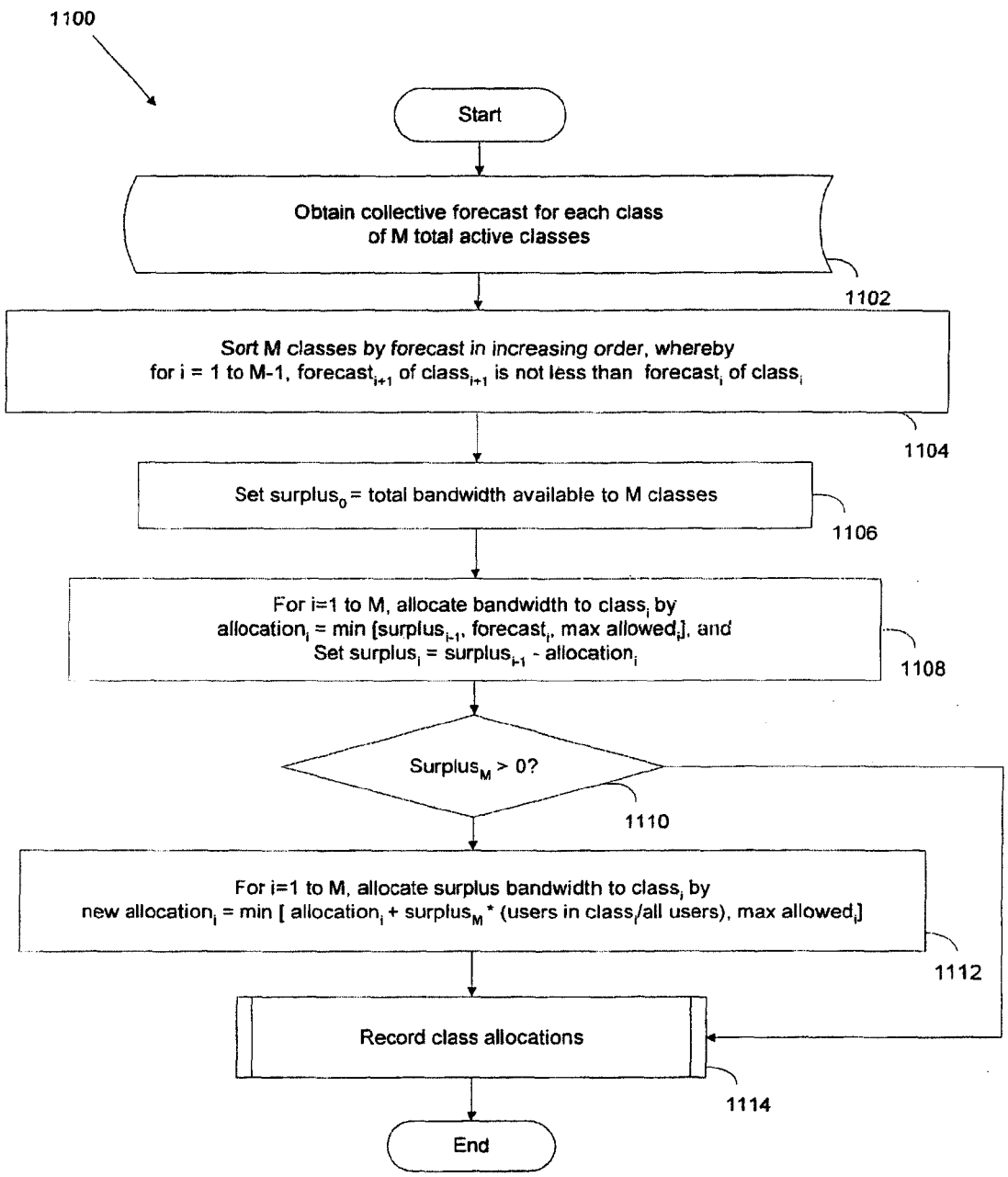
FIG. 11 illustrates a flowchart of a first method of prioritizing classes and allocating collective bandwidth to each class.

With regard to prioritization of and allocation to user classes, a first preferred method 1100 is illustrated in FIG. 11 and begins with the retrieval (Step 1102) of the collective forecasted bandwidth from the Database Manager 90 for all active user classes. Whether a user class is active is determined by past collective bandwidth consumption of the class (or, alternatively, collective requested bandwidth for the users of the class), as revealed by the user stats maintained by the Database Manager 90. All user classes are then prioritized (Step 1104) based on each class' collective forecast in increasing order, whereby a class having a lesser collective forecasted bandwidth will be prioritized over a class having larger collective forecasted bandwidth. A "surplus" is then set (Step 1106) to the total bandwidth available for allocation to the classes in the particular direction of communication over the shared communications medium at issue, and the total bandwidth available is then allocated (Step 1108) to each user class in an amount equaling the collective forecasted bandwidth subject to a respective maximum collective bandwidth value of the user class. Preferably the maximum collective bandwidth value is determined either in the appropriate CSLA or by the Carrier, Administrator 106, or other entity. Allocation of bandwidth to a user class additionally is subject to the actual availability of bandwidth following previous allocations thereof to user classes with equal or higher priority.

Following allocations to all user classes, any bandwidth determined (Step 1110) to be remaining is then allocated (Step 1112) to the classes in amount proportional to the number of active users in each class, subject of course to the respective maximum collective bandwidth value of the class. The resulting class allocations are then recorded in the Database Manager 90 (Step 1114) as the bandwidth allowances for the classes.

Figure 12:
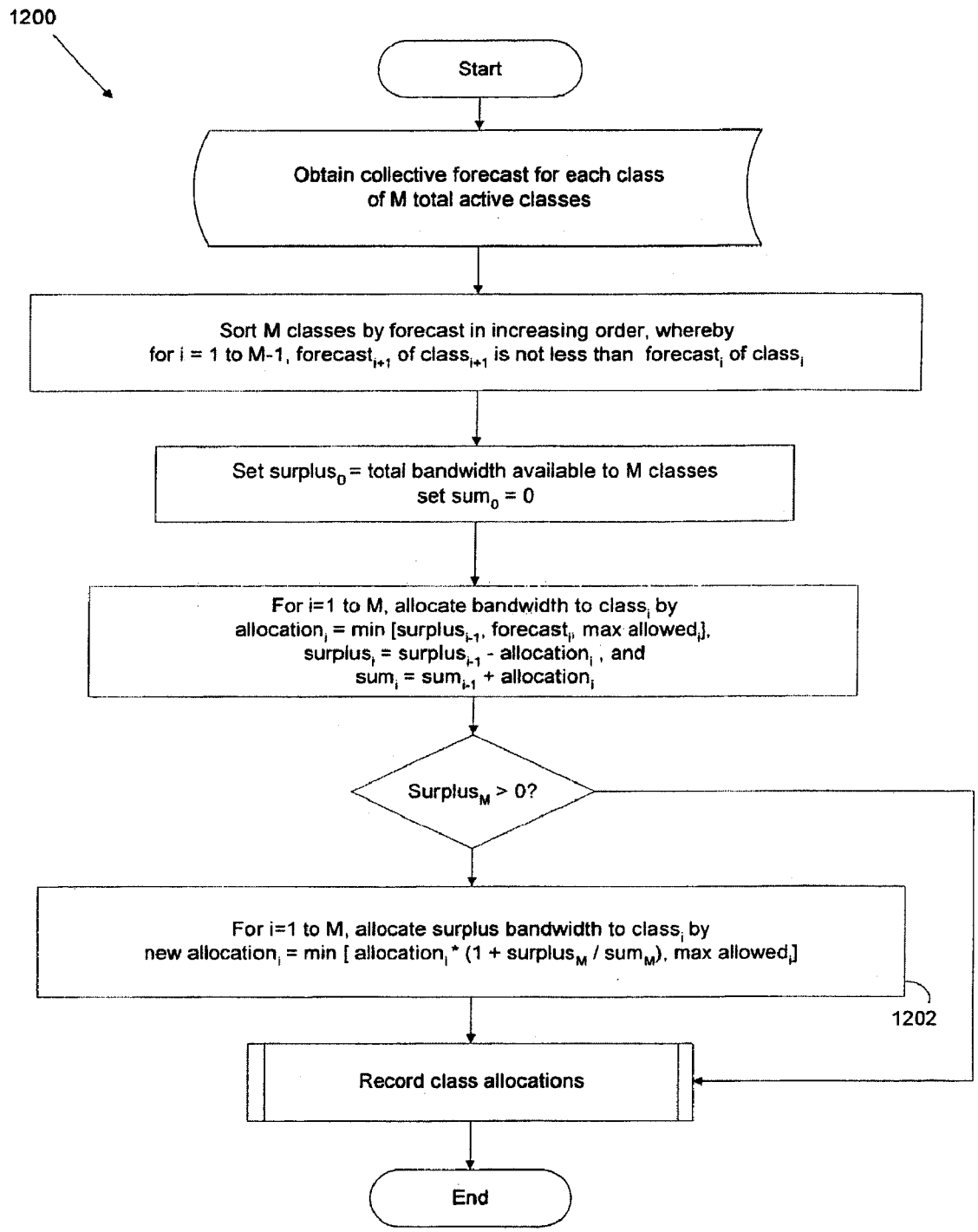
FIG. 12 illustrates a flowchart of a second method of prioritizing classes and allocating collective bandwidth to each class.

The method 1200 illustrated in FIG. 12 is the same as that of FIG. 11, except that surplus bandwidth, if any, is allocated (Step 1102) proportional to the collective forecasted bandwidths of the user classes, again subject to the respective maximum collective bandwidth value of each user class.

Figure 13:
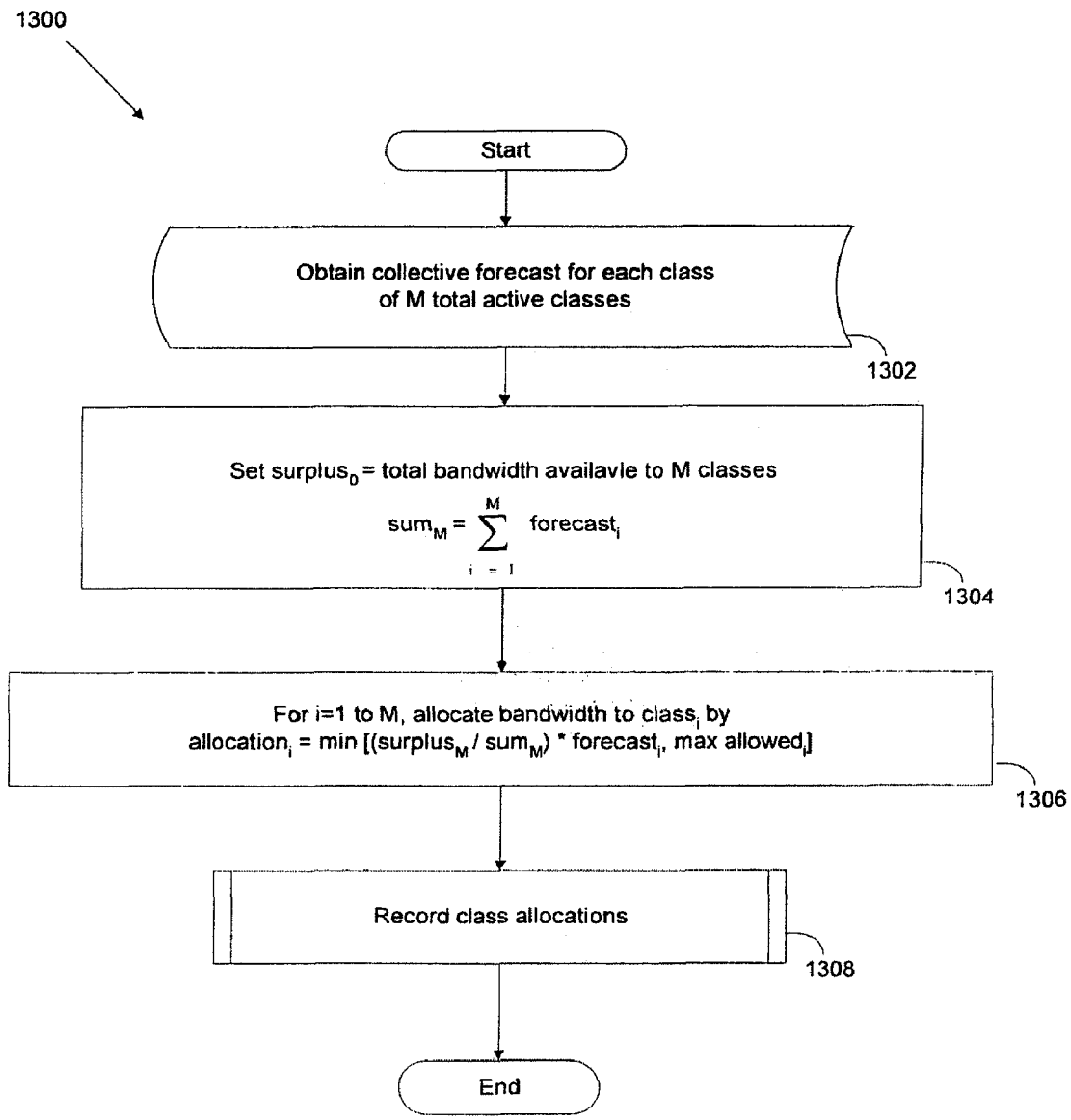
FIG. 13 illustrates a flowchart of a third method of prioritizing classes and allocating collective bandwidth to each class.

The preferred method 1300 illustrated in FIG. 13 does not prioritize the user classes for purposes of allocation but, instead, treats all classes equally. The method 1300 begins with the retrieval (Step 1302) of the collective forecasted bandwidth of each user class from the Database Manager 90. The surplus is then set to the total bandwidth available in the particular direction of communication, and the sum of all the collective forecasts is calculated (Step 1304). The available bandwidth then is allocated (Step 1306) to all classes proportional to the class' collective forecasted bandwidth, again subject to the respective maximum collective bandwidth value for each class. The resulting class allocations then are recorded in the Database Manage 90 (Step 1308) as the bandwidth allowances for the classes.

Figure 14:
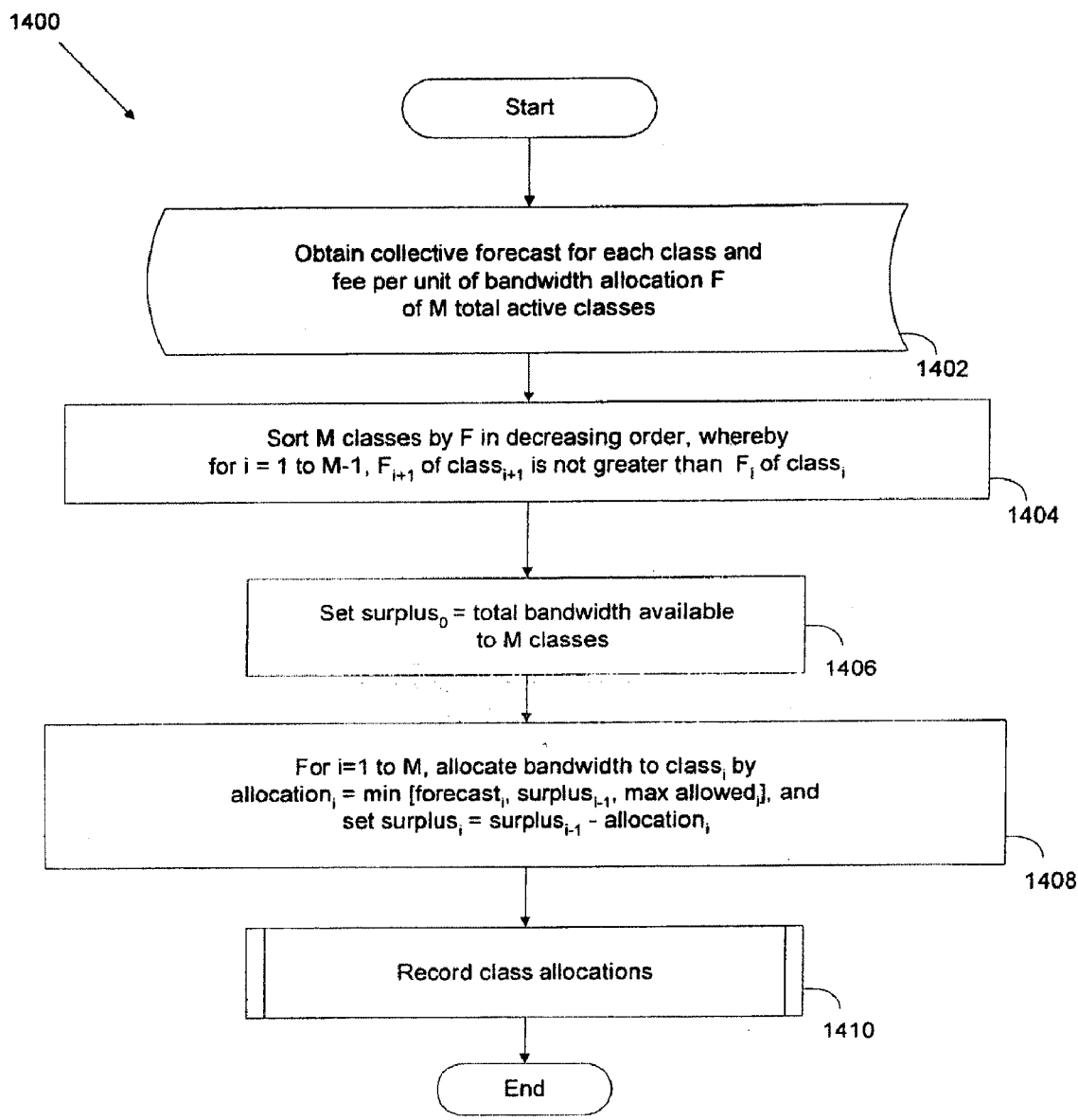
FIG. 14 illustrates a flowchart of a fourth method of prioritizing classes and allocating collective bandwidth to each class.

The preferred method 1400 illustrated in FIG. 14 seeks to maximize revenues from fees (F) that are paid for class bandwidth consumption. The method 1400 begins with the retrieval (Step 1402) of the collective forecast for each user class as well as a fee that is paid for the collective bandwidth of the class. The classes are then sorted (Step 1404) based on these fees in decreasing order, with the class with the highest fee receiving the highest priority. Next, the surplus is set (Step 1406) to the total bandwidth available for allocation to the classes in the particular direction of communication. Bandwidth then is allocated (Step 1408) to the classes as available from highest to lowest priority in an amount equal to the class' collective forecasted bandwidth, subject to the respective maximum collective bandwidth value for the class.

Figure 15A:
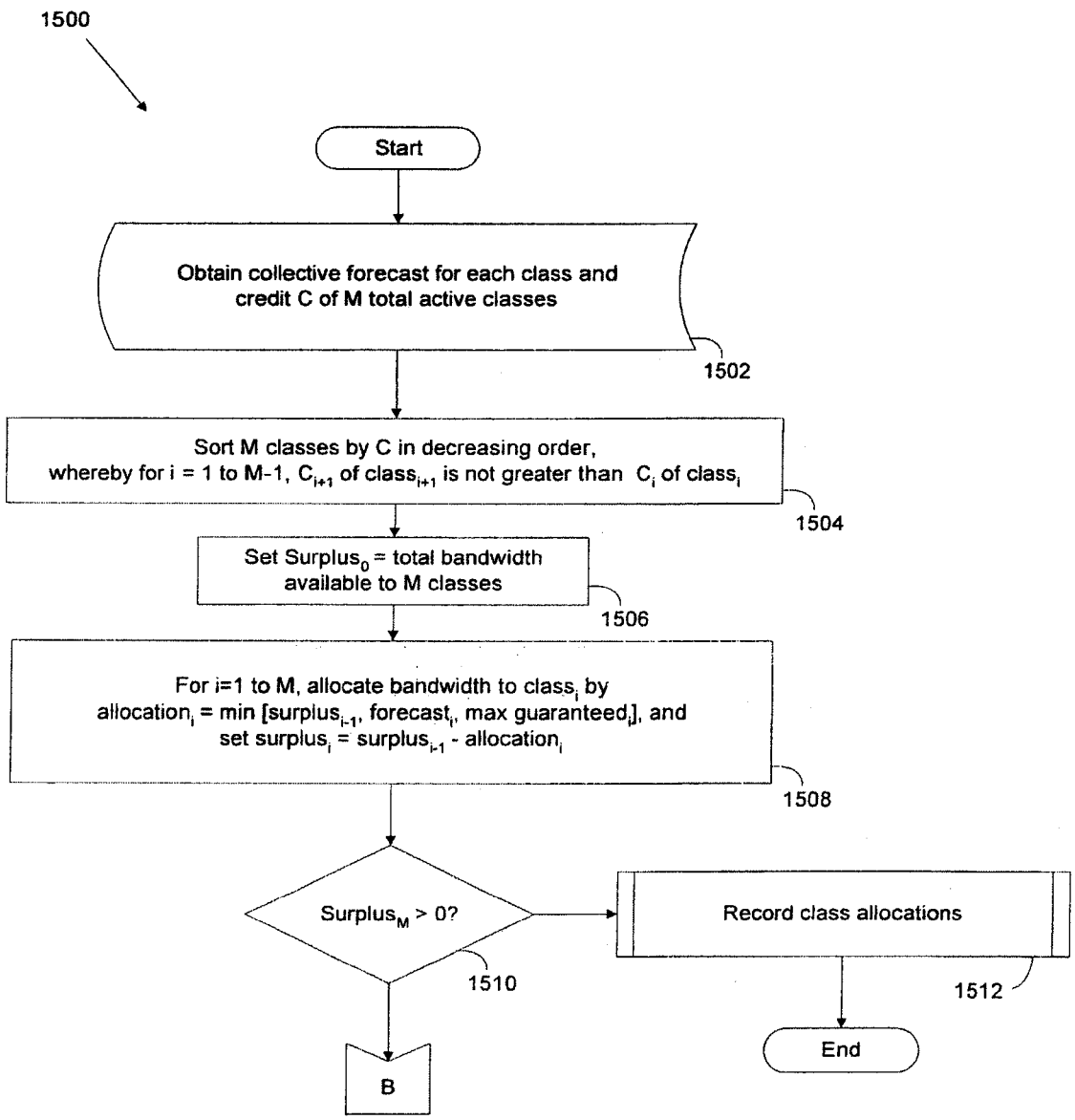
FIGS. 15a and 15b illustrate a flowchart of a fifth method of prioritizing classes and allocating collective bandwidth to each class.
Figure 15B:
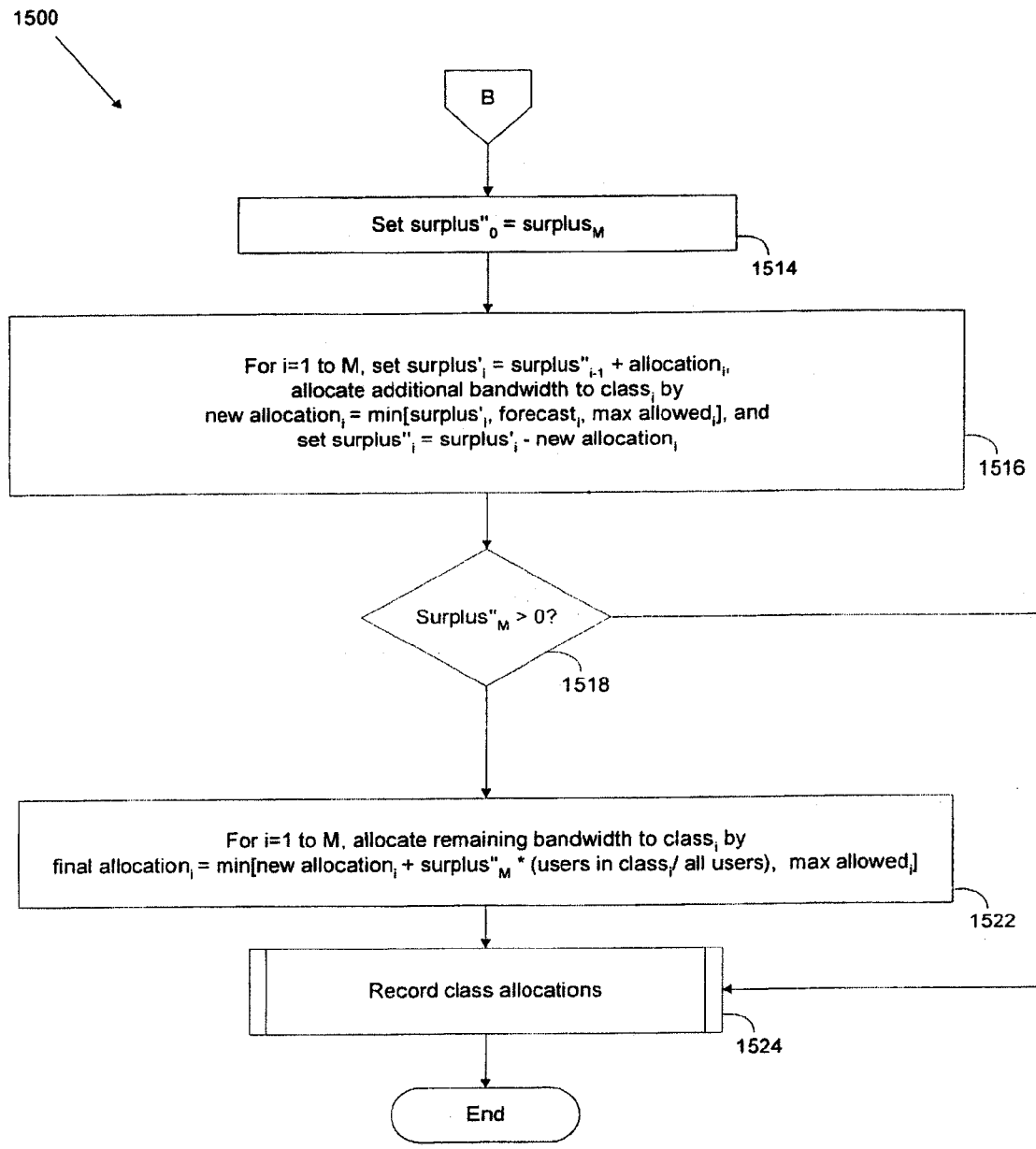
Figure 16A:
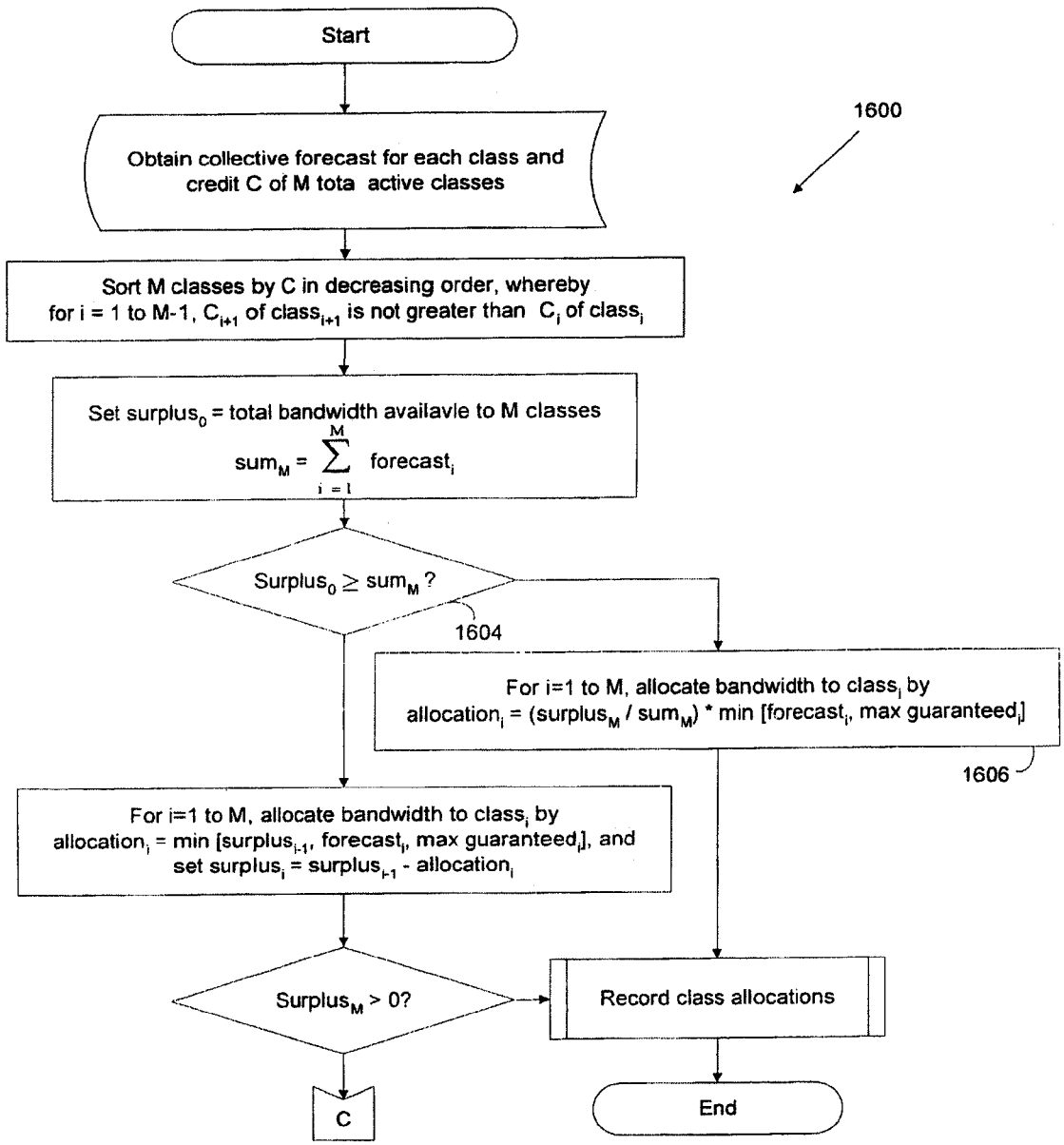
FIGS. 16a and 16b illustrate a flowchart of a sixth method of prioritizing classes and allocating collective bandwidth to each class.
Figure 16B:
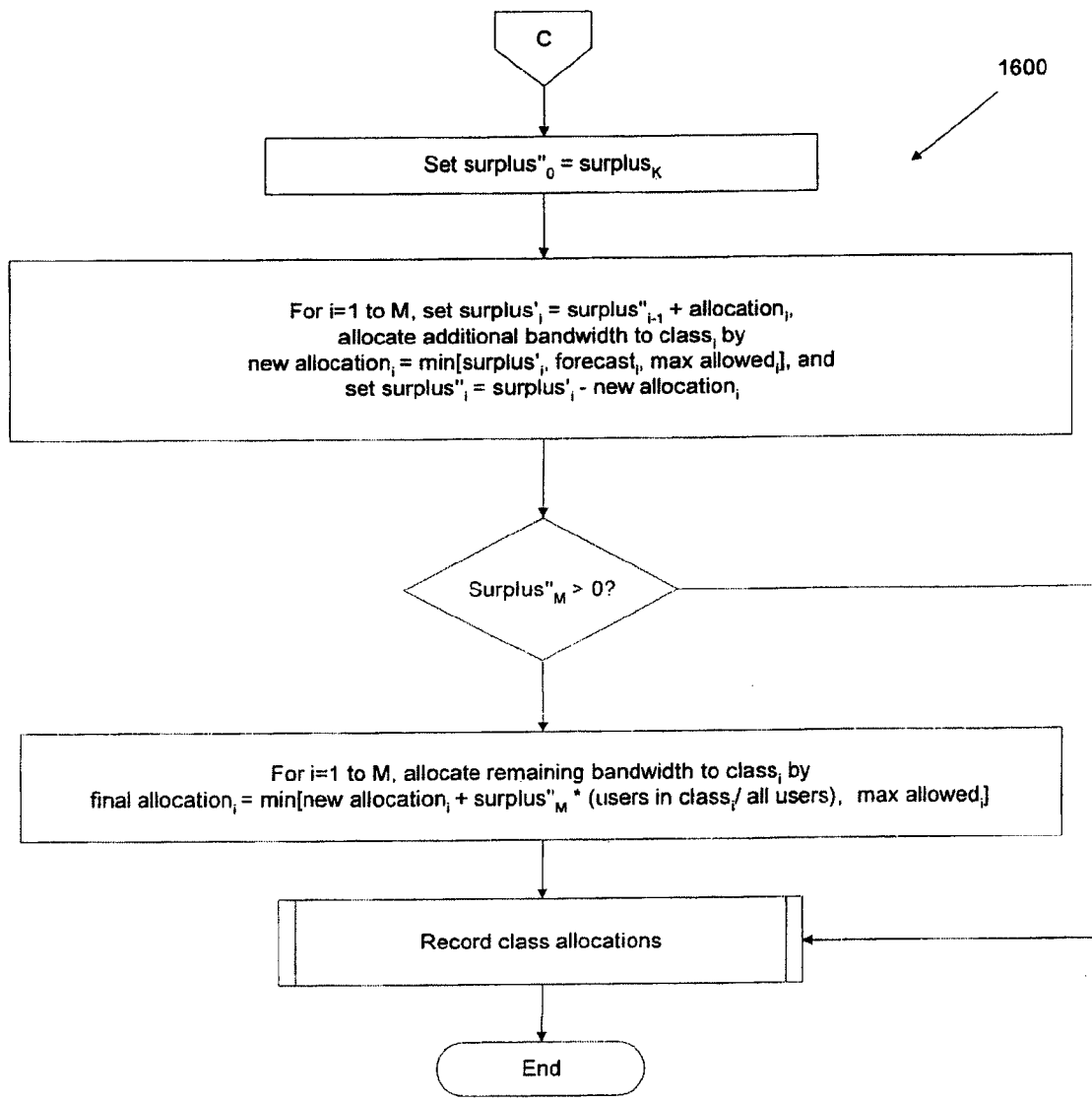

Both preferred method 1500 of FIGS. 15*a* and 15*b*, and preferred method 1600 of FIGS. 16*a* and 16*b* differ from the other methods 1100, 1200, 1300, 1400 in that these two methods allocate bandwidth to the user classes in multiple allocation rounds. Method 1500 begins in FIG. 15*a* with the retrieval (Step 1502) of the collective forecasted bandwidths of the classes as well as a credit (C) that applies if a respective class does not receive up to a guaranteed maximum level of collective bandwidth. The classes are then prioritized (Step 1504) based on each class' respective credit in decreasing order, with those classes having higher credits being given priority over classes with lesser credits. Next, the surplus is set (Step 1506) to the total bandwidth available to the classes in the particular direction of communication. Bandwidth then is allocated (Step 1508) as available in a first round to the classes from highest to lowest priority. The allocation for each class in the first round is equal to the minimum of the collective forecasted bandwidth or the maximum collective bandwidth that is guaranteed, subject to the respective maximum collective bandwidth value for the class.

If any additional bandwidth is determined (Step 1510) to remain after the first allocation round, then the surplus is set to the additional bandwidth (Step 1514). Bandwidth then is allocated (Step 1516) as available to each class in the same class order. Assuming sufficient bandwidth remains available, the allocation in the second round brings each class' allocation up to the class' collective forecasted bandwidth subject to the class' respective maximum collective bandwidth value. Following the second allocation round, a determination is made (Step 1518) whether any remaining bandwidth exists and, if so, then the remaining bandwidth is allocated (Step 1522) to the classes proportional to each class' collective forecasted bandwidth, and subject to each class' respective maximum collective bandwidth value. The resulting class allocations are then recorded (Step 1524) in the Database Manager 90 as the bandwidth allowances of the classes. If it is determined that no bandwidth remains available in either of Step 1510 or Step 1518, then the class allocations are completed and are recorded in the Database Manager 90 in Steps 1512, 1524, respectively.

Method 1600 of FIGS. 16*a* and 16*b* differs from that of FIGS. 15*a* and 15*b* only in that the sum of the collective forecasted bandwidths for all classes is calculated (Step 1602) and a determination is made (Step 1604) whether the sum exceeds the total bandwidth available for allocation to the classes. If the sum exceeds the total available bandwidth, then bandwidth is allocated (Step 1606) to each class in an amount equal to the collective forecasted bandwidth of the class, subject to the class' maximum guaranteed collective bandwidth, and less an amount thereof proportional to the total bandwidth shortfall. Thus, for example, if the sum of all collective forecasted bandwidths exceeds the total available bandwidth for allocation in an amount equal to 20% of all collective forecasted bandwidths, then each class is allocated bandwidth in an amount equal to the class' collective forecasted bandwidth (subject to the class' maximum guaranteed collective bandwidth), then less 20% thereof.

The information including fees, credits, guaranteed collective bandwidths, and respective maximum collective bandwidth values in the aforementioned preferred methods, is obtained from each CSLA and/or is predetermined by the Administrator 106, Carrier, or other entity. Moreover, this information is retrieved by the Bandwidth Allocator 92 from the Database Manager 90, which includes and maintains a CSLA table for each class as well as information regarding users associated therewith, as updated from time-to-time by the Administrator 106. Specifically, the information is configured and maintained through GUIs provided as part of the GUI & Report Generating Engine 94, and is preferably accessed by the Administrator 106 either directly or indirectly through the Internet 60. Alternatively, information is retrieved by the Bandwidth Allocator 92 from an external database maintained by the Administrator, Carrier, or other entity through an application program interface (API) incorporated into the external system interface layer 98 of the Bandwidth Allocator 92. The use of an external database is preferred, as it eliminates any duplicative maintenance of information otherwise maintained by the Database Manager 90 which must be synchronized with the external database, including periodic updating of class and user records in a timely fashion.

Regardless of the particular method or policies utilized by the Bandwidth Allocator 92, once class allocations have been determined, the Database Manager 90 is updated with the new class allocations. Then, for each class, allocations of bandwidth are made to the users in the class. Furthermore, allocations within each class may be made by different methods.

Figure 17:
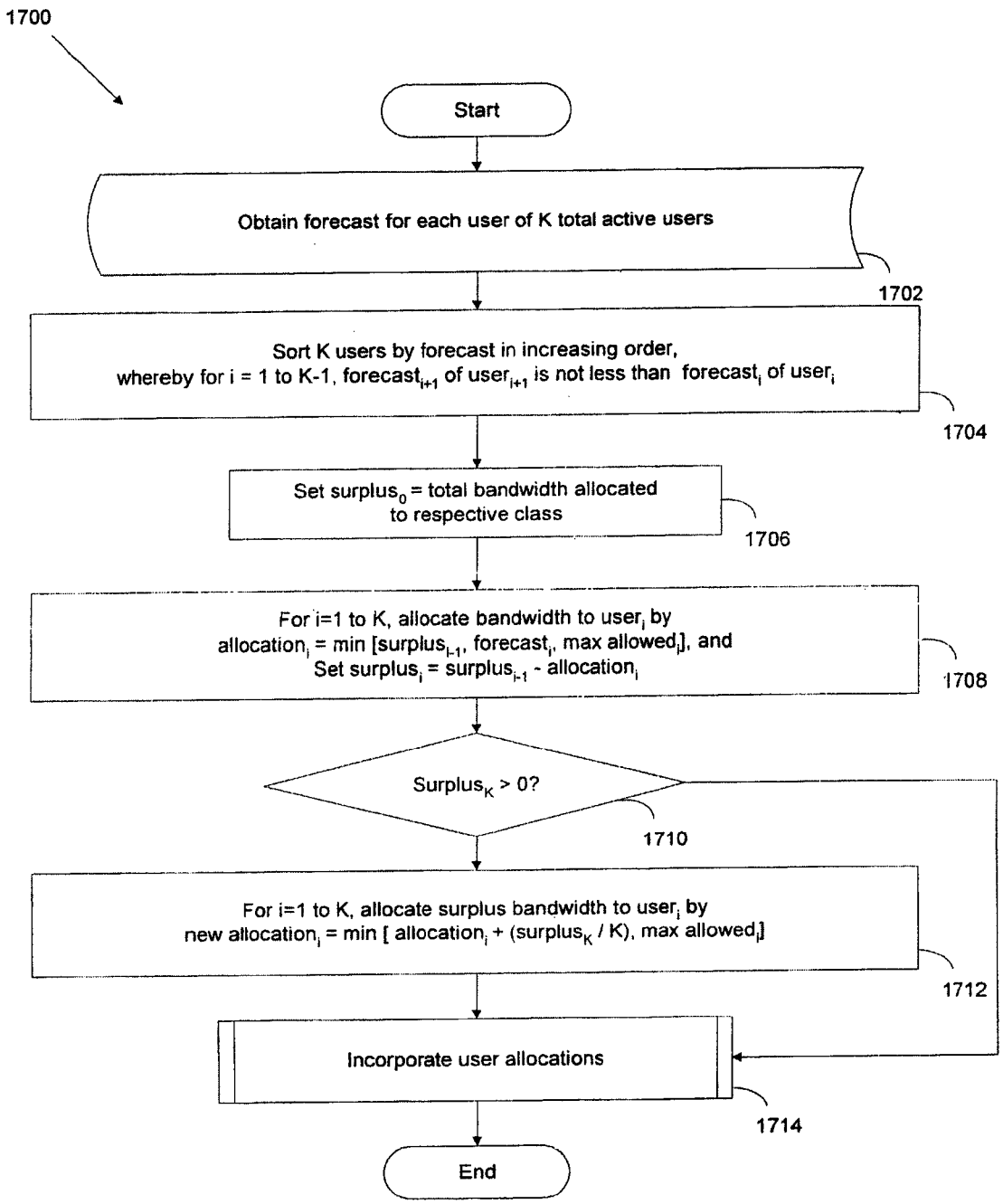
FIG. 17 illustrates a flowchart of a first method of prioritizing users and allocating bandwidth to each user within a class.

A first preferred method 1700 of prioritizing users and allocating bandwidth (whether upstream or downstream) by the Bandwidth Allocator 92 is illustrated in FIG. 17 and begins with the retrieval (Step 1702) of the forecasted bandwidth from the Database Manager 90 for all active users. Whether a user is active is determined by past bandwidth consumption of the user (or, alternatively, requested bandwidth for the user), as revealed by the user stats maintained by the Database Manager 90. All users are then prioritized (Step 1704) based on each user's forecast in increasing order, whereby users having lesser forecasted bandwidths will be prioritized over users having larger forecasted bandwidths. The "surplus" is then set (Step 1706) to the total allocated bandwidth of the class (i.e., the class' collective bandwidth allowance) in the particular direction of communication, and the entire bandwidth allowance of the class is then allocated (Step 1708) to each user in an amount equaling the forecasted bandwidth of the user subject to a respective maximum bandwidth value of the user. Preferably the respective maximum bandwidth value is determined either in the user's SLA, the respective CSLA of the class, or by the Carrier, Administrator 106, or other entity. Allocation of bandwidth to a user additionally is subject to the actual availability of bandwidth following previous allocations thereof to users with equal or higher priority.

Following allocations to all users, any bandwidth determined (Step 1710) to be remaining out of the total class allowance is then allocated equally (Step 1712) to the users subject to the respective maximum bandwidth value for each user. The new user allocations are then incorporated (Step 1714) into the DOC Network as the bandwidth allowances of the users.

Figure 18:
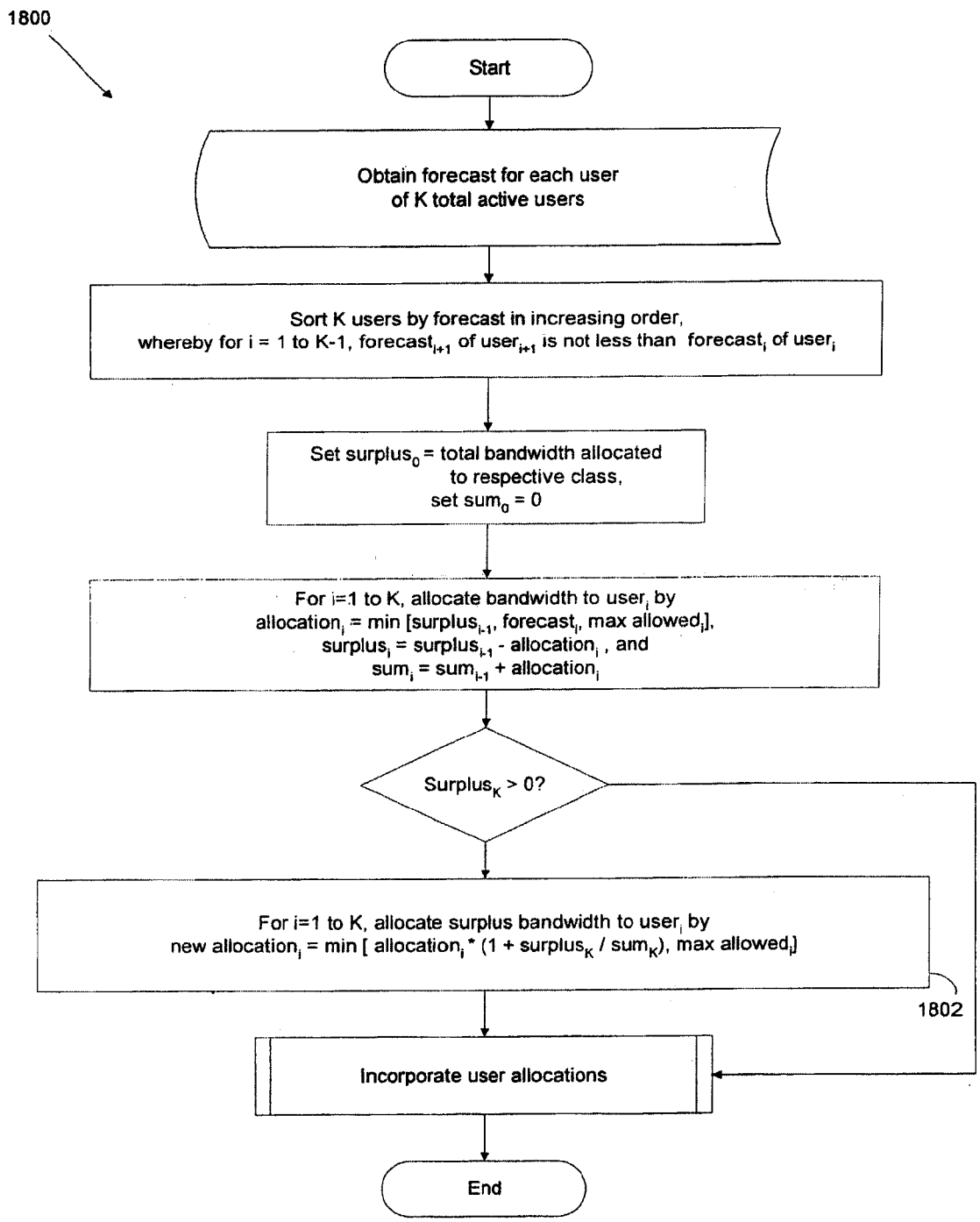
FIG. 18 illustrates a flowchart of second method of prioritizing users and allocating bandwidth within a class.

The method 1800 illustrated in FIG. 18 is the same as that of FIG. 17, except that surplus bandwidth in the class, if any, is allocated (Step 1802) proportional to the forecasted bandwidths of the users in the class, again subject to each user's respective maximum bandwidth value.

Figure 19:
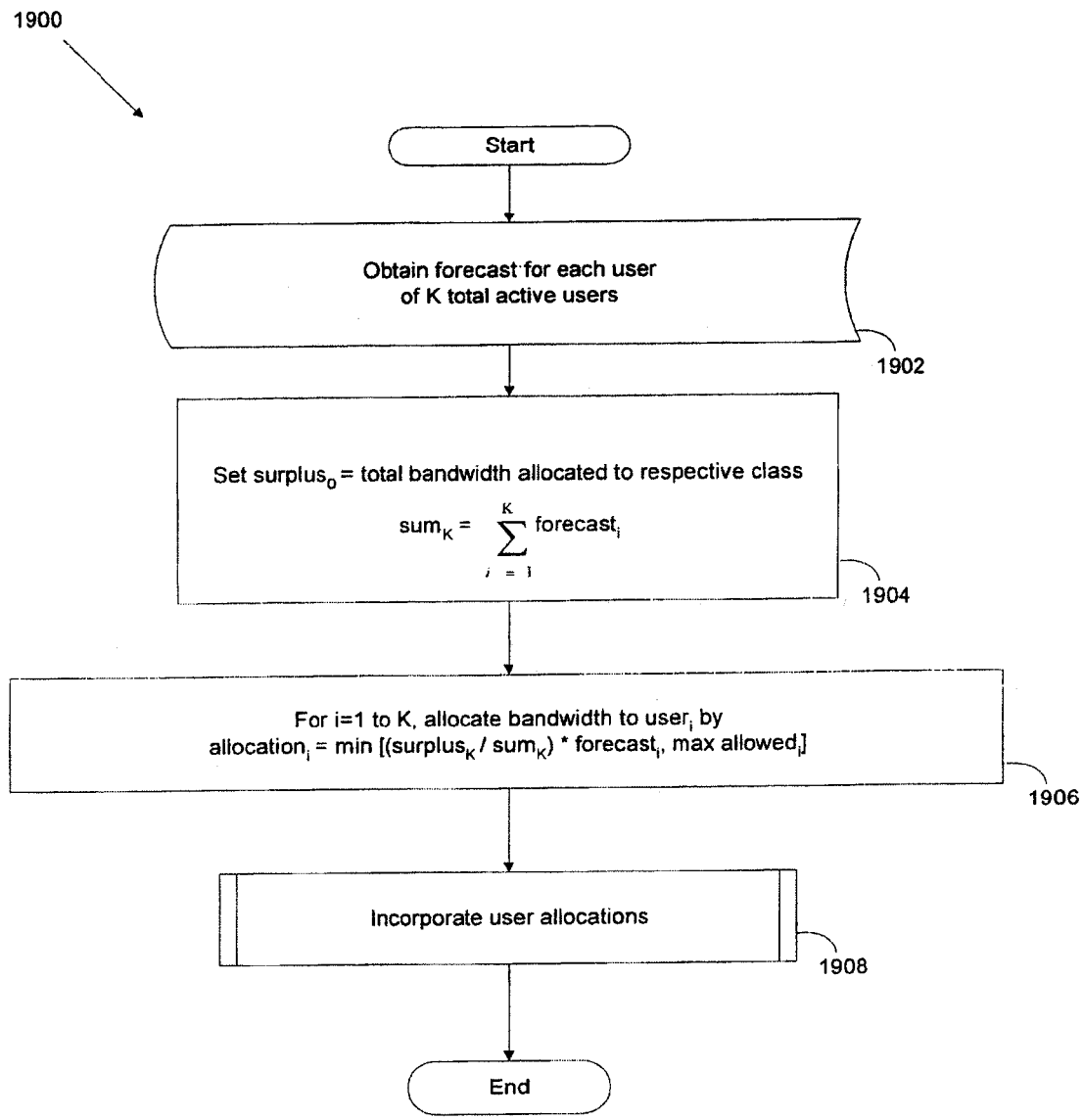
FIG. 19 illustrates a flowchart of a third method of prioritizing users and allocating bandwidth within a class.

The preferred method 1900 illustrated in FIG. 19 does not prioritize the users for purposes of allocation but, instead, treats all users equally. The method 1900 begins with the retrieval (Step 1902) of the forecasted bandwidth for each user in the class from the Database Manager 90. The surplus is then set to the total allocated bandwidth of the class in the particular direction of communication, and the sum of all forecasts of the users in the class is calculated (Step 1904). The total allocated bandwidth of the class then is allocated (Step 1906) to all users in the class proportional to the user's forecasted bandwidth, again subject to each user's respective maximum bandwidth value. The user allocations then are incorporated into the DOC Network (Step 1908) as the bandwidth allowances of the users.

Figure 20:
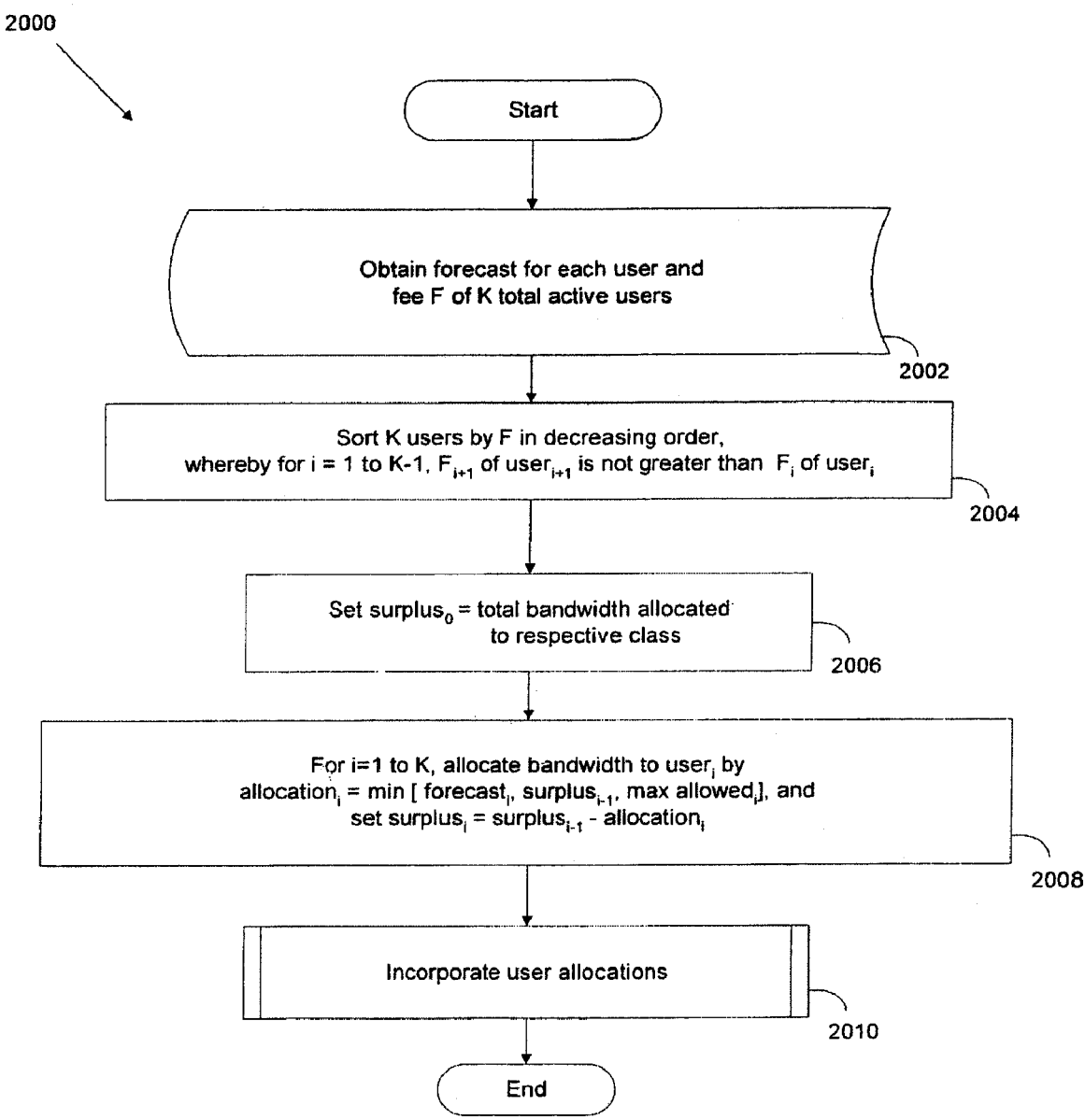
FIG. 20 illustrates a flowchart of a fourth method of prioritizing users and allocating bandwidth within a class.

The preferred method 2000 illustrated in FIG. 20 seeks to maximize revenues from fees (F) that are paid for bandwidth consumption by the users. The method 2000 begins with the retrieval (Step 2002) of the forecast for each user as well as a fee that is paid for bandwidth by each user. The users are then sorted (Step 2004) based on user fees in decreasing order, with the user paying the most for bandwidth receiving the highest priority. Next, the surplus is set (Step 2006) to the total allocated bandwidth of the class in the particular direction of communication. Bandwidth then is allocated (Step 2008) to the users in the class as available from highest to lowest priority in an amount equal to each user's forecasted bandwidth, and subject to the user's respective maximum bandwidth value.

Figure 21A:
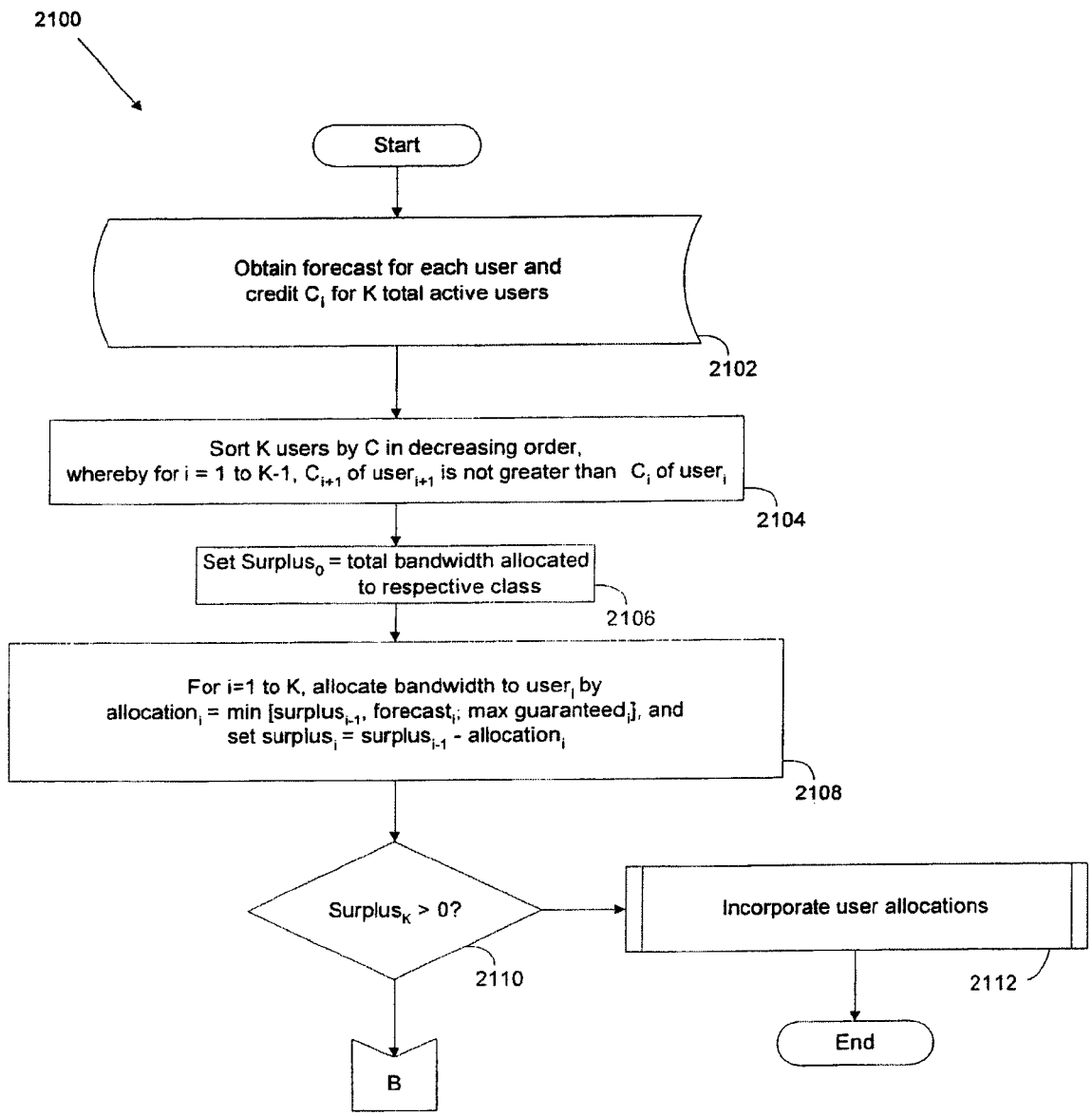
FIGS. 21a and 21b illustrate a flowchart of a fifth method of prioritizing users and allocating bandwidth within a class.
Figure 21B:
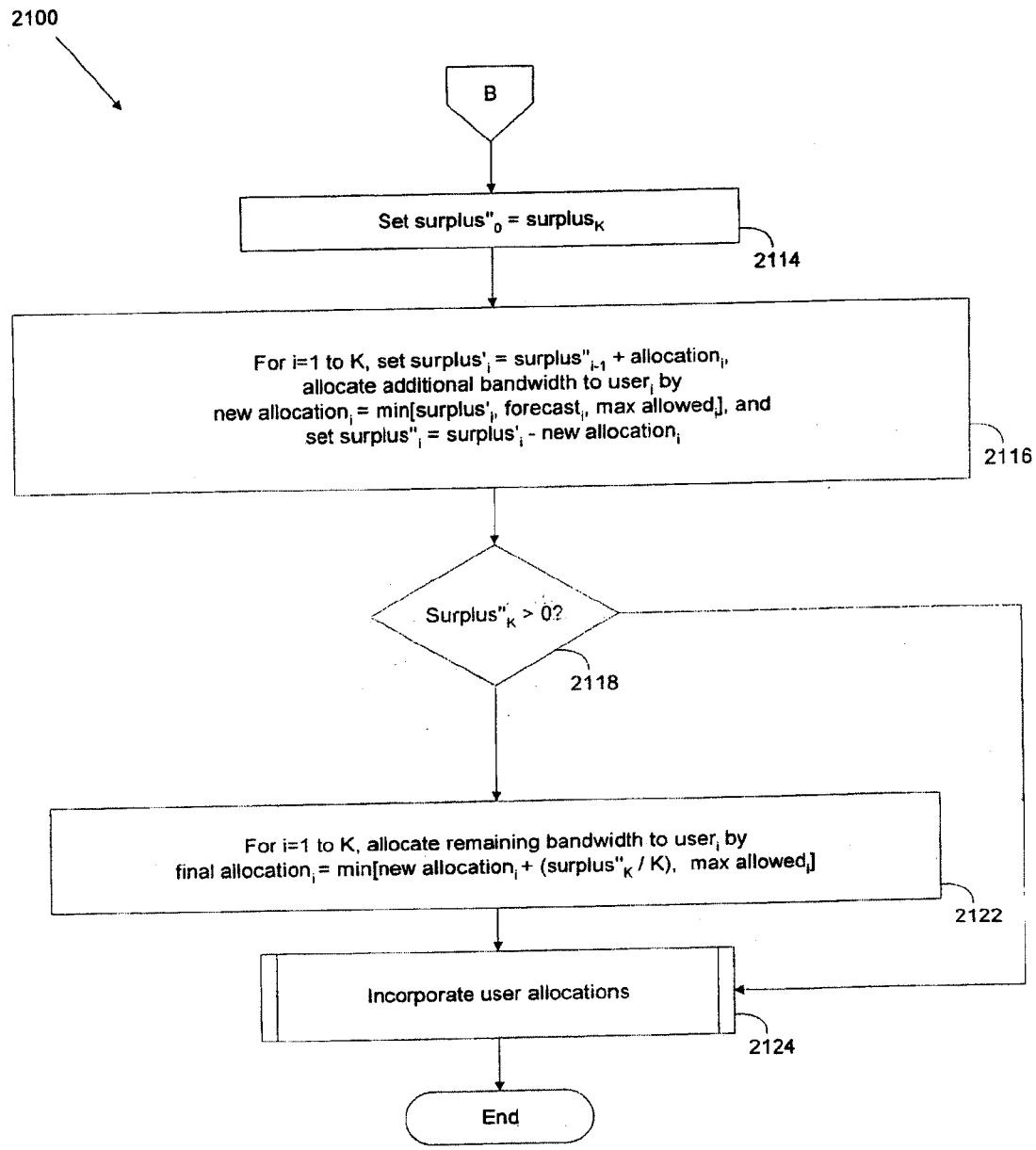
Figure 22A:
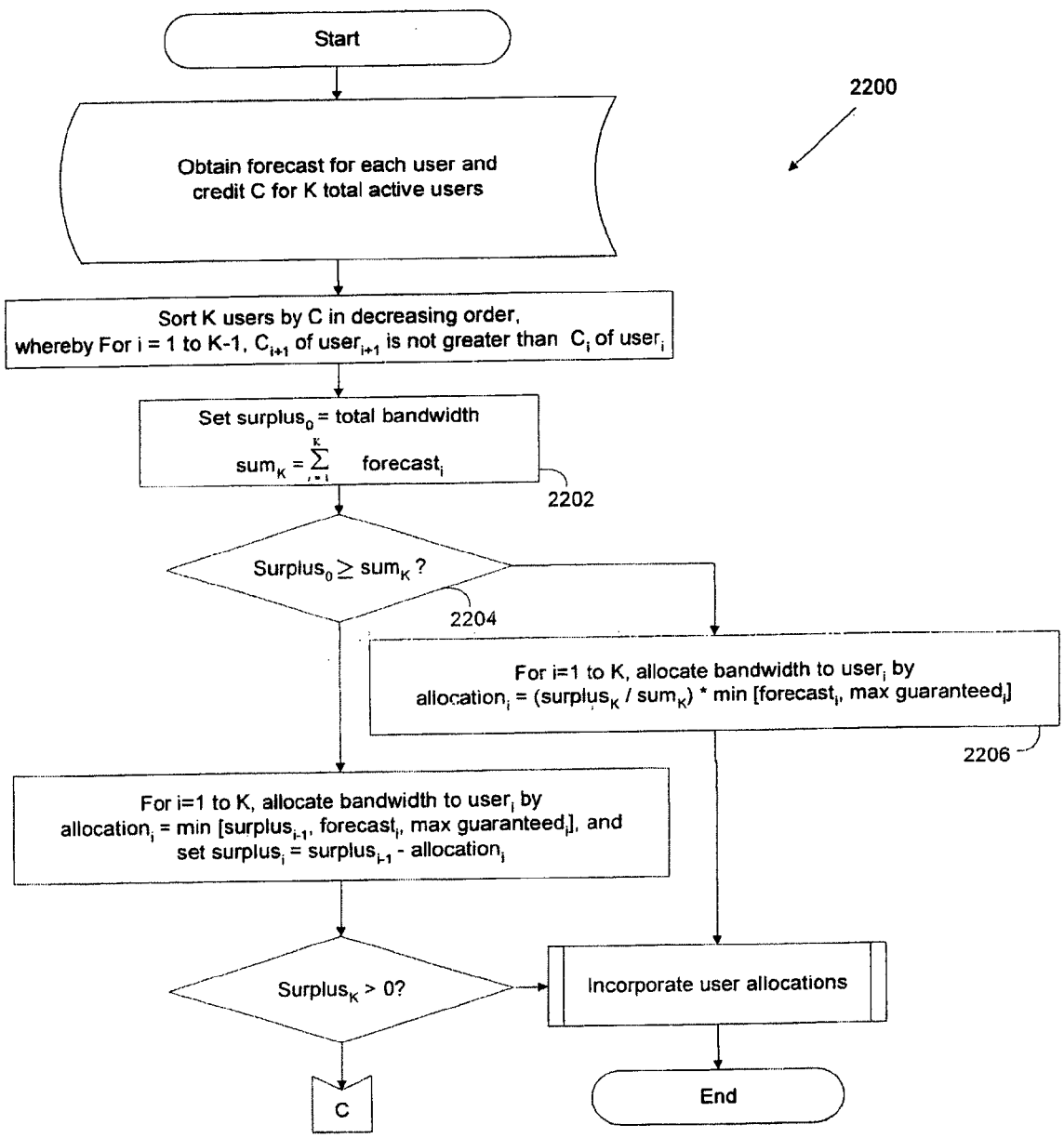
FIGS. 22a and 22b illustrate a flowchart of a sixth method of prioritizing users and allocating bandwidth within a class.
Figure 22B:
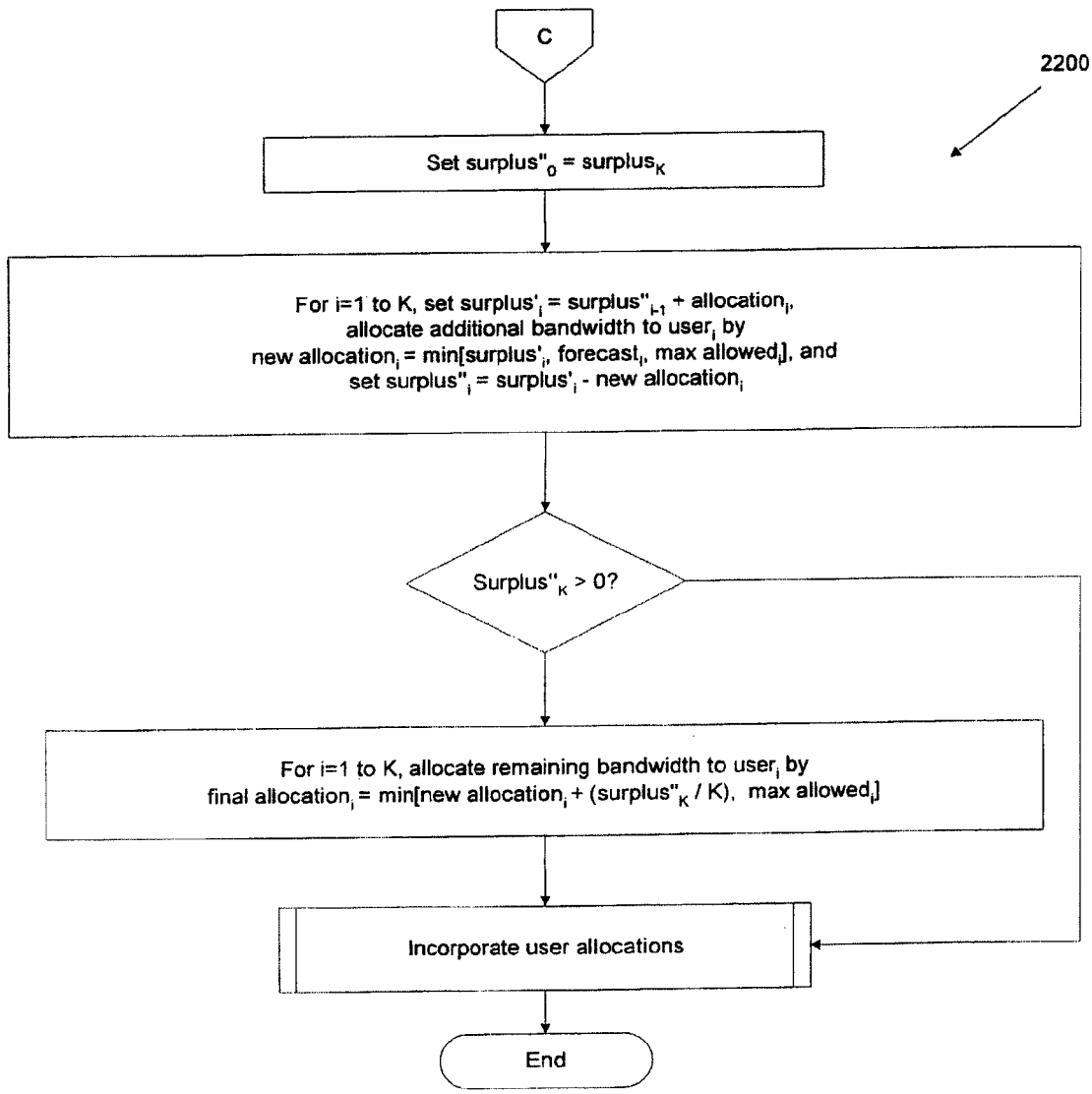

Both preferred method 2100 of FIGS. 21*a* and 21*b*, and preferred method 2200 of FIGS. 22*a* and 22*b* differ from the other methods 1700, 1800, 1900, 2000 in that these two methods allocate bandwidth to the users in multiple allocation rounds. Method 2100 begins in FIG. 21*a* with the retrieval (Step 2102) of the forecasted bandwidths of the users as well as a credit (C) that applies if a respective user does not receive up to a guaranteed maximum level of bandwidth. The users are then prioritized (Step 2104) based on each user's respective credit in decreasing order, with those users having higher credits being given priority over users with lesser credits. Next, the surplus is set (Step 2106) to the total allocated bandwidth of the class in the particular direction of communication. Bandwidth then is allocated (Step 2108) as available in a first round to the users from highest to lowest priority. The allocation in the first round for each user is equal to the minimum of the forecasted bandwidth or the maximum bandwidth that is guaranteed, subject to the user's respective maximum bandwidth value.

If any additional bandwidth is determined (Step 2110) to remain after the first allocation round, then the surplus is set to the additional bandwidth (Step 2114). Bandwidth then is allocated (Step 2116) as available to each user in the same user order. Assuming sufficient bandwidth remains available, the allocation in the second round brings the user's allocation up to the user's forecasted bandwidth subject to the user's respective maximum bandwidth value. Following the second allocation round, a determination is made (Step 2118) whether any remaining bandwidth exists and, if so, then the remaining bandwidth is allocated (Step 2122) equally to the users, subject to each user's respective maximum bandwidth value. The user allocations are then incorporated (Step 2124) into the DOC Network as the users' bandwidth allowances. If it is determined that no bandwidth remains available in either of Step 2110 or Step 2118, then the user allocations are completed and are incorporated into DOC Network in Steps 2112,2124, respectively, as the users' bandwidth allowances.

Method 2200 of FIGS. 22*a* and 22*b* differs from that of FIGS. 21*a* and 21*b* only in that the sum of the forecasted bandwidths for all users is calculated (Step 2202) and a determination is made (Step 2204) whether the sum exceeds the total allocated bandwidth of the class. If the sum exceeds the total allocated bandwidth of the class, then the bandwidth is allocated (Step 2206) to each user in an amount equal to the forecasted bandwidth, subject to the user's maximum guaranteed bandwidth, and less an amount thereof proportional to the total bandwidth shortfall. Thus, for example, if the sum of all forecasted bandwidths exceeds the total allocated bandwidth of the class in an amount equal to 20% of the sum of all the forecasted bandwidths, then each user is allocated bandwidth in an amount equal to the user's forecasted bandwidth (subject to the user's maximum guaranteed bandwidth), then less 20% thereof.

The applicable class bandwidth allowances used in the aforementioned methods are obtained from the Database Manager 90. The information, including fees, credits, guaranteed user bandwidths, and maximum bandwidth values in the aforementioned methods, is obtained from each user's SLA or from any applicable CSLA, and/or is predetermined by the Administrator 106, Carrier, or other entity. Moreover, this information is retrieved by the Bandwidth Allocator 92 from the Database Manager 90, which includes and maintains a user SLA table as well as a user billing table, as updated from time-to-time by the Administrator 106. Specifically, the information is configured and maintained through GUIs provided as part of the GUI & Report Generating Engine 94, and is preferably accessed by the Administrator 106 either directly or indirectly through the Internet 60. Alternatively, information is retrieved by the Bandwidth Allocator 92 from an external database maintained by the Administrator, Carrier, or other entity through an application program interface (API) incorporated into the external system interface layer 98 of the Bandwidth Allocator 92. The use of an external database is preferred not only for the CSLAs, but also for the SLAs and user billing tables, as it eliminates any duplicative maintenance of information otherwise maintained by the Database Manager 90 which must be synchronized with the external database, including periodic updating of user records in a timely fashion.

Regardless of the particular method or policies utilized by the Bandwidth Allocator 92, once user allocations have been determined under the aforementioned allocation policies, the respective DOC Network is updated with the resulting user allocations as the bandwidth allowances for the users for a particular time interval. Each user is then allocated bandwidth during the particular time interval in an amount that is less than, or equal to, that user's bandwidth allowance. Similarly, the collective bandwidth consumptions of a class by users therein is limited by that class' bandwidth allowance. Preferably, the DOC Network is updated at periodic intervals of between one to fifteen minutes and, preferably every five minutes. Furthermore, the periodic interval preferably corresponds to the scheduling of the Bandwidth Allocator 92 with regard to upstream transmissions.

Figure 23:
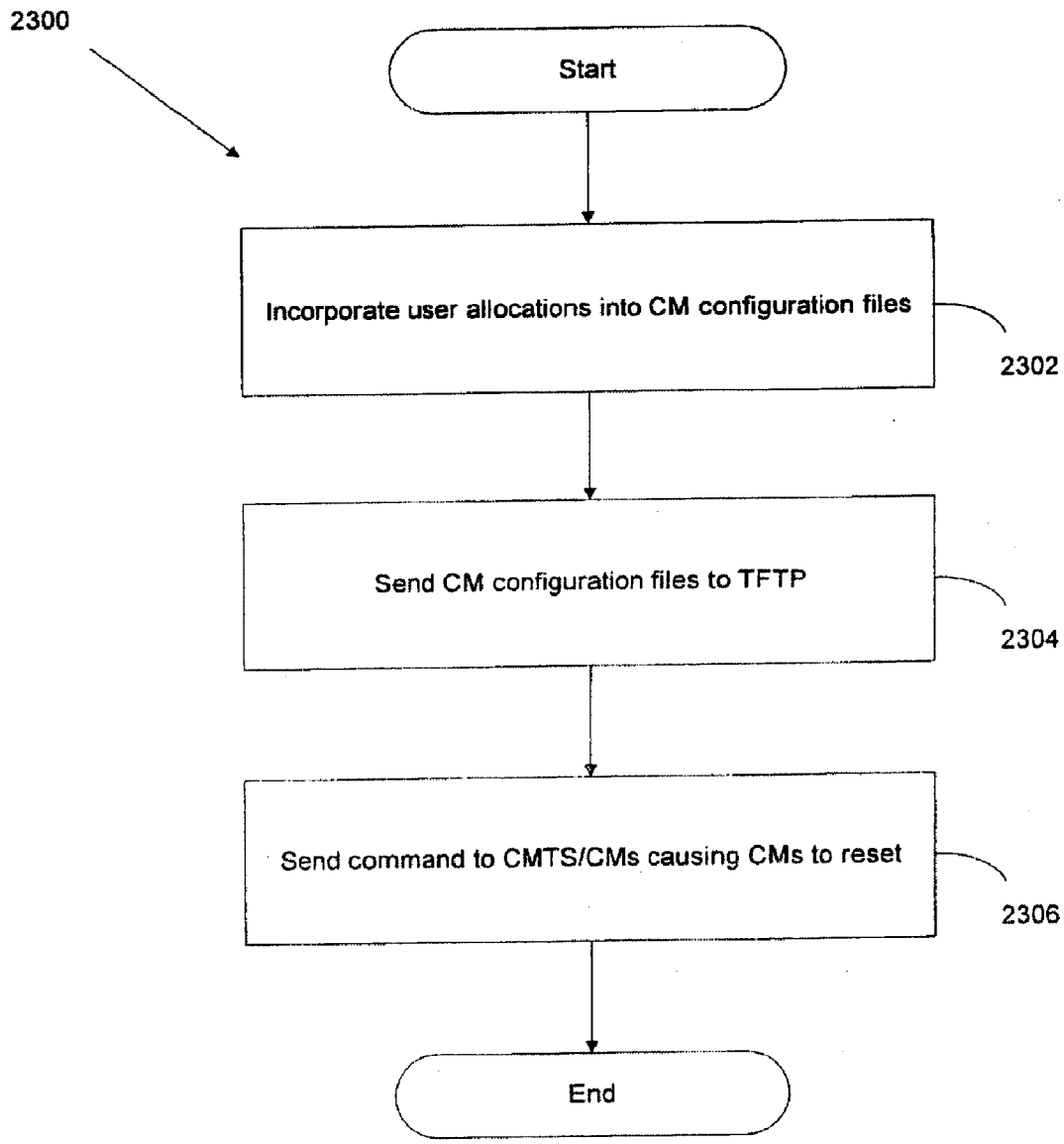
FIG. 23 illustrates a flowchart of a method of updating a DOC Network for a DOCSIS 1.0 compliant Cable Network.

With particular reference to FIG. 23, a preferred method 2300 of updating a DOC Network for a DOCSIS 1.0 compliant Cable Network with the user allowances is illustrated. The DOC Network is updated by incorporating (Step 2302) the user allocations as bandwidth allowances (i.e., bandwidth limits) into CM configuration files (MD-5 files) for the CMs of the respective users. As set forth above, each CM configuration file contains instructions for a respective CM that limits the actual bandwidth consumed by the CM in the upstream direction and in the downstream direction. The CM configuration files are then sent (Step 2304) by the Bandwidth Allocator 92 to a Trivial File Transfer Protocol (TFTP) Server of the DOC Network, which maintains CM configuration files for the CMs of the Cable Network. A command is also sent (Step 2306) to either of the CMs or the CMTS of the respective Cable Network causing the CMs to acquire and implement the CM configuration files maintained on the TFTP Server.

In addition to maintaining information regarding CSLAs, class allocations, SLAs, and user billing data in the Database Manager 90, the GUI & Report Generating Engine 94 further enables the Administrator 106 to analyze the user stats updated by the Data Collector 88, including the generation of reports and graphs regarding, for example, network access usage of the users over time as well as user throughput rates vs. data loss rates similar to that shown in FIG. 10.

It additionally should be noted that a user may or may not be permitted to be grouped in one or more classes in accordance with the present invention. If it is desired that classes be mutually exclusive, then some policy should be established for determining which class with which a user is associated as between competing classes. If it is desired that classes not be mutually exclusive, then users falling within two or more classes will be allocated bandwidth within each class to the extent that no conflict arises as between the classes, and subject to any maximum allowed aggregated user bandwidth for all classes that may be established.

As now will readily be seen, the preferred methods and preferred networks of the present invention described in detail herein enable a Carrier to accommodate bandwidth concerns of service providers competing for the business of users of a shared communications medium in a Shared Access Carrier Network. In particular, CSLAs now can be constructed in accordance with the present invention whereby a service provider is guaranteed some collective level of network access for the users of the shared communications medium that are customers of the service provider. Furthermore, the provision of bandwidth to users who are customers of competing service providers can now be based on fairness considerations, even if one of the service providers is related to the Carrier.

In addition thereto, the differing demands for instantaneous throughput by users competing for access across the shared communications medium now can be accommodated in accordance with the present invention. Indeed, a Carrier now is able to continuously vary bandwidth consumption limits for each user on an individual basis and for small time intervals, either in accordance with fairness considerations, forecasted network access usage of the users, or under contractual provisions governing network access.

It also will now be evident that the present invention gives rise to new business models that may be implemented by service providers for providing network access to users thereof and, in particular, to new ways of selling network access, which is also considered part of the present invention.

For example, in accordance with the present invention, network access now can be "wholesaled" to service providers by considering the users of the service provider a class and allocating bulk network access to such class pursuant to a CSLA between the Carrier and the service provider. Through a CSLA, a Carrier can offer to the service provider a guaranteed minimum level of network access for the class that is constant throughout the day or week, or a guaranteed minimum level of network access that varies depending upon considerations such as the time of day or the day of week. A Carrier also now can offer a guaranteed minimum level of network access to the class with a guaranteed maximum level of network access provided as needed in accordance with a target probability. The service providers, in turn, then can offer different SLAs to the users that are its customers, essentially selling network access at the retail level.

Accordingly, service providers can be assured of levels of network access for the users that are their customers, and users can be assured of appropriate levels of network access to meet their individual demands. Moreover, Carriers and/or service providers now can differentiate between users in charging for network access, thereby allowing Carriers and/or service providers to differentiate revenue streams for maximization of revenues.

Figure 26:
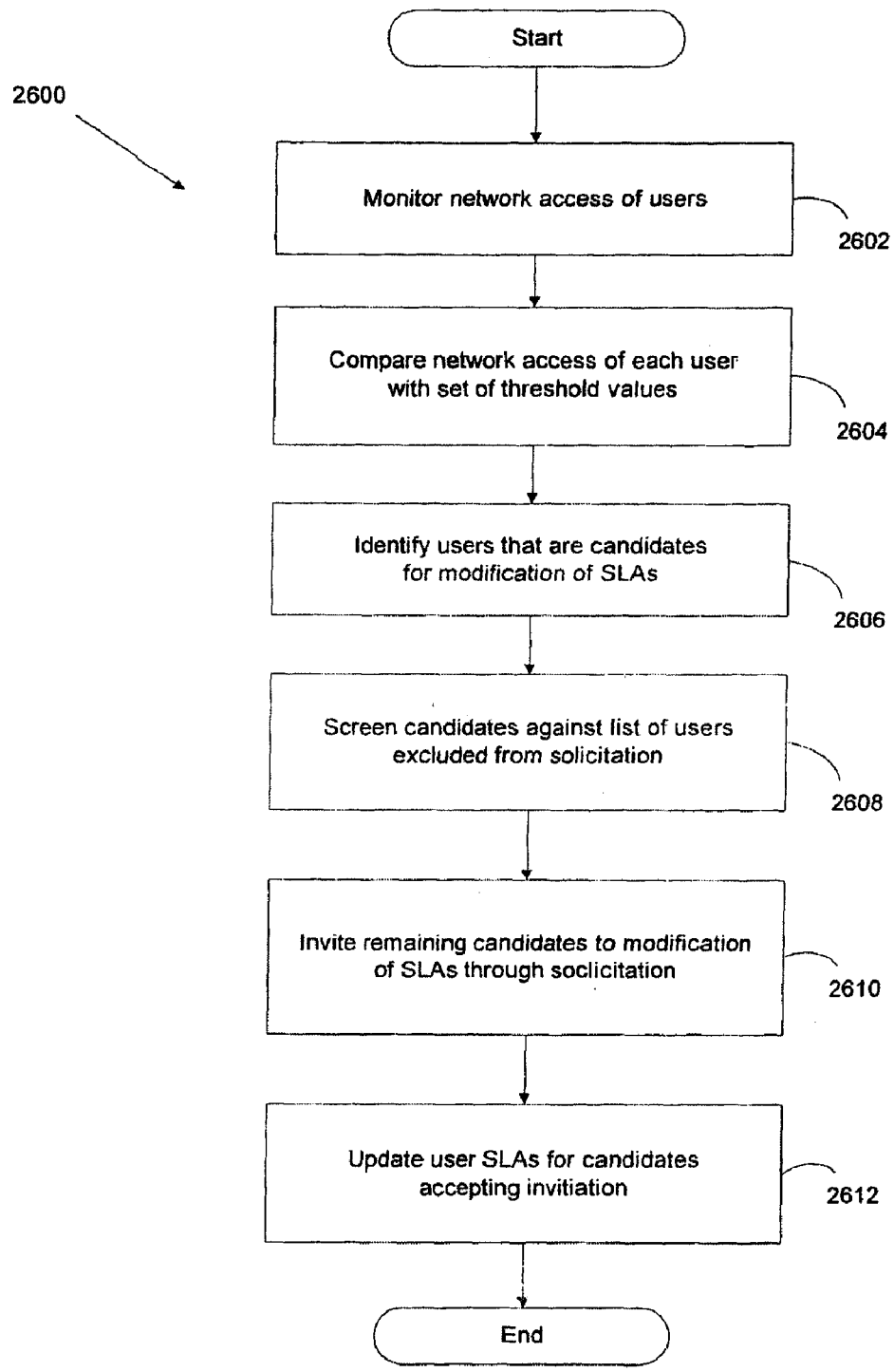
FIG. 26 illustrates a flowchart of method of soliciting a user to modify the user's SLA based on monitored network access usage of the user.

The present invention also enables Carriers and/or service providers to offer "dynamic SLAs" to users. The term "dynamic SLA" refers to a SLA that can be modified by a user as the user's demand for network access significantly changes, whether such modification is permanent or temporary. In this regard, and in accordance with a preferred method 2600 of the present invention as illustrated in FIG. 26, the "network access retailer" (the entity selling the network access to the user) monitors (Step 2602) network access usage by users of a Shared Access Carrier Network and determines (Step 2604), for each user based on network access usage, whether a SLA provision other than those found in the user's current SLA would better meet the user's needs. This determination is made by comparing the user's throughput, bandwidth consumption, and/or bandwidth requested for a predetermined period of time against a set of threshold values, including any guaranteed level of network access provided for in the user's SLA as well as any minimum QoS standard that are deemed necessary for user satisfaction by the network access retailer or other appropriate entity. Thus, if the user's level of throughput, bandwidth consumption, and/or bandwidth requested for the predetermined time interval differs by a predetermined tolerance from a minimum threshold value, then the user is identified (Step 2606) as a "candidate" for modifying the SLA. A similar process alternatively is used, wherein the user's forecasted bandwidth is compared to the threshold values and, if the difference exceeds a predetermined tolerance, then the user is deemed a candidate for modifying the user's SLA.

Once users have been identified as candidates, the candidates are filtered by screening (Step 2608) the candidates against a list of users for which solicitations are not to be made. Those candidates passing the screening are then invited (Step 2610) to modify their respective SLAs. The solicitation of the user preferably is performed via email, instant messaging, redirection of the user's web browser to a solicitation web page, generation and mailing of solicitation literature via U.S. mail, telemarketing, or other means of communication. The solicitation includes an invitation for the user to modify the user's SLA by increasing for a fee the minimum level of network access guaranteed to the user. The solicitation preferably also includes an invitation to make the modification permanent, or to make the modification only temporary and for a specific period of time.

Thus, for example, if a user is identified as having a high usage pattern at recurrent periods of time (such as every Saturday night when a particular webcast is viewed, or when an Internet game is played), then the user automatically is solicited with an invitation via instant messaging on the following Saturday night to increase the user's guaranteed network access for that night, for a predetermined number of following Saturday nights, and/or for every Saturday night.

Acceptance of the invitation by each user results in the modification (Step 2612) of the user's SLA for the appropriate period of time by increasing the level of network access the user is guaranteed (and/or the user's respective maximum bandwidth value, depending upon the policies used). The solicited modification to the user's SLA is updated in the SLA database, which is then used during user prioritization and allocation of bandwidth by the Bandwidth Allocator 92. The resulting higher bandwidth allowance should enhance the user's experience and overall satisfaction with the Carrier Network. In particular, the higher bandwidth (greater network access) should enhance the viewing of the webcast or the playing of the Internet game.

On the other hand, SLAs for which users decline solicitations are not modified. Furthermore, if deemed appropriate, users declining a solicitation are recorded in the list against which candidates are screened.

Preferably, the Bandwidth Allocator 92 analyzes the user stats maintained by the Database Manager 90, identifies those users that are candidates for SLA modification, and initiates the solicitation of such candidates. Information for each user's SLA for comparison with the user's stats automatically is obtained either from the Database Manager 90, or from an external database maintained by the network access retailer or other appropriate entity. Furthermore, the Bandwidth Allocator 92 preferably performs this analysis for solicitation on a regularly scheduled basis.

In addition to such solicitations, a user of course may request a change in the level of network access guaranteed without having to receive first a solicitation. Furthermore, the user may request that the change be for a temporary period of time such that, for example, the change is reversed after only a few hours, which would cover a viewing of a particular webcast or the playing of a particular Internet game beginning at the time of the request.

With regard to DOC Networks, and with reference to FIG. 27 wherein a block diagram of a DOC Network 2700 is illustrated, data packets are transmitted in a downstream direction from a cable modem termination system (CMTS) 2900, which is located in a headend 2736 (or distribution hub) of a Carrier, over a coaxial cable 2732 to respective cable modems (CMs) 2800 of users. All of the CMs 2800 are attached by the coaxial cable 2732 to the CMTS 2900 in an inverted tree configuration, and each CM 2800 connected to the coaxial cable 2732 listens to all broadcasts from the CMTS 2900 transmitted through the coaxial cable 2732 for data packets addressed to it, and ignores all other data packets addressed to other CMs 2800. Theoretically, a CM 2800 is capable of receiving data in the downstream direction over an 6 MHz channel with a maximum connection speed of 30-40 Mbps. Data packets also are transmitted in the upstream direction over a channel typically in the 5 to 42 MHz range by the CMs 2800 to the CMTS 2900 typically using a time division multiple access scheme at a maximum connection speed of 1.5-10 Mbps.

The headend 2736 in the DOC Network 2700 may include a plurality of CMTSs, with each CMTS supporting multiple groups of CMs each connected together by a respective coaxial cable. Each such group of CMs connected to a CMTS defines a Shared Access Carrier Network, with the coaxial cable in each representing the shared communications medium. This arrangement of a group of CMs connected to a CMTS by a coaxial cable is referred to herein as a "Cable Network." Accordingly, the DOC Network 2700 includes a plurality of Cable Networks 2738 originating from CMTSs at the headend 2736 of the Carrier, with a particular Cable Network 2738 being illustrated in an expanded view in FIG. 27.

Each particular CM 2800 within the expanded view of FIG. 27 is connected to a particular computer 2744 each representing a user device. Additionally, as used herein, "user" includes not only a person who interacts with a computer 2744, but any additional persons who also interact with the same computer 2744, as well as any group of persons all of whom interact with computers attached either to the same CM 2800 or to the same computer 2744 which, itself, is attached to a CM 2800.

The CMs 2800 are connected by a coaxial cable 2732 with a CMTS 2900 and, specifically, to a card (not illustrated) mounted within the CMTS 2900. Each of the CMTSs of the DOC Network 2700 may include a plurality of cards, with each card supporting a group of CMs connected thereto in an inverted tree configuration to define a Cable Network 2738.

Each Cable Network 2738 defines a Shared Access Carrier Network, wherein data of respective users in each are conveyed together through a shared coaxial cable. For instance, data packets (or frames) addressed to at least one of the computers 2744 are transmitted by the CMTS 2900 downstream over the coaxial cable 2732 to all of the CMs 2800. Data packets intended for delivery to the CMTS 2900 and beyond are transmitted by a CM 2800 upstream to the CMTS 2900 over the coaxial cable 2732.

Optionally, the CMTS 2900 transmits and receives data packets between the Cable Network 2738 and any network 2750, data source, or data destination external to network 2700. Network 2700 optionally routes data packets received from the external network 2750 to the appropriate CMTS for delivery to a particular user CM 2800 in a downstream direction. Data packets are also routed by network 2700 in an upstream direction from the user CMs 2800 to data recipients in the external network 2750, which includes, for example, servers supporting Web hosting, news, chat, SMTP, POP3, Proxy, cache and content replication, and streaming media.

In Cable Networks 2738 such as those shown in the DOC Network 2700 of FIG. 27, when a CM comes online the CM is assigned a configuration file which, inter alia, sets a constant limit on the bandwidth that can be utilized in the downstream direction by the CM during any particular interval of time, and sets a constant limit on the bandwidth that can be utilized in the upstream direction by the CM during any particular interval of time. The configuration file also includes other parameters, such as the IP address for the CM.

The configuration file for each CM conventionally is obtained by the CM when first brought online, or when the CM is reset. The upstream and downstream bandwidth limits are predetermined by the Carrier or other appropriate entity, the determination of which is based on the expected number of users to be serviced by the particular Cable Network 2738 to which the CM belongs.

In a DOCSIS compliant DOC Network, the information is collected from the CMTS and CMs of a Cable Network via the simple network management protocol (SNMP). The counter values for bytes and data packets that are transmitted and that are dropped in the upstream direction from each CM, and the number of bytes and data packets that are requested to be transmitted in the upstream direction from each CM, are recorded by the CMTS in accordance with a management information base (MIB) of a DOCSIS compliant CMTS. Likewise, the counter values for bytes and data packets that are transmitted and that are dropped in the downstream direction from the CMTS to a CM are recorded by the CM in accordance with a MIB of a DOCSIS compliant CM. Both bytes and data packets are monitored since each data packet may vary in the number of bytes it contains.

In accordance with the present invention, DOCSIS connection bandwidth requirements of a particular user-associated cable modem (CM) are forecasted within dedicated hardware at the CM. The dedicated hardware provides therein embedded algorithms that implement generation of Medium Access Control (MAC) headers and the physical transmission characteristics of the propagated signals. Similarly algorithms are embedded into the corresponding hardware that performs the comparable decoding functionality. The embedded algorithms anticipate future demands of individual users to support dynamic bandwidth portioning with both dynamic time-slot allocations on a given channel and dynamic channel assignments for load balancing among channels.

According to the DOCSIS 1.0 and DOCSIS 1.1 standards, conventional cable modems make requests for mini-slots of time in a reactive manner, that is, a CM sends a request for a mini-slot only after upstream data has arrived from the user, for example from a computer 44 (FIG. 1). The CMTS 30 receives requests from the CMs 34, aggregates these requests, and generates a schedule, also called a map, that specifies precise time slot allocations for each modem. The CMTS reactively generates the schedule for an immediate future time interval, typically with a duration of approximately several hundred milliseconds. The CMTS broadcasts the schedule downstream to the CMs via the shared medium 32. The CMs 34 then upload data to the CMTS 30 in a successive fashion as mandated by the schedule. The schedule specifies a modem which may transmit during each scheduled time slot. According to DOCSIS 1.1 standards, the schedule also specifies which service flow types are authorized for upstream transmission during each scheduled time slot.

The cable modem 2800 according to the present invention has therein embedded algorithms that implement proactive lookahead scheduling by actively forecasting upcoming transmission requirements. The embedded algorithms make predictions as to current and future requirements of the cable modem for upstream data according to the presence of data packets currently waiting in upstream queues and according to predictions about data packets not yet present. Predictive techniques are used to anticipate the arrival of data for upstream transmission and send a request for a mini-slot before the data arrives in order to make the arrival of data coincide with the start of a mini-slot, allocated by a CMTS, wherein the data newly arriving can be transmitted upstream with minimal or no latency for upstream traffic.

FIG. 28 is a block diagram of a cable modem (CM) 2800 according to the present invention. Downstream traffic is generally received from a CMTS 2900 (FIG. 27) by the CM via the radio-frequency input (RF IN) port 2812. Upstream traffic is generally transmitted from the CM to a CMTS on the shared medium 2732 (FIG. 27) via the radio-frequency output (RF OUT) port 2814. An Internet protocol input (IP IN) port 2816 provides data to the modem from a customer premises equipment (CPE) device 2820 associated with the modem. For example, a user computer 44 (FIG. 27) may provide commands for the modem to receive (download) or transmit (upload) data through the RF IN and RF OUT ports 2812 and 2814, respectively. Such commands would reach the modem via the IP IN port 2816. Data is provided from the CM to the device 2820 through an Internet protocol output (IP OUT) port 2818. For example, data downloaded to the CM from a CMTS can reach a user computer through the IP OUT port 2818.

A MAC-layer data traffic encoder (MAC layer) 2802 is embedded within the CM 2800. A statistics collector 2804 of the MAC layer sorts traffic based on the associated service flow, ICP identified application (i.e., TCP port), and other parameters. The statistics collector 2804 collects traffic statistics including the number and mean rate of packets of a designated service flow, and TCP port. A MAC Layer lookahead scheduler 2806 implements a "lookahead scheduling" scheme. The lookahead scheduler is responsive to a schedule from the CMTS for controlling the transmission of packets in the flow queue upstream in accordance with the schedule. A predictor 2808 receives statistics from the MAC layer and generates prediction signals representative of future bandwidth requirements on a per-application basis. The library 2810 stores statistical MAC layer traffic information.

The MAC-layer statistics collector 2804 observes upstream and downstream traffic, collects statistical information, and sends statistical information for each service flow of the MAC layer 2802 to the predictor 2808. The predictor uses the statistical information provided by the collector 2804 and that stored in the library 2810 to generate prediction signals representative of future bandwidth requirements of the CM 2800. The predictor updates the library based on observed trends in statistics in real-time. The predictor sends predictions back to the MAC layer as part of the traffic flow otherwise generated by the customer premises equipment (CPE) 2820. The scheduler 2806 uses predictions generated by the predictor to perform lookahead scheduling, that is, the scheduler generates forecasted requests for provision to a CMTS 2900 (FIG. 29). The cable modem transmits prediction signals to the associated CMTS 2900 (FIG. 29) via the radio-frequency output (RF OUT) port 2814. for use in the embedded components at that equipment in the shared access communications network 2700 (FIG. 27). Prediction signals are generated approximately once every 100 to 300 milliseconds, which is the approximate periodicity of the generation of upstream traffic schedules. Upstream traffic schedules are transmitted back to the cable modem 2800 from a CMTS 2900 to specify a time slots during which a modem which may transmit upstream data to the CMTS. According to DOCSIS 1.1 standards, the schedule also specifies which service flow types are authorized for upstream transmission during each scheduled time slot.

As known to those skilled in the art, a cable modem 2800 constructed to be compliant with the DOCSIS 1.1 specification will include a flow queue or buffer 2840 for storing data packets (e.g. in the form of TCP/IP packets) in anticipation of upstream transmission to an associated CMTS 2900 (FIG. 27). In accordance with the present invention, the buffer 2840 is constructed and arranged so as to provide for a separate first-in first-out (FIFO) buffer for each one of a plurality of different flow types, e.g. streaming video, http, streaming audio, etc. Buffers for such exemplary different data flows are identified as 2850a, 2850b, ... 2850n. Each of these different flows may have different anticipated upstream bandwidth needs or predictions, as a function of variables such as quality of service (QoS) requirements and the like.

As will be understood by those skilled in the art, each of these flows 2850a, 2850b, ... 2850n will be assigned time slots for upstream communication as determined by a communication schedule 2860 that is communicated from an associated CMTS 2900 to the cable modem 2800, in accordance with the DOCSIS 1.1 protocol. The DOCSIS 1.1 MAC layer 2802 is responsive to the schedule 2860 for controlling the outputs from these various buffers 2850a, 2850b, ... 2850n for communication upstream via the RF output port 2814. As described elsewhere herein, the schedule 2860 is modified or adjusted as a function of the operations of the predictor 2808 and lookahead scheduler 2806 so that the anticipated bandwidth needs of these various flows are meet, in accordance with predicted needs, business rules, etc.

In order to forecast the demands of a specific user who is using specific applications, the cable modem collects data for each type of traffic (i.e. voice, streaming video, http), and optionally for different network load levels. The CM collects session statistics for each type of traffic (i.e. voice, streaming video, http, etc.) and optionally for different network load levels. The CM collects data regarding: the average and longest session duration; throughput statistics including minimum, maximum, and average throughput; QoS statistics such as the dropped packet count, delay, and jitter. Table 1 represents an example of session statistics stored in a library for two types of traffic (Video and Telnet) at light, medium, and heavy network load conditions. TABLE-US-00001 TABLE 1 Library of session statistics Maximum Network Minimum Bit Average Bit Bit Rate Packet Packet Jitter Application Load Rate (Mbps) Rate (Mbps) (Mbps Delay (ms) (ms) Video Light 1.95 2.00 2.05 50 2 Medium 1.95 2.00 2.05 50 2 Heavy 1.95 2.00 2.05 50 2 Telnet Light 0.25 0.60 1.00 150 30 Medium 0.13 0.26 0.40 150 30 Heavy 0.07 0.10 0.13 150 30

The CM predictor produces qualitative predictions by looking up current real-time traffic statistics in the library. A weighted average or weighted sum can be applied to modify current real-time traffic statistics in a look-up table containing comparable and appropriate long-term measurements to generate quantitative predictions. Any function, method, or algorithm that generates an estimate of a future sample based on previously encountered samples may be used and many are well known in the art of statistical analysis as is evident from SPYROS MAKRIDAKIS ET AL., FORECASTING METHODS AND APPLICATIONS (3d. Ed. John Wiley & Sons 1998), which is hereby incorporated herein by reference.

FIG. 29 is a block diagram of a cable-modem termination system (CMTS) 2900 according to the present invention. Downstream traffic is generally sent from the CMTS to the CMs 2800 (FIG. 27) on the shared medium 2732 (FIG. 27) from an RF OUT port 2928. Upstream traffic is generally received from a CM via an RF IN port 2926. An IP IN port 2930 provides data to the CMTS from an external device, for example, a router (not shown) of an external network 2750 (FIG. 27). Data received from an external device may typically be intended for distribution to one or more CMs 2800. For example, data from an external device or the Internet can be received by the CMTS 2900 through the IP IN port 2930 and then be distributed to one or more CMs through the RF OUT port 2928. An IP OUT port 2932 sends data from the CMTS to an external device. For example, an e-mail message provided to the CMTS 2900 by a user of a computer 44 (FIG. 27) through the RF IN port 2926 can reach the internet through the IP OUT port 2932.

The MAC layer encoder and decoder, referred to herein as the MAC layer 2902, encodes and decodes layer 1 and layer 2 protocols. A conventional DOCSIS 1.1 encoder and decoder may be used in conjunction with the present invention. The traffic on each channel and the predicted requirements of each user are monitored at the CMTS 2900 (FIG. 29) in order to maintain a history of the recently available capacity, packet loss rate, and packet delay and jitter. A recent history of the predicted bandwidth requirements of each user is maintained, for example, in the prediction cache 2906.

A prediction filter 2904 monitors transmissions on a common TCP port for prediction signals containing prediction information packets arriving from CMs 2800 (FIG. 28) in a particular cable network 2738 (FIG. 27). Prediction requests are received from CMs through the RF IN port 2926. Data traffic on the IP OUT port 2932 is essentially data that has flowed upstream from CMs 2800 minus any DOCSIS 1.1 MAC layer headers. The prediction filter 2904 filters the upstream traffic for the prediction signals provided by the CMs. Prediction signal information is stored in the prediction cache 2906.

A business-rule base 2908 is defined to store policies that govern the prioritization of requests and traffic based on parameters like user priorities, traffic-type priorities, and bandwidth allocation policies.

A statistics collector 2910 queries the MAC layer for traffic statistics. As upstream and downstream traffic flows through the MAC layer the statistic collector collects traffic information statistics from the MAC layer's traffic data interface. The statistics collector stores statistics in the statistics cache 2912 on the CMTS and broadcasts statistics to all associated CMs. In one embodiment of the present invention, the statistics collector is coupled to collect statistics from a traffic-data interface 2918 of a DOCSIS MAC-layer 2902.

A service flow manager 2914 dynamically adjusts quality of service (QoS) parameters for individual service flows in real-time. The QoS parameters are adjusted responsively to information stored in each of the statistics cache 2912, the prediction cache 2906, and the business-rule base 2908. In one embodiment of the present invention, the service flow manager 2914 dynamically adjusts the service flow parameters via a DOCSIS MAC-layer service interface 2920.

A load balancer 2916 dynamically makes channel assignments to cable modems 2800 on the shared medium 2732 (FIG. 27). Multiple users are each assigned a respective channel of the shared medium responsively to information stored in each of the statistics cache 2912, the prediction cache 2906, and the business-rule base 2908. In one embodiment of the present invention, the load balancer 2916 implements channel assignments via a DOCSIS MAC-layer dynamic channel-change mechanism 2922.

A scheduler 2924 generates an upstream traffic schedule, which is transmitted to cable modems 2800 via the radio-frequency output (RF OUT) port 2928 on the share medium 2732 (FIG. 27). The CMs 2800 then upload data to the CMTS 2900 in a successive fashion as mandated by the schedule. The schedule specifies a time slot schedule and identifies a modem, which may transmit during each time slot, and according to DOCSIS 1.1 standards, the schedule also specifies which service flow types are authorized for upstream transmission during each scheduled time slot FIG. 30 illustrates the preferred process or component 2806 for effecting lookahead scheduling in more detail. Portions of the process 2806 are primarily carried out in a cable modem 2800 according to an aspect of the present invention. The steps and elements shown in this figure may be considered a lookahead scheduling component. Although illustrated as a series of steps, those skilled in the art will understand and appreciate that the processes may be effected as software for a general purpose processor associated with the cable modem, or may be implemented in hardware, e.g. via application specific integrated circuit (ASIC), discrete circuit components, or other equivalent circuitry components. Briefly summarized, the process 2806 involves the collection of traffic statistics associated with data flows within the system, storage of those statistics, and formulation of a prediction of anticipated bandwidth need in a future time slot, and communication of that prediction to the CMTS 2900 for utilization in formulating or modifying the communication schedules for the various cable modems in the system.

It should be understood that two independent and asynchronous processes are involved in the process 2806: (1) collection and storage of flow statistics by a statistics collector 2804, and (2) utilization of prestored statistics by a predictor 2808 in formulating a bandwidth utilization forecast or prediction. The first process 2804 starts at step 3020, wherein the component is operative for collecting traffic statistics, associated with various data flows being communicated by the system. At step 3030, the accumulated statistics are stored in a statistics cache or library 2810, which comprises memory storing a collection of information as to type of data flow and the frequency of occurrence of the type of data flow, correlated with time. This process loops at predetermined intervals, e.g. every minute, or every several minutes, or other appropriate time interval.

The second process 2808 involves utilization of prestored statistics in the statistics cache or library 2810. Starting at step 3050, the predictor 2808 accesses the statistics cache 2810 at predetermined intervals to retrieve data. At step 3060, the prestored statistics from the statistics cache are utilized to forecast or predict upstream bandwidth need. An exemplary algorithm for generating a forecast or prediction is described elsewhere herein. At step 3070, the bandwidth forecast or prediction, in the form of "prediction signals", are communicated upstream to the CMTS 2900 for utilization therein.

An exemplary embodiment of a method 3100 for a CMTS 2900 (FIG. 29) of balancing load by making channel assignments such that a plurality users are each assigned a respective channel of the shared medium based upon a predicted need is diagrammed in FIG. 31.

The method 3100 comprises a step 3102 of predicting congestion parameters for each channel of the shared medium for a predetermined time period of p minutes. In one embodiment of the method 3100, congestion parameters include available capacity ($C_{avail}$), packet loss rate ($p_l$), packet delay ($p_q$), and packet delay jitter ($p_{\Delta q}$). Data samples are collected over m 5-minute intervals (5 m=p) with typical time periods of 20, 30, and 60 minutes, where m=4, 6, and 12, respectively. System fixed or required parameters relating to the congestion parameters are the maximum acceptable packet loss rate ($p_{l,max}$), the maximum acceptable packet delay ($p_{q,max}$), maximum acceptable packet delay jitter ($p_{\Delta q,max}$), and maximum available capacity ($C_{max}$).

The method 3100 further comprises a step 3104 of predicting the bandwidth requirements of each user during the period of p minutes, where bandwidth requirements are expressed as minimum, average, and maximum bit rates, by sampling over m sample periods of t minutes each.

At step 3106 congestion parameters are mapped for each channel to a respective congestion measure for each channel of the shared medium using a mathematical function that takes into account packet loss rate, packet delay, packet delay jitter, and available capacity. Though many appropriate mathematical functions may be known or may be conceived for utilization in the mapping in accordance with the present invention, two examples of appropriate function are provided as:

$$Z_{congestion}(t)=(1+p_1(t)/P_{1,max})(1+P_q(t)/P_{q,max})\ldots(1+p_{\Delta q}(t)/p_{\Delta q,max})(1+C_{avail}(t)/C_{max})-1$$

or, alternatively, $$Z_{congestion}(t)=(w_1 p_1(t)/p_{1,max}+w_2 p_q M/P_{q,max}+\ldots w_3 p_{\Delta q}(t)/p_{\Delta q,max})(1+C_{avail}(t)/C_{max})$$

wherein $\Sigma w_i=1 \{i=1,2,3; w_i \text{ is Approximately Equal to } 0\}$.

The method 3100 further comprises a step 3108 of changing channel assignments of a plurality of users to balance the predicted available capacity of each channel of the shared medium over the period of p minutes given the available capacity for each channel over m sample periods, and the minimum, average, and maximum bit rate predicted per user over the m sample periods of t minutes each. In a preferred embodiment of step 3108, the channel assignment of at lease one user is changed from a first channel to a second channel having a lighter load than the first channel. In yet another preferred embodiment, a new user is assigned to the least congested channel over the next p minutes, given the capacity for each channel over m 5-minute periods.

An exemplary embodiment of a method 3200 for conducting predictive admission control by a CMTS 2900 (FIG. 29) is diagrammed in FIG. 32. The method 3200 comprises the step 3202 of obtaining forecast information in the form of from the prediction cache (i.e. prediction signals) for devices on a predetermined channel that are valid for a time interval t and pre-processing any forecasts where necessary (where is the forecasted usage request of the device i for traffic type j beginning at time t). Optionally, usage statistics of any or each device i and traffic type j as accumulated by the CMTS can be retrieved from the statistics cache and utilized in the method 3200.

The method 3200 further comprises the step 3204 of determining the sum of the forecasted usages of devices connected to the network. The forecast sum $S_f$ of the forecasts for all devices and service flows is calculated for the specified channel via: $S_f=\Sigma_i \Sigma_j f_{ijt}$. For example, i might correspond to a particular cable modem and j might correspond to a streaming-video data service flow forecast.

At step 3206 the forecast request sum $S_f$ is compared to the reserve capacity via the inequality relation: $S_f < r_c C$ where C is the capacity of the specified channel for the time interval beginning at time t, and r.sub.c is the fractional portion of the capacity held in reserve for service flow requests. If the inequality relation is true, that is, if sufficient capacity exists to grant all service flow requests, then, and the method proceeds to step 3208. At step 3208 a QoS service flow table is populated utilizing unadjusted forecasted usage requests, that is $g_{ijt}=f_{ijt}$, wherein $g_{ijt}$ represents the QoS service flow table values.

In the event that the inequality relation is false, the request load exceeds the capacity of the specified channel and the QoS service flow table are populated with values g.sub.ijt computed at step 3210 from the $f_{ijt}$ values according to admission and allocation priority policies of the business rule base of the CMTS. Admission policies may deny requests if no capacity exists for new service flows. Prioritized full allocation policies may prioritize all forecasts and grant the requests on a first-come first-served basis. A proportional allocation policy may grand requests within fixed predetermined percentages of the forecast request sum $S_f$. Various types of priorities may be selectively preferred by or in conjunction with various business rule base policies within the scope of the present invention.

At step 3212 the scheduler 2924 (FIG. 29) generates an upstream traffic schedule that is transmitted to cable modems 2800 on the share medium 2732 (FIG. 27) at step 3214. The CMs 2800 then upload data to the CMTS 2900 in a successive fashion as mandated by the schedule. The schedule specifies a time slot schedule and identifies a modem which may transmit during each time slot, and according to DOCSIS 1.1 standards, the schedule also specifies which service flow types are authorized for upstream transmission during each scheduled time slot.

The entirety of the method 3200, which is an embodiment of a method of conducting predictive admission control by arbitrating user requests for access to a shared medium based on predicted aggregate demands, occurs once every 100 to 300 milliseconds. Each such occurrence results in the generation of an upstream traffic schedule for a time period succeeding after the generation of the schedule.

In accordance with the present invention, respective user bandwidth allowances for each time interval are equated with these user allocations of bandwidth, whereby no user receives more bandwidth in a time interval than that user's respective bandwidth allowance for that time interval. Furthermore, it is important to distinguish what a user actually may be "allocated" in the context of the bandwidth that is actually utilized or consumed by such user, as opposed to bandwidth allocations to a user in accordance with the present invention. The bandwidth allocation in accordance with the present invention represents a limit on the amount of bandwidth that can be allocated to a user for a time interval—and hence is equated with a bandwidth allowance; it does not represent per se the amount of bandwidth that the user actually will utilize in the time interval.

In view of the foregoing detailed description of the preferred embodiments and methods of the present invention, it readily will be understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure only is illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

Thus, for example, it will be apparent that, while preferred embodiments of the present invention have been described in the context of DOC Networks (including either a network of all coaxial cable, or a HFC network), the present invention nevertheless relates to any other network (whether wireline or wireless) wherein competing users share access across a shared communications medium including, for example, home networks and small networks in mass transit vehicles.

What is claimed is:

1. A cable modem, comprising:
   a media access control (MAC) layer;
   communication components coupled to the MAC layer operative for communicating digital data over a shared access communication medium;
   a statistics collector coupled to the MAC layer for collecting statistical information relating to traffic in the media access control (MAC) layer;
   a lookahead scheduler coupled to the MAC layer operative for forecasting schedule transmission opportunities on a given channel for a future time slot responsive to a schedule for controlling the transmission of packets in the flow queue upstream in accordance with the schedule;
   a predictor responsive to the statistical information collected by the statistics collector, for generating prediction signals representative of future bandwidth requirements; and
   the lookahead scheduler further configured to generate updated traffic schedules at predetermined time periods.

2. The cable modem of claim 1, wherein the communication components are compatible with the Data Over Cable System Interface Specification (DOCSIS).

3. The cable modem of claim 1, wherein the components operative for communicating digital data comprises a component for communicating the prediction signals to a cable modem termination system (CMTS) for load balancing and predictive admission control.

4. The cable modem of claim 1, further comprising a statistics library for storing the statistical information from the statistics collector.

5. A cable modem termination system (CMTS) operative for making channel assignments to users and to load-balance a plurality of channels on a shared access communications medium:
   a prediction filter for receiving prediction signals representative of future bandwidth requirements of users on the shared medium;
   a prediction cache coupled to the prediction filter for storing prediction signals received by the prediction filter;
   a media access control (MAC) layer coupled to the prediction cache;
   a load balancer coupled to the MAC layer for making channel assignments such that a plurality of users are each assigned a respective channel of the shared medium based upon the prediction signals and one or more business rules for bandwidth allocation, the load balancer further configured to generate updated future channel assignment schedules at predetermined time periods; and a business rule storage element coupled to the MAC layer for storing one or more business rules for bandwidth allocation.

6. The CMTS of claim 5, wherein the business rule is user prioritization.

7. The CMTS of claim 5, wherein the business rule is traffic type prioritization.

8. The CMTS of claim 5, wherein the business rule is bandwidth allocation.

9. The CMTS of claim 5, wherein the system is compatible with the Data Over Cable System Interface Specification (DOCSIS).

10. The CMTS of claim 5, wherein the prediction signals are provided by a communications device coupled to the shared access communication system.

11. A data communications system for controlling network access of a plurality of users to a shared access communications medium, the system comprising:
   one or more cable modems coupled to the shared medium;
   a cable modem termination system (CMTS) coupled to the shared medium, the CMTS having a media access control (MAC) layer;
   a statistics collector coupled to the MAC layer for collecting statistical flow information relating to service flows on the shared medium;
   a statistics cache coupled to the statistics collector for storing the statistical flow information;
   a prediction filter coupled to the shared medium for receiving prediction signals from one or more cable modems, the prediction signals representative of future bandwidth requirements of users of the shared medium;
   a prediction cache coupled to the prediction filter for storing prediction signal information;
   a service flow manager coupled to the statistics cache and to the prediction cache for dynamically adjusting quality of service (QoS) parameters of service flows responsively to each of the statistical flow information, the prediction signal information, and policies relating to control of access to the shared medium the service flow manager further configured to generate updated future traffic schedules at predetermined time periods;
   a load balancer coupled to the statistics cache and to the prediction cache for dynamically making channel assignments such that one or more users are each assigned a respective channel of the shared medium responsively to each of the statistical flow information, the prediction signal information, and policies relating to control of access to the shared medium; and
   a business rule base coupled to the service flow manager and to the load balancer for storing policies relating to control of access to the shared medium and providing the policies to the service flow manager and load balancer.

12. The system of claim 11, wherein the system is compatible with the Data Over Cable System Interface Specification (DOCSIS).

13. The system of claim 12, wherein the load balancer is operative for dynamically changing a channel assignment of a cable modem via a DOCSIS MAC layer dynamic channel change mechanism.

14. The system of claim 13, wherein the service flow manager is coupled to the MAC layer of the CMTS and is operative for adjusting service flows via a DOCSIS MAC layer service interface.

15. The system of claim 11, wherein the statistics collector collects statistics from the traffic data interface of the MAC layer of the CMTS.

16. The system of claim 11, wherein the prediction filter is responsive to prediction signals provided by cable modems and stores prediction signal information in the prediction cache.

* * * * *